(12) United States Patent
Pourtabataie et al.

(10) Patent No.: US 11,356,262 B2
(45) Date of Patent: *Jun. 7, 2022

(54) SYSTEM AND METHOD FOR ANONYMOUS LOCATION VERIFICATION

(71) Applicant: ROYAL BANK OF CANADA, Toronto (CA)

(72) Inventors: Arya Pourtabataie, Orlando, FL (US); Edison U. Ortiz, Orlando, FL (US); Margaret Inez Salter, Orlando, FL (US)

(73) Assignee: Royal Bank of Canada, Toronto (CA)

( * ) Notice: Subject to any disclaimer, the term of this patent is extended or adjusted under 35 U.S.C. 154(b) by 180 days.

This patent is subject to a terminal disclaimer.

(21) Appl. No.: 16/750,542

(22) Filed: Jan. 23, 2020

(65) Prior Publication Data

US 2020/0162256 A1    May 21, 2020

Related U.S. Application Data

(63) Continuation-in-part of application No. 16/503,154, filed on Jul. 3, 2019, now Pat. No. 11,212,102.

(60) Provisional application No. 62/839,408, filed on Apr. 26, 2019, provisional application No. 62/839,407, filed on Apr. 26, 2019, provisional application No. 62/801,322, filed on Feb. 5, 2019, provisional application No. 62/795,979, filed on Jan. 23, 2019, provisional application No. 62/702,684, filed on Jul. 24, 2018, provisional application No. 62/693,680, filed on Jul. 3, 2018.

(51) Int. Cl.
*H04L 9/32* (2006.01)
*H04L 9/08* (2006.01)

(52) U.S. Cl.
CPC .......... *H04L 9/3218* (2013.01); *H04L 9/0872* (2013.01); *H04L 9/3213* (2013.01)

(58) Field of Classification Search
CPC ... H04L 9/3218; H04L 9/0866; H04L 9/3213; G07C 9/28
See application file for complete search history.

(56) References Cited

U.S. PATENT DOCUMENTS

| | | | |
|---|---|---|---|
| 6,820,201 | B1 | 11/2004 | Lincoln |
| 8,386,790 | B2 | 2/2013 | Bhattacharya |
| 8,683,605 | B1 | 3/2014 | Tenenboym |

(Continued)

OTHER PUBLICATIONS

Camenisch, J et al., "Design and Implementation of the idemix Anonymous Credential System", IBM Research, Zurich Research Laboratory, May 2003, p. 1-27, https://www.researchgate.net/publication/2570056_Design_and_Implementation_of_the_idemix_Anonymous_Credential_System.

(Continued)

*Primary Examiner* — Tongoc Tran
(74) *Attorney, Agent, or Firm* — Norton Rose Fulbright Canada LLP

(57) ABSTRACT

A computer implemented system for anonymous electronic verification of location credentials including at least one processor and data storage is described in various embodiments. The system includes cryptographic mechanisms and electronic communication between one or more computing systems that in concert, provide verification of a prover's location credentials in accordance to logical conditions of a verifier's policy without providing additional information to a verifier entity.

21 Claims, 34 Drawing Sheets

(56) References Cited

U.S. PATENT DOCUMENTS

| | | |
|---|---|---|
| 10,448,251 B1 | 10/2019 | Maria |
| 10,523,685 B1 * | 12/2019 | Kostka .................. H04L 63/107 |
| 10,693,872 B1 * | 6/2020 | Larson .................. H04L 9/3228 |
| 2004/0123156 A1 | 6/2004 | Hammond |
| 2005/0058288 A1 | 3/2005 | Sundaram |
| 2006/0195692 A1 | 8/2006 | Kuhlman |
| 2008/0262969 A1 | 10/2008 | Samid |
| 2010/0049875 A1 | 2/2010 | Lu |
| 2011/0072269 A1 | 3/2011 | Takechi |
| 2011/0274275 A1 | 11/2011 | Seitz |
| 2012/0209730 A1 * | 8/2012 | Garrett .................. G06Q 30/06 705/15 |
| 2014/0310162 A1 * | 10/2014 | Collins .................. G06F 16/29 705/39 |
| 2016/0162897 A1 | 6/2016 | Feeney |
| 2016/0344635 A1 | 11/2016 | Lee |
| 2017/0149560 A1 | 5/2017 | Shah |
| 2017/0180128 A1 | 6/2017 | Lu |
| 2017/0294131 A1 * | 10/2017 | Jedrzejewski ........ H04W 4/029 |
| 2018/0262493 A1 * | 9/2018 | Andrade ................ G06F 21/31 |
| 2018/0270065 A1 | 9/2018 | Brown |
| 2019/0036914 A1 | 1/2019 | Tzur-David |
| 2019/0036932 A1 | 1/2019 | Bathen |
| 2019/0144153 A1 * | 5/2019 | Schaub .................. B65B 65/00 53/410 |
| 2019/0259228 A1 * | 8/2019 | Truong .............. G06Q 10/0833 |

OTHER PUBLICATIONS

Belenkiy, M et al., "Randomizable Proofs and Delegatable Anonymous Credentials", CRYPTO 2009, LNCS 5677, p. 108-125, 2009.
Boneh, D. et al., "Identity-Based Encryption from the Wiel Pairing", SIAM J of Computing, vol. 32, No. 3, p. 568-615, 2003.
Groth, J et al., "Efficient Non-Interactive Proof Systems for Bilinear Groups", EUROCRYPT 2008, LNCS 4965, p. 415-432, 2008.
Paquin, C., "U-Prove Technology Overview V1.1 Revision 2", Microsoft Corporation, p. 1-23, Apr. 2013.
Paquin, C. et al., "U-Prove Cryptographic Specification V1.1 Revision 3" Microsoft Corporation, p. 1-23, Dec. 2013.
Office Action dated Jan. 7, 2021 issued in U.S. Appl. No. 16/503,154.

* cited by examiner

POLICY → TOKENDEF STATEMENT*

TOKENDEF → ε | token { VARDEF* };

VARDEF → TYPE IDENT_LIST;

IDENT_LIST → IDENT | IDENT_LIST, IDENT

TYPE → BASIC_TYPE | BASIC_TYPE [NUM]

BASIC_TYPE → float | int[NUM] | unsigned int[NUM]

STATEMENT → VARDEF | EXPR

EXPR → NUM | IDENT | IDENT[NUM] | BASE64 | STRING | (EXPR) | UNARY_OP | BINARY_OP | EXPR ? EXPR : EXPR

FIG. 12

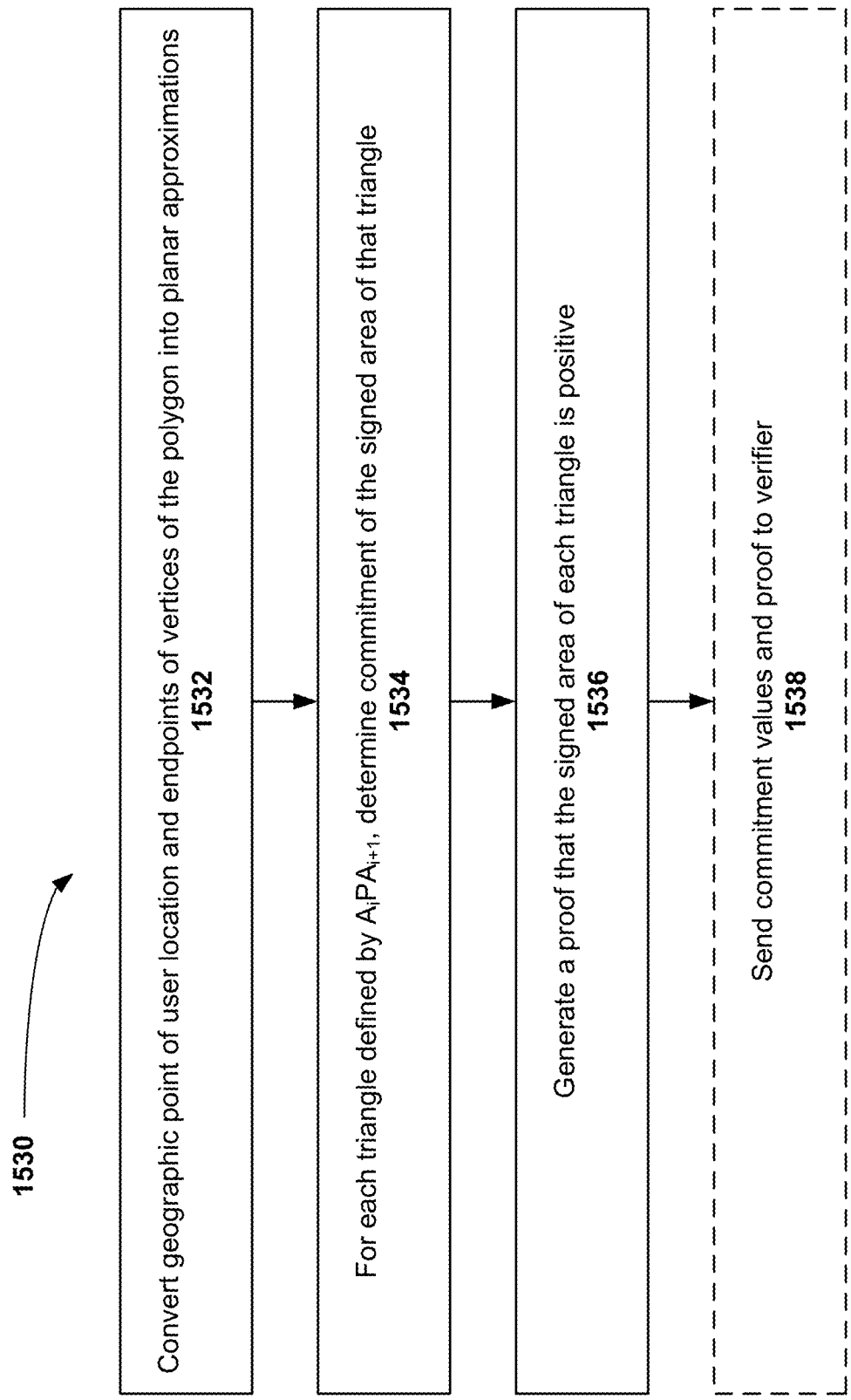

FIG. 18

SYSTEM AND METHOD FOR ANONYMOUS LOCATION VERIFICATION

CROSS REFERENCE TO RELATED APPLICATIONS

This application is a continuation-in part of, and claims all benefit including priority to, U.S. application Ser. No. 16/503,154 dated 3 Jul. 2019 which is a non-provisional of, and claims all benefit including priority to, U.S. Application No. 62/693,680 dated 3 Jul. 2018, U.S. Application No. 62/702,684 dated 24 Jul. 2018, and U.S. Application No. 62/839,408 dated 26 Apr. 2019, all entitled SYSTEM AND METHOD FOR AN ELECTRONIC IDENTITY BROKERAGE, all incorporated herein in their entirety by reference.

This application is a non-provisional of, and claims all benefit including priority to, U.S. Application No. 62/795,979, dated 23 Jan. 2019, U.S. Application No. 62/801,322, dated 5 Feb. 2019, and U.S. Application No. 62/839,407, dated 26 Apr. 2019, all entitled SYSTEM AND METHOD FOR ANONYMOUS LOCATION VERIFICATION; and to U.S. Application No. 62/839,408, dated 26 Apr. 2019, entitled SYSTEM AND METHOD FOR AN ELECTRONIC IDENTITY BROKERAGE, all incorporated herein in their entirety by reference.

FIELD

Embodiments of the present disclosure generally relate to the field of electronic verification, and more specifically, embodiments relate to devices, systems and methods for electronic verification of anonymous location credentials.

INTRODUCTION

The verification of characteristics of an entity is a useful tool in the context of decision making, for example, in relation to access provisioning, goods and service provisioning, among others. The anonymous verification of an entity may also be useful and desirable.

However, an individual when providing credentials for verification may wish to restrict the amount of information being provided to the counterparty, particularly in regards to the location of the individual. The credentials being provided, to increase trust, may also benefit from verification through association with a third-party verifier (e.g., indicating that the individual is who they purport to be, and located where they purport to be).

Credential assertion with restricted information has been difficult to implement in practice as it is technically challenging to generate and provide sufficient trusted credentials, especially on a high-volume, scalable system adapted to serve a large number of users on an on-demand basis.

SUMMARY

Embodiments described herein are directed to computer systems and devices directed to provide a cryptographic platform for generating and transmitting messages that are adapted to assert attributes about various objects (e.g., user profiles, including user locations) without indicating any more than is actually required (e.g., anonymously), and corresponding methods and computer readable media storing machine-interpretable instruction sets for performing the methods.

The computer systems and devices, in accordance with some embodiments, are adapted to a high-volume, scalable system, which dynamically responds to data credential requests of one or more users or one or more computer systems requesting identity/credential proofs (including anonymous location of users).

In some embodiments, the assertions are conducted using mobile endpoints (e.g., user devices) which may have limited computational performance and resources, and accordingly, an improved cryptographic approach and system is proposed that enables the assertion functionality through the passing of cryptographically generated messages between devices. An improvement associated with the proposed cryptographic approach of some embodiments is that it is able to operate in a secure and scalable way, even on limited computational resources (e.g., those available on an unenhanced smartphone).

In some embodiments, there is provided a system for anonymous location verification. The system comprises at least one processor and a memory comprising instructions which when executed by the processor cause the processor to determine if an address is within at least one of a radius of a location, a polygon shape defining an area, or a union of convex polygon shapes.

In some embodiments, there is provided a computer implemented system for communicating data messages between a verifier computing device and a portable client computing device. The data messages establish authentication of at least one client location characteristic of the portable client computing device. The system comprises the portable client computing device including at least a client computing device processor and data storage. The data storage stores one or more token data objects received from or computed jointly in a multiparty protocol with an issuer computing device. The one or more token data objects generate, using at least an issuer computing device private issuance key, the one or more token data objects where each include one or more signed data elements representing at least one of the at least one client location characteristic of the portable client computing device. The client computing device processor is configured to receive a verification request data message from the verifier computing device, and using a combination of the one or more token data objects and the verification request data message generate one or more proof data messages without sending any data messages or requests to the issuer computing device. The verification request data message comprises a request for confirmation that the portable client device is associated with a particular geographic location.

In some embodiments, there is provided a computer implemented method for communicating data messages between a verifier computing device and a portable client computing device. The data messages establish authentication of at least one client location characteristic of the portable client computing device. The method comprises storing one or more token data objects received from an issuer computing device, receiving a verification request data message from the verifier computing device, and generate one or more proof data messages using a combination of the one or more token data objects and the verification request data message, without sending any data messages or requests to the issuer computing device. The one or more token data objects are generated using at least an issuer computing device private issuance key. The one or more token data objects each include one or more signed data elements representing at least one of the at least one client location characteristic of the portable client computing device. The verification request data message comprises a request for confirmation that the portable client device is associated with a particular geographic location.

Corresponding computer implemented methods and computer readable media are contemplated.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 12 is an example C-based proof request description language, according to some embodiments.

FIG. 15C illustrates, in a flowchart, an example of a method of proving that a first geographic point is within a polygon shape having vertices defining an area, in accordance with some embodiments.

FIG. 18 is a screenshot of an example credential manager showing an expanded credential view of a single credential, according to some embodiments.

DETAILED DESCRIPTION

Figure 1:
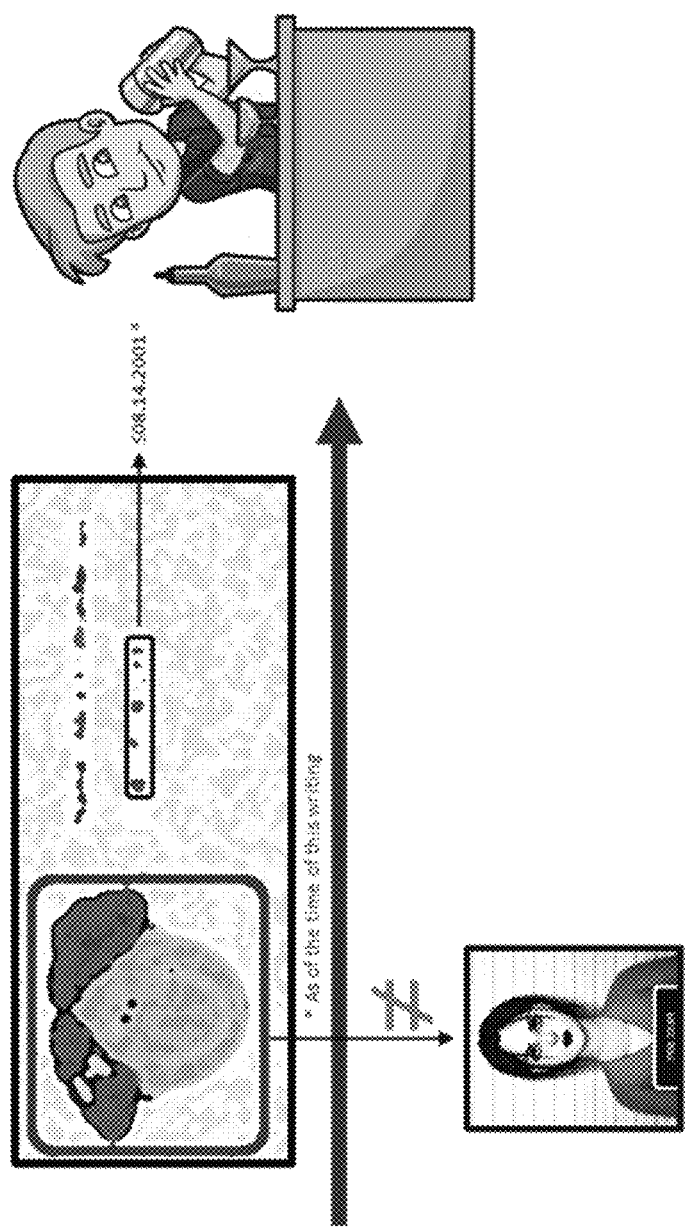
FIG. 1 is a pictorial rendering of an example scenario, according to some embodiments.
Figure 1:
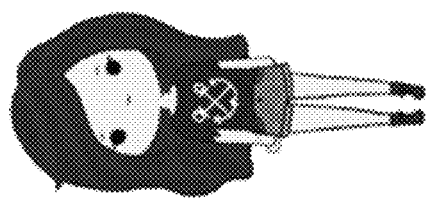

Embodiments described herein are directed to computer systems and devices directed to provide a cryptographic platform for generating and transmitting messages that are adapted to assert attributes about various objects (e.g., user profiles, including user addresses) without indicating any more than is actually required (e.g., anonymously), and corresponding methods and computer readable media storing machine-interpretable instruction sets for performing the methods.

Credential verification, when conducted manually, is a tedious process prone to falsification and also over-provisioning of information. In an example, Alice is a law-abiding 26 year old, and she would like to attend a community event that is free to members of the public who live in a certain area. Before allowing access to the community event to Alice, Bob wants to make sure that Alice lives in the prescribed area.

Alice thinks the conditions are fair, and they both know presenting her ID card would prove that she does satisfy them. She could provide her driver's license, which shows her name, address and date of birth. She would like to not disclose anything to him other than the fact that she satisfies the conditions. However, by providing her driver's license, Bob ends up knowing more than he needs to know (e.g., age, address and specific date of birth as opposed to the fact that she lives in the community). Further, aside from visual inspect of the license, Bob has practical difficulties in verifying that the driver's license is not a fake driver's license.

Accordingly, a challenge involves providing a robust credential verification whereby Alice is able to prove to Bob that she does live in the community, while revealing nothing other than the fact to him. As an example, consider a policy of living within a radius of a location, such as a community centre. That is all Bob needs to know. He does not and should not know that Alice is in fact 26, nor her exact address.

The system is configured to adduce stripped down credentials to meet Bob's customer policy without exposing additional information. In particular, cryptographic techniques are utilized that undertake specific steps and computational approaches to provide a secure, yet computationally efficient mechanism for proof generation.

Accordingly, an issuer device issues one or more signed token data objects, which are stored on a client's device for later usage. Upon encountering a situation where verification is required, the client's device is configured to dynamically generate proof data messages which are then provided to the verifier's computing device (e.g., the verifier's smart phone, a point of sale device, an access control system, a mantrap gate). The verifier is able to conduct a verification check using the proof data message to see only that the conditions required in the original verification check message without providing the actual underlying characteristics. As the proof data messages are generated using the token data objects, the verifier is able to validate that such proof data message is associated with a trusted verifier.

There are two different types of proofs that are proposed in some embodiments, these being exact match proofs (non-zeroness protocol; e.g., this person either matches someone on a whitelist or doesn't match anyone on a blacklist), and conditional proofs (e.g., based on an inequality condition being matched, such as "over 18 years old?" or "live within a geographic area?").

As described in various embodiments herein, improved cryptographic protocols are proposed that, relative to prior approaches, reduce an overall cryptographic complexity without a significant reduction in security. Accordingly, the proofs can be generated more quickly, which improves convenience, especially where a system is being established for mass adoption and client device characteristics are highly variable across the users (e.g., some users may be using devices with extremely limited capabilities).

An enhanced solution is described herein that is adapted for protecting a client's personal information and only providing what is needed by leveraging a client's special space using a secure enclave and a blockchain solution, in accordance with some embodiments.

A blockchain infrastructure and the secure enclave each store data sets representing aspects of signed attributes and, in some embodiments, a proof response logic. The block chain infrastructure can include distributed logic technologies and combination with cascading encryption to provide an immutable ledger. In some embodiments, the proof requests and responses can be conducted using intelligent connected devices such as a mobile device, or wearable devices (e.g., a smartwatch that is connected to a mobile device across Bluetooth low energy).

In an example embodiment, there are multiple authoritative issuers who are able to provide signed attributes (e.g., for storage in secure enclaves or on a distributed ledger blockchain data structure). Secure enclaves can be utilized, or other types of hardware protected spaces are usable.

A registration mechanism and method is utilized to initialize and populate the attributes using public and secret (private) encryption keys. Issuer devices create attribute data records that are generated using a combination of a client's public key and an issuer's secret key (e.g., using digital signatures or encryption/decryption). The attributes can be made publicly available, for example, on a blockchain, whereby the attributes can be signed by an issuer's secret key but encrypted using the client's public key.

A verification mechanism and method is provided whereby a communications channel can be established with an authenticated verifier device, which initiates a proof request, which triggers a process to establish a proof response that is transmitted to the verifier.

An example use case includes a specially configured residency verifier terminal, which for example, can include a graphical user interface rendering visual and coded objects such as a quick response code that can be scanned by a mobile device. Upon scanning the quick response code, the verification mechanism is invoked, and the mobile device may share data sets on a backend communications network such as the Internet. The proof response can be transferred to the verifier device based off of identifiers or information stored other on the residency verifier terminal, or encoded within the quick response code the residency verifier terminal returning true or false such that both a verifier such as a cashier, and the customer are able to visually confirm. The proof response rendering, for example, may be restricted to a true/false determination (e.g., additional private information is not disclosed or rendered).

There are computing devices that interoperate with one another in concert with the cryptographic platform, including devices associated with issuers, verifiers, and clients. The issuers are trusted entities which provide cryptographically validated credential messages that are issued to the client devices for storage thereon.

The cryptographically validated credential messages are then presentable to a verifier (e.g., a third party organization) that seeks to validate that identity or aspects of the identity (e.g., location such as address or residency, etc.) of the user associated with the client device. The cryptographically validated credential messages are configured such that the user is able to validate such identity or aspects without providing additional information associated with the user that is not requested (e.g., as opposed to presenting all the information on a driver's license).

The credential assertion platform is a high-volume, scalable system which dynamically responds to data credential requests of one or more users or one or more computer systems requesting identity/credential proofs.

In some embodiments, the assertions are conducted using mobile endpoints (e.g., user devices) which may have limited computational performance and resources, and accordingly, an improved cryptographic approach and system is proposed that enables the assertion functionality through the passing of cryptographically generated messages between devices.

An improvement associated with the proposed cryptographic approach of some embodiments is that it is able to operate in a secure and scalable way, even on limited computational resources (e.g., those available on an unenhanced smartphone).

For example, a device with limited computational resources can include basic smartphones, which may be one or more generations out of date, and also have limited amounts of on-board memory (e.g., 1-4 GB of memory) and storage (e.g., 8-64 GB of solid state memory). The transfer protocols as between the client devices and the verifier devices may also have limited bandwidth (e.g., through near-field communications (NFC), Bluetooth, limiting communications to only several Mbit/s).

Prior approaches required large numbers of large messages being sent, which made the approaches impractical where resources were limited. The approach proposed herein requires less messages and streamlines the amount of cryptographic computations required to make these assertions.

As described herein, an improved cryptographic mechanism and protocol is proposed that reduces an overall number of data messages and/or cryptographic steps required to be taken to generate the proof data messages. For example, the method of Belenkiy requires 4 randomizations, 3 group multiplications and 7 group exponentiations, which includes elliptic curve exponentiations that are computationally expensive (e.g., involves more than 256 operations on 512 long integers). In a proposed non-zeroness approach of some embodiments, a field inversion is provided, which itself is an expensive operation, but reduces a consideration number of group exponentiations.

The proof data messages are designed to have a "soundness" attribute whereby a malicious verifier is unable to find out from the proof data message more information that what is being provided in the proof data message (e.g., cannot find out the underlying characteristic values).

A computer implemented identity brokerage solution is described in accordance with various embodiments. The identity brokerage solution is adapted to address problems with identity and attribute verification, using computer implemented cryptographic approaches to provide a robust mechanism for conducting verifications while reducing the provisioning of extraneous information (e.g., information not required for the verification).

FIG. 1 is a pictorial rendering of an example scenario, according to some embodiments. Alice is a law-abiding 26 year old, and she is thirsting for beer. She decides to go to Bob's German-style beer hall to quench her thirst for beer. Bob is also currently offering a special discount for local resident within a geographic area close to Bob's establishment.

Bob is not looking for a headache so before selling beer to Alice, wants to make sure of two things: She is legally allowed to drink, meaning 21 years of age or more, and that she is not Mallory McFelon, a problem customer. Bob will also want proof that Alice lives within the geographic area if she is to receive the special discount offer. Alice thinks the conditions are fair, and they both know presenting her ID card would prove that she does satisfy them. She could provide her driver's license, which shows her name, address and date of birth.

Alice also knows that Bob tends to be nosy, so she would like to not disclose anything to him other than the fact that she satisfies the conditions. However, by providing her driver's license, Bob ends up knowing more than he needs to know (e.g., age, specific address and specific date of birth as opposed to the fact that she is above 21 years of age, is a resident of the geographic area, and is not Mallory). Further, aside from visual inspect of the license, Bob has practical difficulties in verifying that the driver's license is not a fake driver's license.

Accordingly, a challenge involves providing a robust credential verification whereby Alice is able to prove to Bob that she does satisfy Bob's customer policy, while revealing nothing other than the fact to him. As an example, consider a policy of "being older than 21" or "being a resident in a community or geographic area". That is all Bob needs to know. He does not and should not know that Alice is in fact 26, or her exact address.

It should be understood that there are other uses for anonymous location verification. For example, when at a voting booth, a voter must prove their residency. The teachings herein allow voters to prove they live within a geographic area without needing to reveal their exact address.

Figure 2:
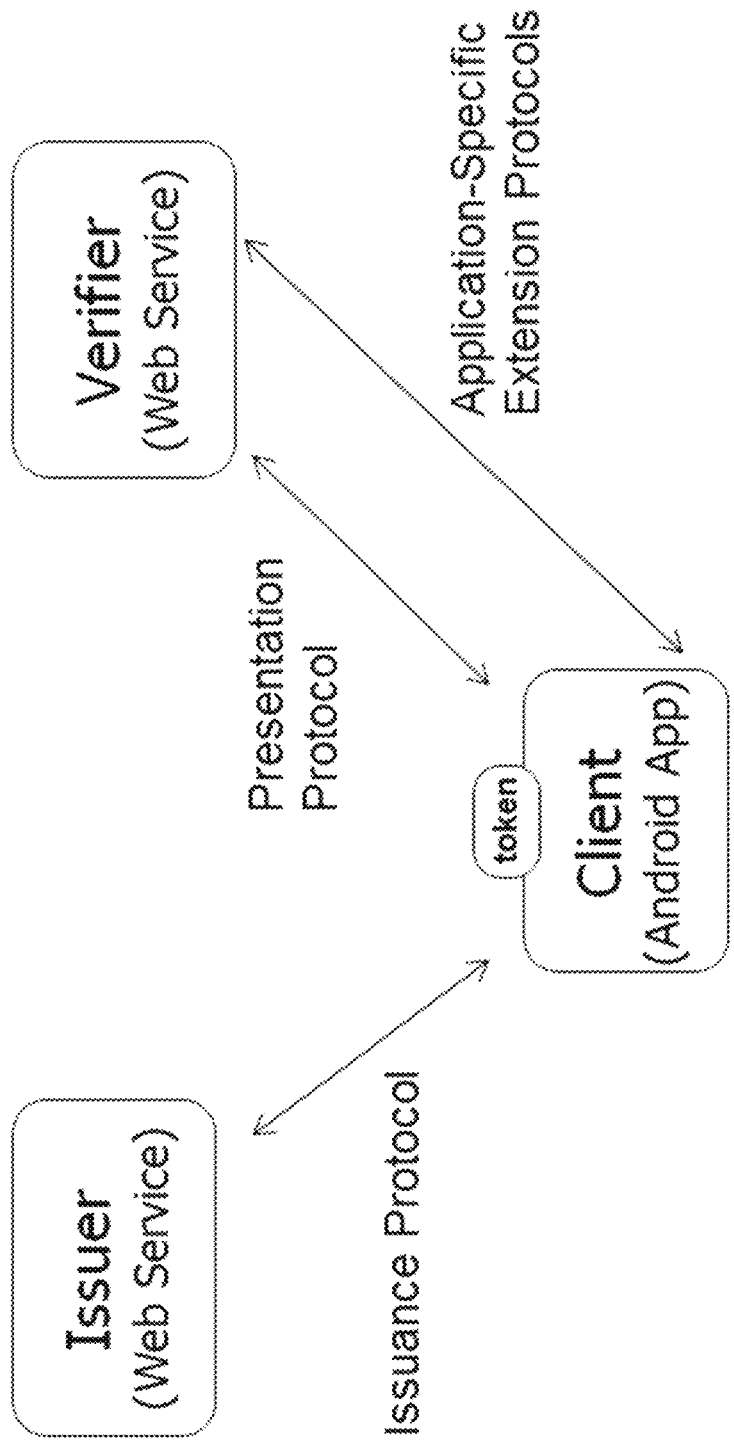
FIG. 2 is a graphical representation of parties to a verification event, according to some embodiments.

FIG. 2 is a graphical representation of parties to a verification event, according to some embodiments. The parties to a verification event include a prover (e.g., the entity seeking to prove the entity's characteristics and/or identity, for example, through programmatic mobile application client 202 having a token 204 stored thereon), a verifier 206 (e.g., the entity seeking to verify the prover's characteristics and/or identity in accordance with a policy), and an issuer 208 (e.g., the entity, such as a financial institution, which has a relationship with the prover and can attest to the prover's characteristics and/or identity, whose representations are trusted by the verifier 206).

In accordance with various embodiments, the prover should be able to hide as many attributes as the prover seeks to prove that follows from their attributes having zero knowledge of the underlying attributes: "I've lived in the same city over the last 5 years", or "I live at an address within a geographic area."

The prover's client 202 holds credentials that are digitally signed by the issuer ("tokens") 208. An example token are those provided by U-Prove specifications. A U-Prove token can include a credential similar to a PKI certificate with cryptographic wrapping of attributes to aid in reducing unwanted tracking of users.

For example, a token may have various artifacts wrapped therein and may include information, such as issuer parameters, including issuer public key information (e.g., coupled an issuer's private key) that can be used for signing or encrypting elements of information stored thereon to prove the veracity of such signature or to protect sensitive information. The issuer signature can be used by the prover or verifier to verify issuer parameters being relied upon, and the token itself, in some embodiments, may have one or more data fields storing information such as token usage restrictions, validity period, token metadata.

In some embodiments, the token is jointly created using a combination of issuer information and prover information. For example, there may be information stored thereon that is established in conjunction and hidden from the issuer, such as contact information, encryption key, or verifier supplied nonces, etc.

During issuance of a token, an issuer may authenticate the existence and access/control that the prover has over the prover's device.

Tokens include attributes that can be converted from a natural form to a sequence of large numbers (field elements) suitable for public key operations. These public key operations include anonymous credentials protocols.

Attributes are organized in a tree. An attribute can either come with a value, in which case it is called a leaf attribute, or bundle a number of sub-attribute, in which case it is called a parent attribute.

For example, consider a geographic location attribute. That would be most naturally divided up into a latitude sub-attribute and a longitude sub-attribute. Thus, a credential token can be considered consisting of a single root attribute containing all others as descendants.

Regardless of whether an attribute is disclosed, committed to, or hidden, the prover may wish to communicate metadata about it to the verifier. The most important such property is an attribute's name. The number "170" in an attribute would mean nothing without the name "height" attached. Additionally, such numeric attributes require units as context. The number "170" is absurd if considered in inches but plausible when in centimeters.

It is important to disclose this metadata even when attributes are being committed to. Consider the non-trivial example of heights and units. Consider an attraction park that refuses to admit people taller than 180 cm on a rollercoaster. Without the proper context provided, a 188 cm tall person can abuse an attribute a height attribute of 74 inches and successfully prove 74<180, thereby put him and others in danger.

In some embodiments, the token can include fields that additionally give the users an ability to decide if they want to hide an attribute's metadata. For example, even if hidden, an attribute attesting to a negative syphilis test can carry social stigma.

An attribute will be serialized into one "raw attribute" (a number or string) if the user chooses its metadata to depend on its parent's. If not, it will be serialized into two, the first representing its metadata and the second representing the value.

Every attribute's metadata contain an array called "subAttributes". If the array is empty, the attribute is considered to be a leaf attribute. Each sub attribute has a corresponding entry in the array. If the sub attribute is encoded independently, the entry will be an integer, denoting how many raw attributes the sub attribute and all of its descendants (subtree) together will take. If it is encoded dependently, the subAttributes entry will be all of its metadata.

In this example, it is describing a token for an individual residing in 35.796682 N, 51.416549 E, and 188 cm tall. In radians, the coordinates are 0.624769962188 N and 0.897388070061 E.

The token from the slide will serialize into the following, each bullet point representing one raw attribute:

```
{subAttributes: [
  {name: "homeAddress", type: "polarCoordinates", subAttributes: [
    {name: "longitude", type: "polarCoordinate", unit: "mRad",
      subAttributes: [ ]},
    2
  ]},
  {name: "height", type: "length", unit: "cm", subAttributes: [ ]}
]}
897
{name: "latitude", type: "polarCoordinate", unit: "µRad",
  subAttributes: [ ]}
624770
188
```

A proof request is issued from the verifier 206 to the prover's client 202, asking the prover to give the verifier 206 cryptographic assurance that according to some issuer trusted by the verifier, the prover's attributes satisfy a certain (arbitrary) policy (e.g., older than 21, as far as provisioning alcohol is concerned), and these proof requests typically contain one or more challenge messages. A proof request can include a nonce, types of conditions, etc., and these conditions may be encapsulated as inequalities (e.g., intUserAge>18), or logical statements (e.g., intUserID not equal to 22412). One or more lookup reference data structures may also be passed, which can include blacklists, whitelists, values for various constants (e.g., MINIMUMDRINKINGAGE).

A proof is provided by the prover through client 202 as a response to the verifier 206's request, which includes cryptographic assurance that the prover's credentials satisfy the verifier 106's proof request, the cryptographic assurance being held being as good as the issuer 108's word. The proof is a data message that encapsulates various information (e.g., proof responses directed to a sigma protocol). The data message includes sufficient information such that the verifier is able to receive the data message, and conduct steps to validate and verify that such proof responses are indeed acceptable. In processing proof responses, the proof data message can include aspects indicative of the identity of an issuer, and a potential step is the validation by the verifier that such issuer is indeed trustworthy as a source of credential authentication.

The proof responses can be processed to generate gatekeeping control signals, which, for example, in an example embodiment, may be as simple as a device that operates a lightbulb whenever someone is validated as being of age (e.g., so that a bouncer at a bar is able to know that this person should be allowed in), or as complex as control mechanisms that automatically open doors, enable access to online accounts (e.g., on a web portal), etc. Accordingly, the verifier systems can include physical and electronic mechanisms which can generate alerts, notifications, actuation/control signals, digital or electronic signals, among others.

Factors for assessing identity brokerage solutions include how light the required infrastructure is (e.g., it may be important to reduce the need for specialized hardware, centralized devices, or complex distributed systems that make deployment and entry difficult), a level of computational efficiency, a simplicity of cryptography, a level of un-linkability between various parties (e.g., the issuer should not be able to aggregate additional data about the client, even in collusion with verifiers), and a flexibility and level of minimalism of disclosed information.

Any solution requiring the issuer to be online at verification time risks exposing additional information about the client to the issuer. This is especially concerning in cases where the issuer and the verifier collude to track client activities.

Reduced complexity is desirable as a solution may be less likely to suffer implementation flaws, be more easily understood, and less likely to theoretically break due to reliance on unusual hardness assumptions. If computational operations that have optimized/low-level implementations, the solution may be able to operate using less computing resources and/or time.

The identity protocols, ideally, should require little time, take little power, have few rounds of message transmission, and pass messages having small sizes and/or overhead. This is especially important where the parties implement portions of the identity brokerage solution on mobile devices to handle one or more verification events. The mobile devices have limited computational, storage, and interface capabilities.

The parties hold corresponding public/secret (e.g., private) key pairs. The public keys can be utilized to determine the veracity of information signed using the private keys, and to encrypt information that can be decrypted using the corresponding private key.

The private keys can be utilized to sign information and to decrypt information that has been encrypted using the corresponding public key, and in some cases, produce Zero-Knowledge Proofs of Knowledge. Each secret key is maintained by the corresponding computing device associated with the corresponding entity.

The parties each have corresponding computing systems, which are used to electronically communicate amongst one another (e.g., through a network) and to perform various cryptographic activities, including signing, verifying signatures, encrypting information, decrypting information and various anonymous credential issuance, proof and verification protocol implementations. Each verification event is associated with validating whether all logical conditions of the proof request are satisfied. A positive determination may lead to access/service/goods being provisioned to the prover. A negative determination may lead to access/service/goods not being provisioned to the prover.

A specific technological implementation of providing identity assertions with minimal disclosure is described in various embodiments. Three separate approaches are described, along with variations thereof. These approaches include (1) an O-Auth token based design, (2) a secure enclave based design, and (3) an anonymous credentials based design.

In some embodiments, a proposed approach is provided in an anonymous credentials based design whereby a client receives token data structure(s) that are stored on data storage, and asynchronously, the client gets a verifier request from a verifier. The verifier may, for example, have a list of trusted issuers that the issuer verifier trusts. Certain organizations may be trusted for certain information, such as a bank for employment or financial status, a university for educational attainment characteristics, among others. The client generates a proof (e.g., encapsulated as a proof data message) based on the token and the verifier request, and the proof can be established as either a non-zeroness proof or a conditional proof. Token objects can be received from or computed jointly in a multiparty protocol with an issuer computing device.

For a non-zeroness proof, the proof approach generation can include a first modular inverse, two randomization steps, two group exponentiations, and a group multiplication. In particular, the steps in an example non-limiting embodiment can be established as:

(1) Receive a verification request data message from the verifier computing device, the verification request data message including at least a nonce $c_0$.

(2) Compute $t=x^{-1}$ mod p, where x is the attribute value from the token, and p is the order (e.g., size, number of elements) of the discrete log group (e.g., elliptic curve, Diffie-Hellman group) according to the cryptographic standards the parties choose to use (e.g., elliptic curve, Diffie-Hellman group); t is the modular inverse of x mod p.

(3) Sample a first random number $r_1$ and a second random number, $r_2$, such that $r_1, r_2 \in \mathbb{Z}_p$.

(4) Compute $R=C_x^{r_1}h^{r_2}$, where R is effectively a commitment to random values $r_1$ and $r_2$, $C_x$ is a commitment to attribute x, h is a group generator taken from cryptographic specifications (e.g., elliptic curve, Diffie-Hellman group). A commitment is a representation of a value that is both hiding and binding, hiding in the sense that the recipient of the commitment cannot find out anything about what the value of the commitment is, and binding in the sense that the sender later cannot pretend that it was a commitment to another value than it originally was.

(5) Compute $c=H(C_x, R, c_0)$, where c is the proof challenge, following the Fiat-Shamir Heuristic.

(6) Compute $z_1=ct+r_1$ and $z_2=-cty+r_2$, where $z_1$ and $z_2$ are proof responses in a sigma protocol.

(7) Encapsulate and transmit one or more proof data messages including R, $z_1$ and $z_2$ as data objects to the verifier computing device, such that the verifier computing device is able to compute $c=H(C_x, R, c_0)$ and confirm that $g^cR=C_x^{z_1}h^{z_2}$, the verifier computing device controlling provisioning of access to a secured resource responsive to the confirmation that $g^cR=C_x^{z_1}h^{z_2}$.

The verifier independently validates the received proof and the verifier makes a determination of access grant or not grant.

In some embodiments, the verifier is a verifier computing system that automatically grants access to one or more secured resources, such as a physical access entry (e.g., mantrap, revolving doors, locked gateway, locked cabinet), and in other embodiments, the system grants access to one or more virtual resources (e.g., administrator access on a computer system, logging into accounts, access to secured sections of webpages), among others.

In another example, a comparison protocol may be established (e.g., to prove some condition whereby $a<=b$). This can be utilized to establish proof messages whereby it is necessary to indicate that a person is of a particular age, that a person has a particular minimum creditworthiness, a person has a minimum educational attainment, among others.

Consider G to be a discrete log group of prime order p and g and h be generators with unknown discrete logs.

Let numbers q and l be such that $$q-1 = 2^N \leq \frac{p}{2}$$

and two whole numbers a and b such that $1 \leq a \leq b < q$. Consider commitments $A=g^ah^{m_a}$ and $B=g^bh^{m_b}$ to a and b, respectively. To prove that a b, the following steps can be taken:

(1) Prover computes $C=BA^{-1}=g^{b-a}h^{m_b-m_a}=g^ch^{m_c}$.

(2) Prover produces bit commitments $A_i=g^{a_i}h^{m_{ai}}$, $B_i=g^{b_i}h^{m_{bi}}$, $C_i=g^{c_i}h^{m_{ci}}$ for $i \in \{1, \ldots, N-1\}$ where $a_i$, $b_i$ and $c_i$ are the i'th bits of a−1, b−1 and c, respectively. $m_{ai}$, $m_{bi}$ and $m_{ci}$ are sampled randomly.

(3) Prover computes $A_0=g^{a_0}h^{m_{a0}}=A\prod_{i=1}^{N-1}A_i^{-2^i}$ and likewise $B_0=g^{b_0}h^{m_{b0}}=B\prod_{i=1}^{N-1}B_i^{-2^i}$ and $C_0=g^{c_0}h^{m_{c0}}=C\prod_{i=1}^{N-1}C_i^{-2^i}$.

(4) For each $i \in \{0, 1, \ldots, N-1\}$, the prover does the following:

(4.1) Randomly sample $r_{ai}$, $d'_{ai}$ and $z'_{ai}$.

(4.2) Compute $R_{ai,ai}=h^{r_{ai}}$ and $R_{ai,(1-a_i)}=h^{z'_{ai}}(A_ig^{-a_i})^{-d'_{ai}}$.

(4.3) Compute $d_{ai}=H(A_i, R_{ai,0}, R_{ai,1})$.

(4.4) Compute $z_{ai}=(d_{ai}-d'_{ai})m_{ai}+r_{ai}$.

(4.5) Assign $z_{ai,a_i}=z_{ai}$, $z_{ai,(1-a_i)}=z'_{ai}$, $d'_{ai,a_i}=d_{ai}-d'_{ai}$ and $d''_{ai,(1-a_i)}=d'_{ai}$.

(4.6) Repeat steps 4.1 through 4.5 for B and C.

(5) Prover sends all $A_i$, $R_{ai,0}$, $R_{ai,1}$, $d''_{ai,o}$, $z_{ai,0}$, $z_{ai,1}$, $B_i$, $R_{bi,0}$, $R_{bi,1}$, $d''_{bi,o}$, $z_{bi,0}$, $z_{bi,1}$, $C_i$, $R_{ci,0}$, $R_{ci,1}$, $d''_{ci,o}$, $z_{ci,0}$, $z_{ci,1}$.

(6) Verifier checks that $A=\Pi_{i=0}^{N-1} A_i^{2^i}$, $B=\Pi_{i=0}^{N-1} B_i^{2^i}$, $BA^{-1}=\Pi_{i=0}^{N-1} C_i^{2^i}$.

(7) For each $i \in \{0, 1, \ldots, N-1\}$ the verifier checks that:

(7.1) $A^{d''_{ai,0}} R_{ai,0} = h^{z_{ai,0}}$ (7.2) $(Ag^{-1})^{H(A_i,R_{ai,0},R_{ai,1})-d''_{ai,0}} R_{ai,1} = h^{z_{ai,1}}$ (7.3) Check the same conditions for B and C.

Note: It may be that either a or b are known to the verifier. In such a case there is no need to decompose the known number and commitment C will have the same mask exponent as that of the unknown parameter.

In some embodiments, that the client computing device (e.g., the prover) does not send $A_0$, $B_0$ and $C_0$ to reduce the size of its messages. In that case, in step 6, instead of verifying a relation between the bit commitments the verifier derives $A_0$, $B_0$ and $C_0$ independently. This aspect may be particularly useful in low data throughput situations or where storage space is very limited.

The comparison method of some embodiments reduces the problem of comparison to three bit decompositions. As such, the computational burden on the prover consists of about 12N−3 group exponentiations.

In contrast, the method of Belenkiy involves two bit decompositions and N−1 equality maps each consisting of four 2-variable equations and a total of six distinct variables.

As such, it is estimated that each equality map requires at least 8 group exponentiations.

Using the efficient Bit Decomposition implementations of some proposed embodiments, the two decompositions will require a total of 8N−2 group exponentiations. Accordingly, it is estimated that Belenkiy's method requires 16N−10 group exponentiations. This demonstrates that for the proposed method for the comparison protocol is more efficient, and this superiority becomes increasing important as the numbers to be compared scale up.

In particular, the scale up may occur if the credential verification system is utilized across a large number of users.

Figure 3:
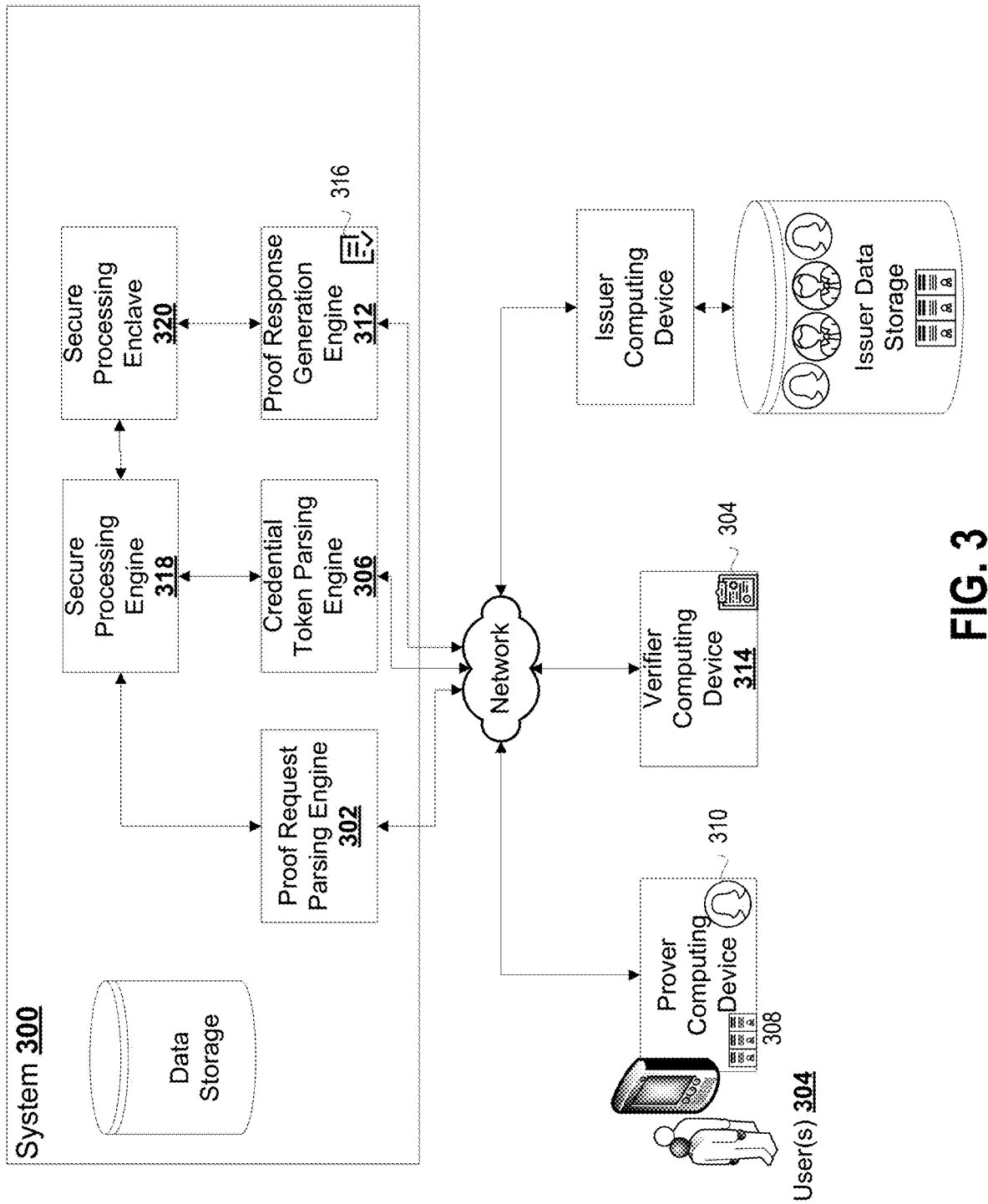
FIG. 3 is an example system for conducting credential verification, according to some embodiments. The system aspects may include logical components, physical components, or a combination of logical and physical components, in accordance with various embodiments.

FIG. 3 is an example system for conducting credential verification, according to some embodiments. The components are shown as an example of one embodiment, and alternatives are also contemplated. The components of the system do not necessarily reside on the same computing device and may be distributed across one or more computing devices.

A computer implemented system 300 for electronic verification of credentials is illustrated. The system includes at least one processor and data storage, and includes a proof request parsing engine 302 configured to receive one or more proof request data structures 304, which in combination represent one or more logical conditions.

A credential parsing engine 306 is provided to receive one or more credentials 308 which in combination, validate one or more characteristics of an identity profile 310 of a prover entity.

A proof generation engine 312 is provided that receives, from a verifier computing system 314, the one or more proof request data structures 304 and the one or more credentials 308; and for each logical condition provided in the one or more proof request data structures, parse the one or more characteristics of the identity profile 310 to determine whether the logical condition has been satisfied.

One or more proof output data structures 316 storing signatures or zero knowledge proofs of satisfaction of a subset or all of the one or more logical conditions is returned by the system (e.g., in the form of data fields). A secure encryption engine 318 and a secure processing enclave 320 may be included, in accordance with various embodiments.

A proof generation engine 312, in some embodiments, resides at or is coupled to a data center of a financial institution, and wherein parsing the one or more characteristics of the identity profile includes invoking an electronic comparison against a stored user profile of the financial institution corresponding to the prover entity. The example implementations are not restricted to such a topology, and other topologies are contemplated, including a cloud/distributed resources based proof generation engine 312.

In other embodiments, the proof generation engine 312 is coupled to the secure processing enclave 320, which may also be coupled to a verifier computing device 314.

In another embodiment, the proof generation engine 312 lies within the prover's user device, thus user data will never be provided to the verifier and the issuer will not be informed of the transaction taking place.

In another aspect, the electronic comparison against the stored user profile of the financial institution corresponding to the prover entity includes querying one or more attributes of the stored user profile and comparing the queried one or more attributes against the one or more logical conditions to determine whether individual logical conditions of the one or more logical conditions have been satisfied. The characteristics and attributes of the user profile can be used established and stored thereon the portable client computing device as one or more token data objects that can be received from or computed jointly in a multiparty protocol with an issuer computing device.

The one or more token data objects are generated (e.g., as signed objects or encrypted objects) using at least an issuer computing device private issuance key. The one or more token data objects each including one or more signed data elements representing at least one of the one or more characteristics of the client associated with the portable client computing device.

In another aspect, the verifier computing system is configured to encapsulate the one or more credentials along with the one or more proof request data structures in a single data container transmitted to the proof generation engine.

O-Auth Based Design

Figure 4:
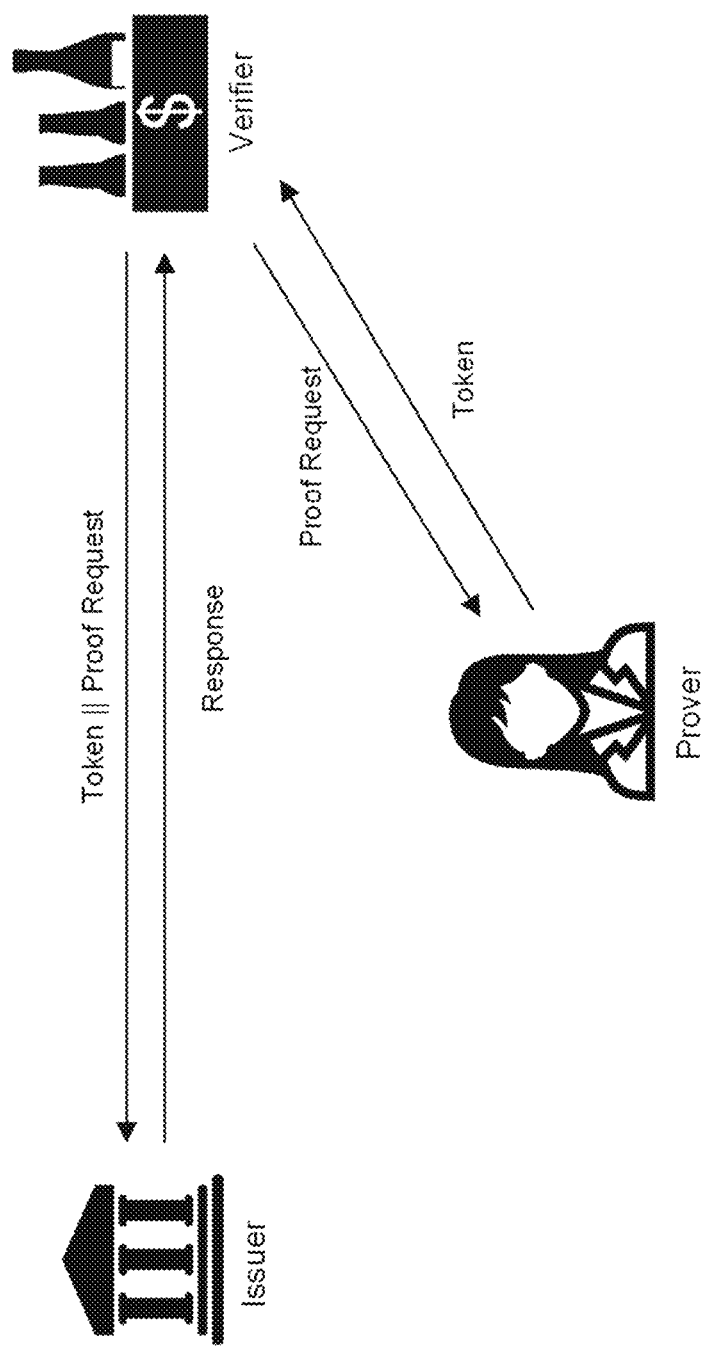
FIG. 4 is an example O-Auth based method, according to some embodiments.

FIG. 4 is an example O-Auth token based method, according to some embodiments. The O-Auth based method portrayed does not address the issue of unlinkability, and in this example, the prover computing device electronically communicates to the verifier O-Auth tokens containing the verifier's proof request, which the verifier computing system can use to formulate a query message to be transmitted to the issuer computing system, and receive a yes/no answer in response. A benefit to this approach is that there is relatively light infrastructure required, it is very efficient, and the cryptography is simple and flexible.

However, the issuer computing system needs to be available (e.g., online) to be able to process the request. In response to a proof request, the prover confers an OAuth token (not to be confused with credentials) that the verifier can use to query the issuer and be assured that the prover does indeed satisfy their policy.

The verifier is provided tokens containing the verifier's proof request which can be used to query a computing system associated with an issuer, receiving an answer, such as a yes or no response (e.g., or a Boolean variable, such as TRUE/FALSE, 0, 1).

Secure Enclave

A challenging technical problem occurs in implementing a system where the verifier is able to ensure the prover has the correct credentials, while preserving their privacy. In some embodiments, a secure enclave based approach is described. In order to implement a secure enclave, Intel Software Guard Extensions™ (SGX) can be utilized, among others.

There are different mechanisms for public key cryptography. An approach, for example, supported by the Intel SGX SDK natively supports ECDH for key encapsulation and ECDSA for digital signatures over the PRIME256V1 (also known as SECP256R1) curve. Other approaches are possible, such as Schnorr's, which would serve just as well for a digital signature scheme. 256-bit base fields may potentially provide sufficient security.

For symmetric cryptography, Intel SGX SDK™ natively supports 128-bit AESGCM. This primitive can be used for authenticated encryption. It remains to be seen if larger AES key sizes are necessary. In that case, Galois-Counter Mode cannot be used.

Hashing can be performed using SHA-2, as this is natively supported by the Intel SGX™ SDK. As it supports 256-bit blocks, it would also be useful in case of a migration to larger AES blocks; both as a means of key derivation as well of a MAC building block.

The secure enclave approach improves computational efficiency and minimizes a trusted computing base, rendering it more amenable to formal analysis. The verifier may include a verify oracle, which is a trusted software/hardware component hosted by an untrusted third party. It is allowed to view a prover's attributes in the clear and attest that they satisfy a certain predicate queried by the verifier.

An example registration protocol is provided as follows. First, a prover generates their public key. The issuer hands the prover a random string r, the prover generates $sk'_p$ and generates $pk_p = f(sk_p)$ for $sk_p = (sk'_p, r)$ and common knowledge collision resistant function f. In order for the registration to be accepted, the prover should prove to the issuer in zero knowledge that it knows a corresponding $sk'_p$. The (semi-honest) issuer's contribution to key generation is to keep a malicious prover from stealing credentials belonging to a previously revealed private key.

In regard to credential subletting, it may be beneficial that the issuer should demand the prover to incorporate some important secret about their account (not even known by the issuer) into the private key, such that the secret can be inferred from the private key. This will discourage provers from sharing credentials with one another. Alice may be willing to let Bob use some credential issued to her by her bank, but not be comfortable giving him complete control over her bank account.

Another possible technique to approach this is to issue credentials to specific devices, using private keys that the device can create for an application and sign using them on the application's behalf, without ever sharing the key with the application.

An example issuer protocol is described:

The issuer generates a signature on the prover's attributes using an arbitrary signature scheme that is secure against existential forgery. For the construction to be secure, the signature should also involve a description of the token's data structure.

More formally, the prover and the issuer agree on a string $a_p$ representing the prover's attributes. The issuer knows the prover as the owner of $pk_p$, satisfying $a_p$. The issuer sends the prover back a signature $\sigma_i = sig(sk_i; pk_p \| a_p)$ to the prover.

It is not strictly speaking necessary for the prover to have a public key at all. However, if the issuer enforces limits on how often it would register a new public key for a client, provers will be discouraged from subletting their credentials to one another. This stands in opposition to keyless credentials, where disclosing the secrets to a credential doesn't cost the original owner anything.

An example protocol for showing verification by the oracle is provided.

Let the prover and the verifier both trust a verification oracle known by the key pair $(sk_o, pk_o)$.

The verifier chooses a random challenge c and sends it to the prover. A proof request predicate P is agreed upon. The prover composes the string $d = (pk_i \| sk_p \| a_p \| \sigma_p \| c \| P)$ and sends $enc(pk_o; d)$ to the oracle.

The oracle decrypts d and checks that the following propositions are satisfied:

$$sig\ ver(pk_i; \sigma_i; f(sk_p) \| a_p)$$

$$P(pk_i, a_p)$$

In case of successful verification, the oracle outputs $\sigma_o = sig(sk_o; c \| P)$ or it outputs ⊥ otherwise.

The verifier only needs to check that $sig\ ver(pk_o; \sigma_o; c \| P)$ holds.

Note that as regards propositions P that do not depend on anything outside $a_p$ (e.g., time) there is no freshness requirement; therefore the challenge c can simply be regarded to be the empty string in such cases.

For examining the approach security, the following collusion scenarios are considered:

Malicious issuer and prover to break soundness: This attack can be trivially mounted and in some embodiments, there is not attempt to prevent it. The issuer can always issue bogus adaptively chosen untruthful credentials for an accomplice prover. In practice, such a problem is best thwarted by strong and transparent authentication and KYC practices by issuers, as well as careful choice of trusted issuers by verifier consortiums based on thorough vetting.

Malicious issuer and verifier to break zero-knowledge: Zero-knowledge in this context means that an adversary controlling all issuers and verifiers cannot pinpoint which of the trusted issuers implied by the query and which of the credentials obtained from the issuer the credential in use is. For this, the analysis makes use of the CCA2 property of the encryption scheme used in Acquire Proof queries.

More formally, consider the following game, where the adversary is allowed to make polynomially many of the following queries, interleaved with polynomial computations:

Create Honest Oracle: Generate $(sk_o, pk_o)$ and add $pk_o$ to the set $O_{honest}$ known to the adversary.

Confer Credential: Send $(\sigma_i = sig(sk_i; pk_p \| a_p), pk_i)$ for arbitrary $a_p$ and arbitrary key pairs $(sk_i, pk_i)$ and $(sk_p, pk_p)$.

Request Challenge: Send arbitrary $pk_o \in O_{honest}$, P and c to the challenger. The challenger picks a random element d from the set $D = \{(pk_i \| sk_p \| a_p \| \sigma_i \| c \| P) | P(pk_i, \sigma_i)\}$ and sends $enc(pk_o; d)$ back to the adversary.

The adversary wins if D is non-empty and he can guess the value of d with non-negligible advantage over a random choice.

A simulation argument naturally follows from this intuition and is therefore avoided.

Malicious prover to break soundness: The adversary is allowed polynomially many queries from the following list; arbitrarily interleaved with one another and polynomial-time computations.

Create Honest Issuer: Create a new key pair $(sk_i, pk_i)$ and add $pk_i$ to the set $I_{honest}$ available to the adversary.

Create Honest Oracle: Create a new key pair $(sk_o, pk_o)$ and add $pk_o$ to the set $O_{honest}$ available to the adversary.

Initiate Registration: Receive a random string r from an honest issuer.

Finish Registration: Send $(r, pk_p, \pi)$ to an honest issuer that has sent r in a past Initiate Registration query. If $\pi$ non-interactively proves knowledge of $sk'_p$ such that $pk_p = f(sk'_p, r)$, the issuer will later accept Acquire Credentials queries from the adversary.

Finish Honest Registration: Create an honest prover to respond to an already initiated registration process $sk'_p$ will be hidden from the adversary, but $pk_p$ will be known and added to the set $P_{honest}$.

Acquire Credentials: Acquire $\sigma_i = sig(sk_i; pk_p, a_p)$ for arbitrary $a_p$ and the additional requirement that $pk_p$ has been already registered with the owner of $sk_i$. Add $(pk_i, a_p)$ to the set A.

Acquire Proof: Submit $enc(pk_o; d)$ an arbitrary but well-formed $d = (pk_i \| sk_p \| a_p \| \sigma_p \| c \| P)$ to an honest oracle with key $pk_o$ and acquire the output $\sigma_o$.

Acquire Honest Proof Request: Send arbitrary $(P, c, pk_o)$ to an honest prover and receive $enc(pk_o; d)$ if the prover has a credential attesting to P and $\perp$ otherwise. Add c to the set $C_{outsourced}$.

Forge: The adversary outputs some $\sigma_o$, and the game ends. She wins if:
1. sig $ver(pk_o; \sigma_o; c \| P)$ for some c and P.
2. $c \notin C_{outsourced}$
3. $pk_o \in O_{honest}$
4. $\exists (pk_i, a_p) \in A: pk_i \in I_{honest}, P(pk_i, a_p)$
5. $\forall pk_i \notin I_{honest}, a_p: \neg P(pk_i, a_p)$ There are no queries regarding corrupted or corruptible Issuers and Oracles since such parties can be simulated by the adversary herself.

Figure 5A:
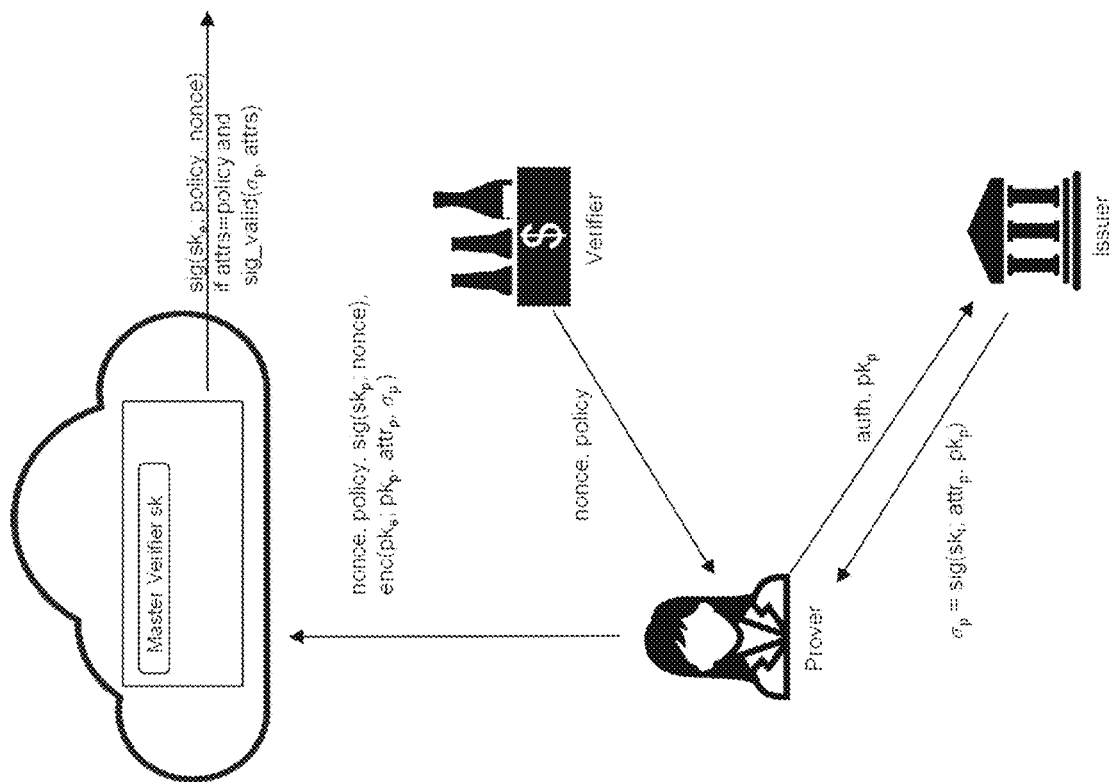
FIG. 5A is an example method diagram where a secure enclave master verifier is utilized, according to some embodiments.

FIG. 5A is an example method diagram where a secure enclave master verifier is utilized, according to some embodiments.

In FIG. 5A, the issuer computing system signs attributes with a cryptographic technique, the verifier computing system sends issuer computing system a challenge and proof request.

In response, the prover computing device sends encrypted credential, challenge and proof request to a master verifier computing device. The master verifier signs challenge and proof request computing device.

This approach, while requiring additional infrastructure relative to the approach of FIG. 4, satisfies many of the conditions for an ideal verification. The issuer computing system does not obtain further information (e.g., the identity of the verifier) from the verification event.

Figure 5B:
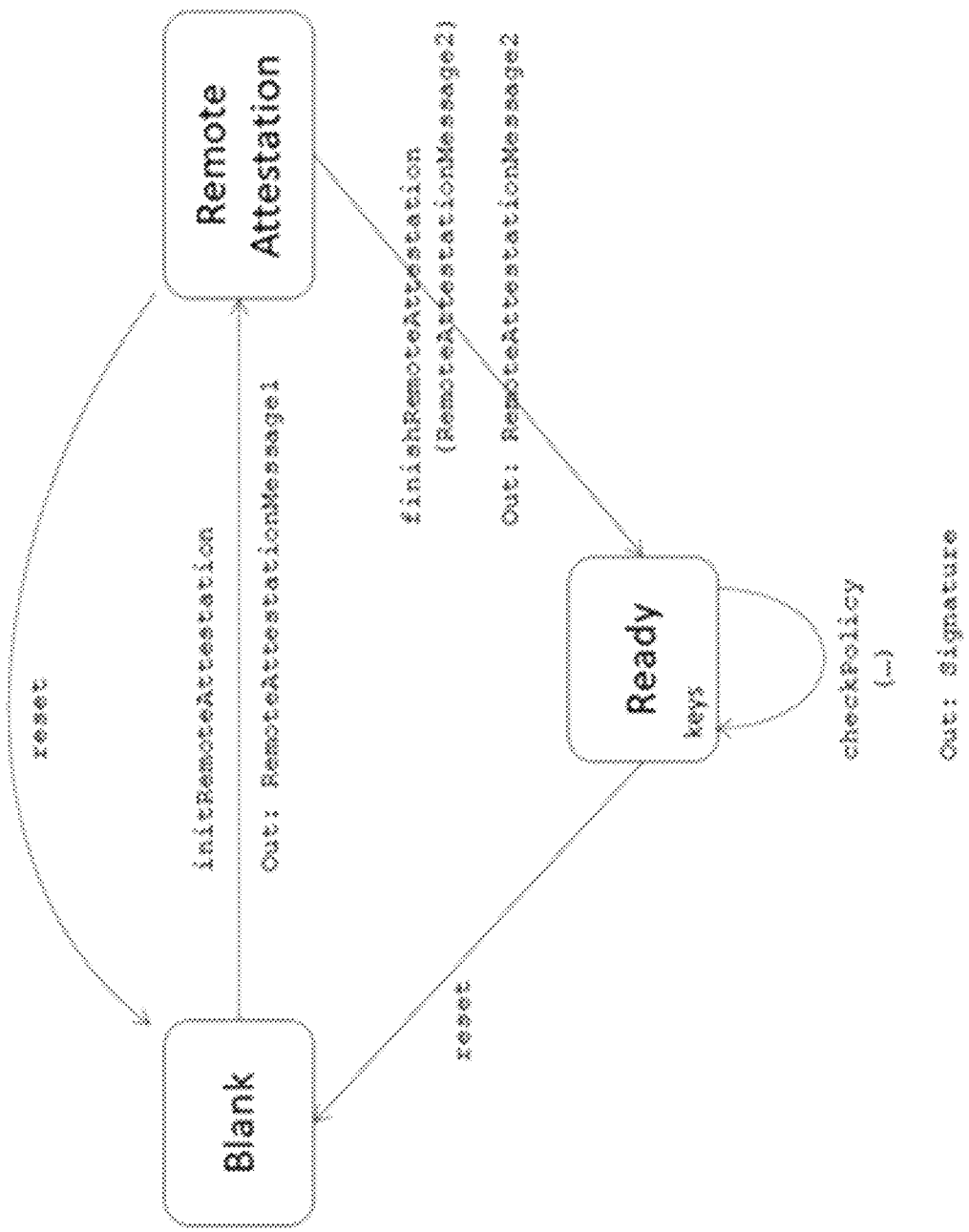
FIG. 5B is a state diagram of a verify oracle, according to some embodiments.

FIG. 5B is a state diagram of a verify oracle, according to some embodiments. The verify oracle can be implemented using software, hardware, or a combination thereof. For example, the states may be transitioned through the use of a processor configured to transition between one or more states, and to perform steps described below in conjunction with machine-interpretable instruction sets.

A Verify Oracle supports three states:
1. Blank: At this state, only the initRemoteAttestation call would be accepted. Then, the first remote attestation message will be generated the enclave goes to the Remote Attestation state.
2. Remote Attestation: At this state, the enclave accepts either a reset call or a finishRemoteAttestation call. Upon a reset call, the enclave clears all of its state data, as if it were killed and reloaded. Upon a finishRemoteAttestation call, the enclave consumes a Remote Attestation challenge message. The enclave produces a Remote Attestation message 3, generates the necessary key pairs and outputs the Remote Attestation message and the public keys. If any of this fails, it performs a reset operation.
3. Ready: This is the state wherein the enclave can actually evaluate policies over attributes. It can receive a checkProofRequest call, or a reset call.

Trust by Provers and Verifiers is assumed in all the previously described models as a common reference. Also, for obvious performance concerns, it is vital to be able to perform Remote Attestation on an enclave non-interactively. As such, the enclave's host can perform a publicly verifiable remote attestation with its enclave and publish the transcript to it. In order to do so, she may employ the Fiat-Shamir heuristic using the collision-resistant function H(.) modeled as a Random Oracle. If the Remote Attestation Verifier would normally use a probabilistic polynomial-time algorithm $m2 \leftarrow A(m1; r)$ to generate the second message, in this scenario the second message would be derived through $m_2 \leftarrow A(m_1; H(m_1))$.

A proof request can be defined in accordance with variations of the following examples.

The language describing policies should be simple to interpret so as not to expose the system to security risks.

In order to prevent the execution from leaking information about the attributes, the language should preclude programs with data-dependent access patterns, runtime and execution paths. Here, a C-like language called StraightTalk is described as an example, and it is only capable of describing straight-line programs:

| | | |
|---|---|---|
| (policy) | ::= | (token-definition) (statement)* (expression) |
| (token-definition) | ::= | ε |
| | \| | (token) '(' (variable-definition)* ')' |
| (variable-definition) | ::= | (type) (identifier-list) ';' |
| (identifier-list) | ::= | (identifier) |
| | \| | (identifier-list) ',' (identifier) |
| (type) | ::= | (basic-type) |
| | \| | (basic-type) '[' (integer) ']' |
| (basic-type) | ::= | 'unsigned' 'int' '[' (integer) ']' |
| | \| | 'int' '[' (integer) ']' |
| | \| | 'float' |
| (statement) | ::= | (variable-definition) |
| | \| | (expression)';' |
| (argument-list) | ::= | ε |
| | \| | (nonempty-argument-list) |
| (nonempty-argument-list) | ::= | ( (expression) ',')* (expression) |
| (expression) | ::= | (expression) '?' (expression) ':' (expression) |
| | \| | (expression) (binary-operator) (expression) |
| | \| | (unary-operator) (expression) |
| | \| | (function-like-operator) '(' (argument-list) ')' |
| | \| | '(' (expression) ')' |
| | \| | (string) |
| | \| | (base64) |
| | \| | (identifier)'['(integer)']' |
| | \| | (identifier)'['(integer)']''['(integer)']' |
| | \| | (identifier) |
| | \| | (number) |

| | | |
|---|---|---|
| (unary-operator) | ::= | '~' |
| | \| | '!' |
| (binary-operator) | ::= | '=' |
| | \| | '.=' |
| | \| | '+' |
| | \| | ... |

Figure 6A:
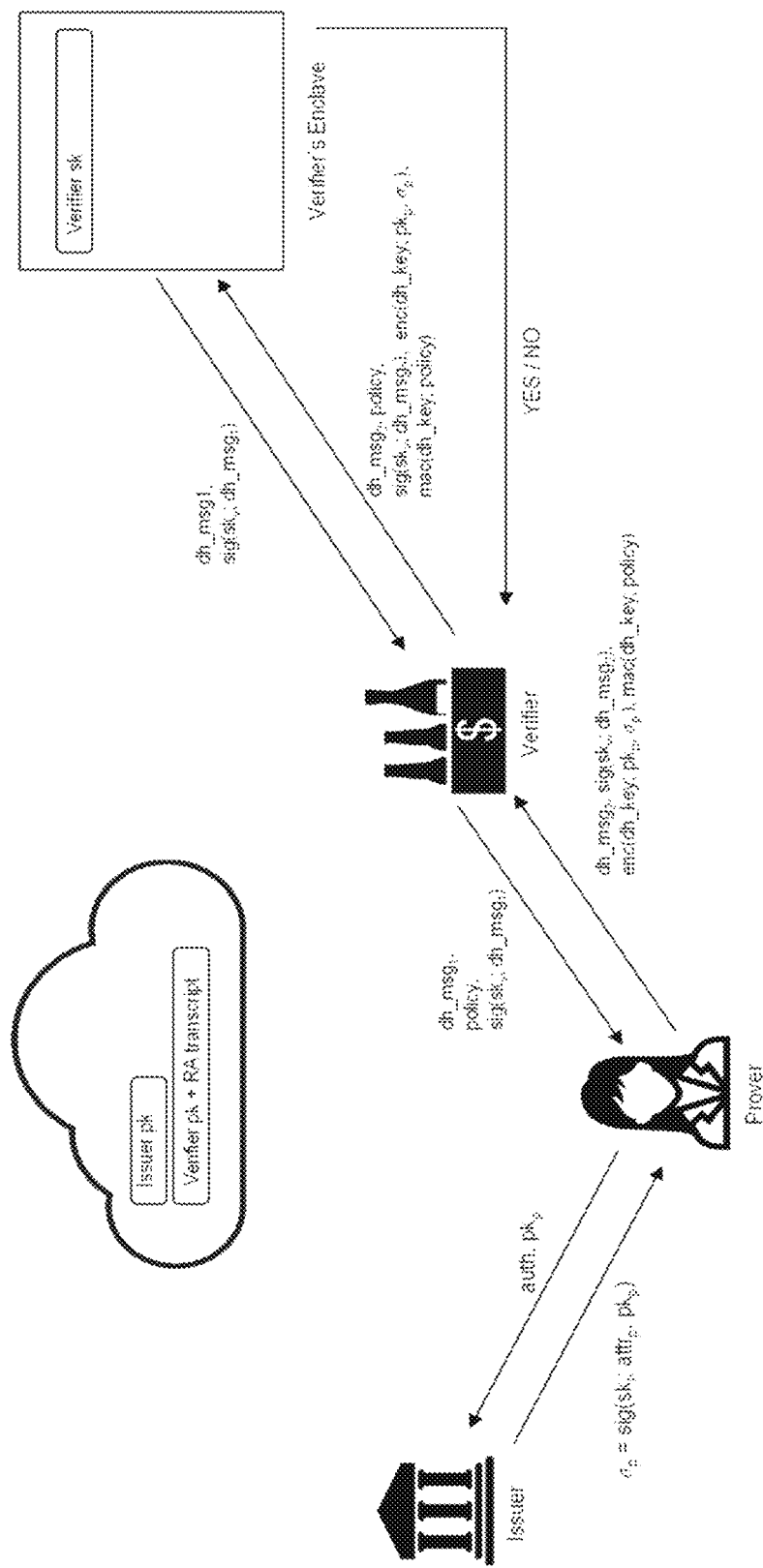
FIG. 6A is a system diagram providing additional detail in the context of a verifier hosted enclave, according to some embodiments.

FIG. 6A is a system diagram providing additional detail in the context of a verifier hosted enclave, according to some embodiments. As shown in FIG. 6A, the verifier enclave stores a secret key which is utilized in a flow of signed messages. The key encapsulation process, in various embodiments, includes 2-way or 1-way authenticated public key encryption.

Figure 6B:
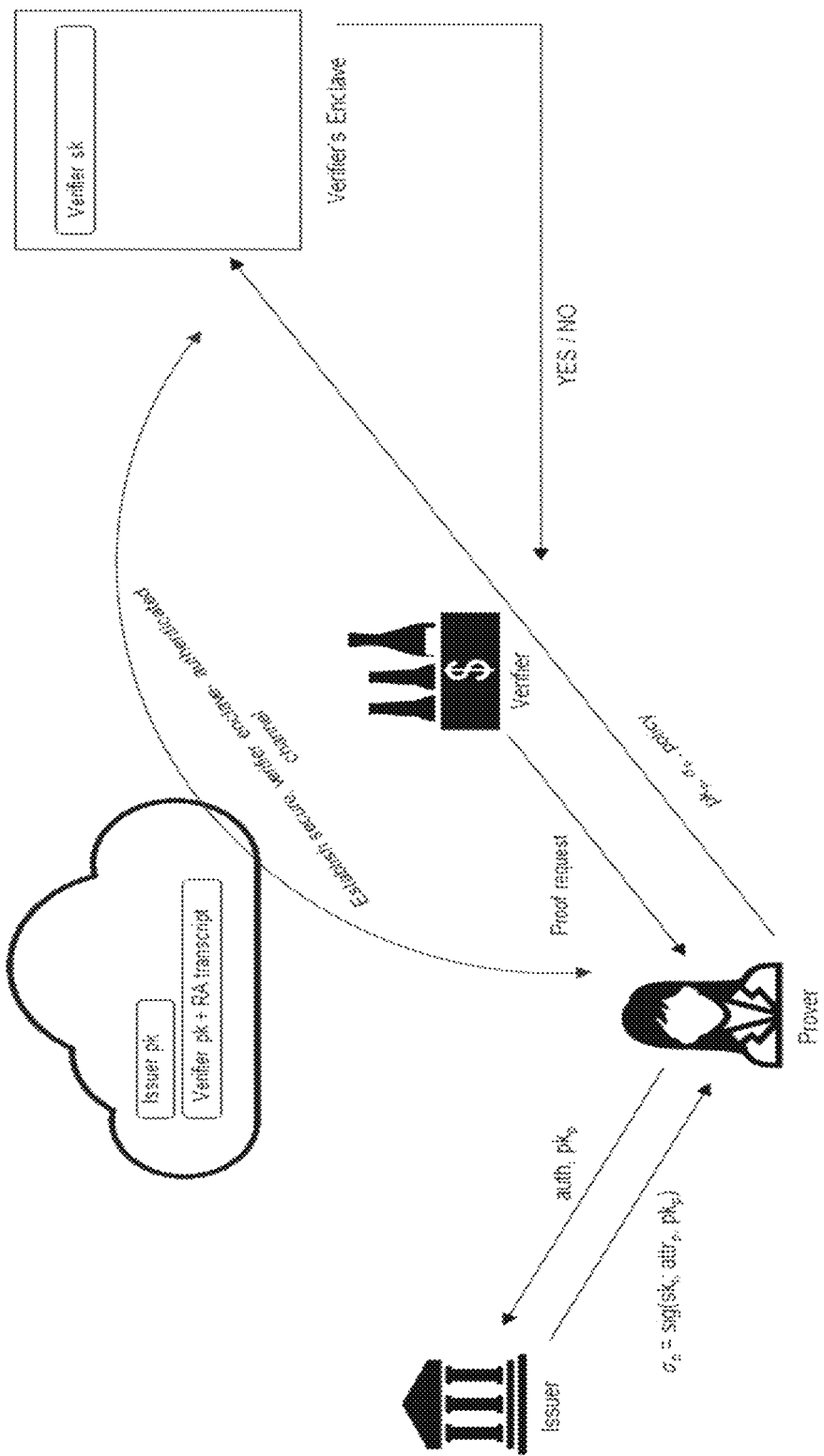
FIG. 6B is a system diagram providing a simplified variation of the system shown in FIG. 6A, according to some embodiments.

FIG. 6B is a simplified diagram providing additional detail in the context of a verifier hosted enclave, according to some embodiments. In FIG. 6B, the verifier receives the proof request, the proof request, and the proofs directly from the prover or prover device, and transmits a proof verification message to the verifier.

In this example, the secure enclave is adapted for processing encrypted credentials, challenges, and proof requests. The secure enclave can be a processor or a secured memory location that is configured for maintaining a verifier secret key utilized to generate a first signed message.

The verifier computing device receives, from a prover computing device, a second signed message including at least an enclosed issuer signed message representing one or more encrypted containers storing at least one or more characteristics of an identity profile of a prover entity along with a message authentication code based at least on the proof request data structure.

The verifier computing device then transmits the second signed message, the proof request data structure, and the one or more encrypted containers to the secure enclave.

The verifier computing device then receives a response data message from the secure enclave indicative of whether all of the one or more logical conditions were satisfied by the at least one or more characteristics of the identity profile of the prover entity. In some embodiments, the secure enclave is configured to provide publicly verifiable remote attestation with a verifiable threat model and a verifiable proof of security.

A remote attestation protocol involves a zero knowledge proof with a prover and a verifier, the enclave being the prover. A direct run of this protocol by both Identity Brokerage parties (prover and verifier) may compromise efficiency. Therefore, a mechanism is implemented using the Fiat-Shamir heuristic, and the enclave's maintainer is configured to run an instance of remote attestation in a publicly verifiable manner.

Instead of using actual random inputs, the remote attestation verifier (the enclave's maintainer) replaces every randomness with the output of a pseudorandom function applied to the entire protocol transcript up until that moment, and an arbitrary initial nonce. Thus, by presenting the transcript of this protocol instance, the enclave's maintainer can efficiently convince the identity brokerage parties that the enclave is a trustworthy one.

In some embodiments, the verifier enclave or a third party hosted system tracks records transcripts of an exchange, which are exposed to the public. For example, it may be the responsibility of a verifier computing system to run a remote attestation protocol with its enclave once whereby the enclave communicates its public key, which is then stored in on a transcript exposure module, which may be hosted by any one of the computing systems associated with any one of the parties or by a third party hosted system. In order to establish the honesty of the transcript, all the randomness used on the verifier's cryptography are to be created using a pseudorandom function (hash, block cipher, etc.) involving all or some of the information available to the verifier's computing device at a time of a credential validation transaction.

The secure enclave processor maintains a verification transcript in relation to its own credentials, as the enclave is wholly trusted by both the prover and the verifier, it should be strongly vetted itself.

Chip manufacturers provide mechanisms to verify an enclave involving multi-round interactive protocols. Remote attestation is a protocol based on bilinear group signatures, whereby an enclave proves to a third party that it is running on a legitimate Intel SGX platform, and that is running a particular program.

Figure 7:
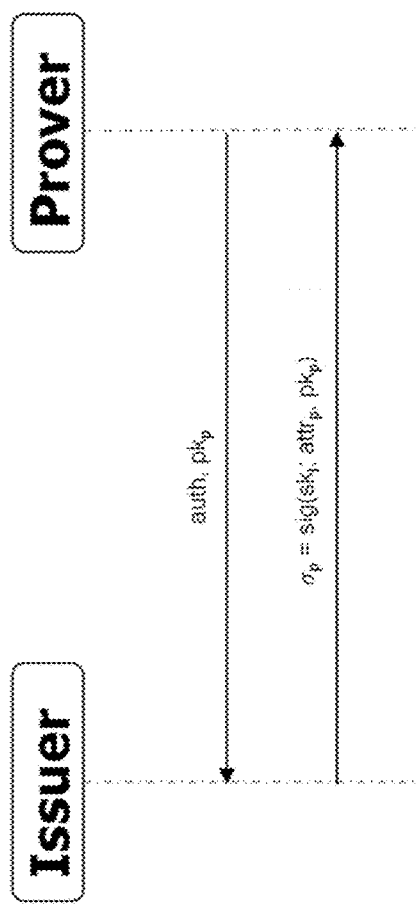
FIG. 7 is a method diagram providing an example issuer sequence where the prover computing system has a corresponding key pair, according to some embodiments. As described in later figures, the prover key is optional, but in some cases, the prover key pair helps prevent sharing or can be utilized to reduce an amount of data required to be held secret. The use of a key pair for the prover may be instrumental in preventing credential subletting, an abuse of the system whereby the prover shares some of their credentials with another for attribute impersonation.

FIG. 7 is a method diagram providing an example issuer sequence where the prover computing system has a corresponding key pair, according to some embodiments.

Figure 8:
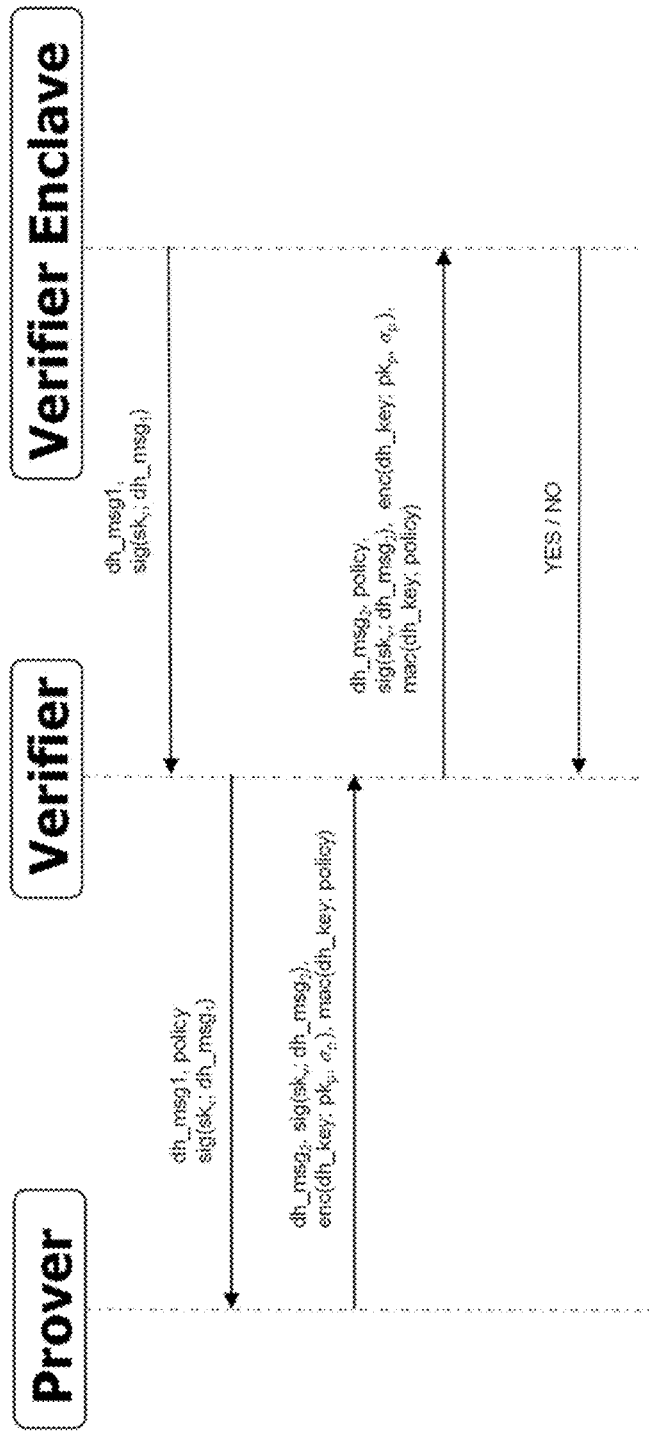
FIG. 8 is a method diagram providing an example verification sequence, where the prover computing system has a corresponding key pair, according to some embodiments.

FIG. 8 is a method diagram providing an example verification sequence, where the prover computing system has a corresponding key pair, according to some embodiments.

Figure 9:
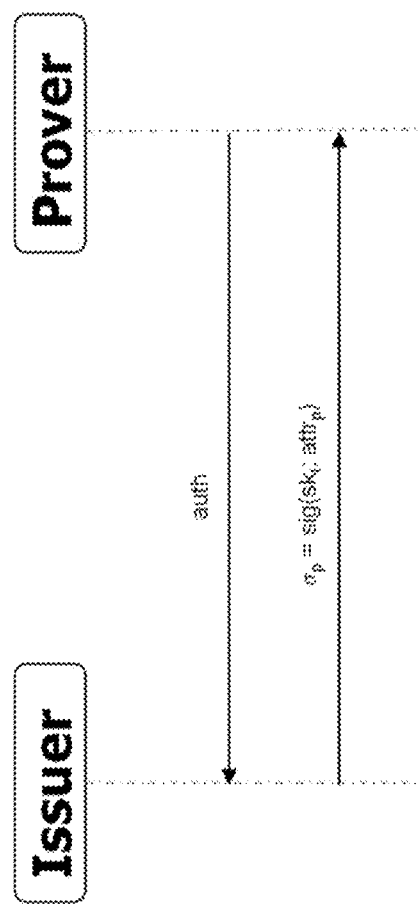
FIG. 9 is a method diagram providing an example issuer sequence where the prover computing system does not have a corresponding key pair, according to some embodiments.

FIG. 9 is a method diagram providing an example issuer sequence where the prover computing system does not have a corresponding key pair, according to some embodiments.

Figure 10:
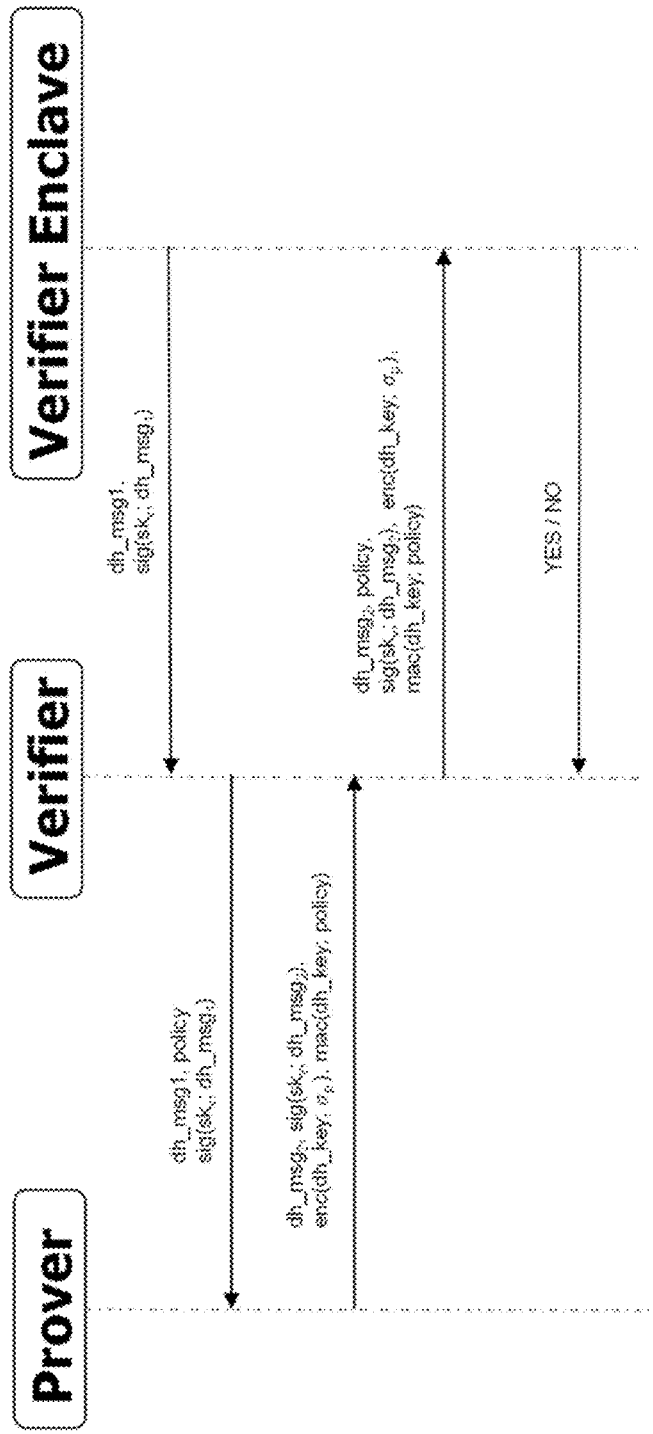
FIG. 10 is a method diagram providing an example verification sequence, where the prover computing system does not have a corresponding key pair, according to some embodiments.

FIG. 10 is a method diagram providing an example verification sequence, where the prover computing system does not have a corresponding key pair, according to some embodiments.

Figure 11:
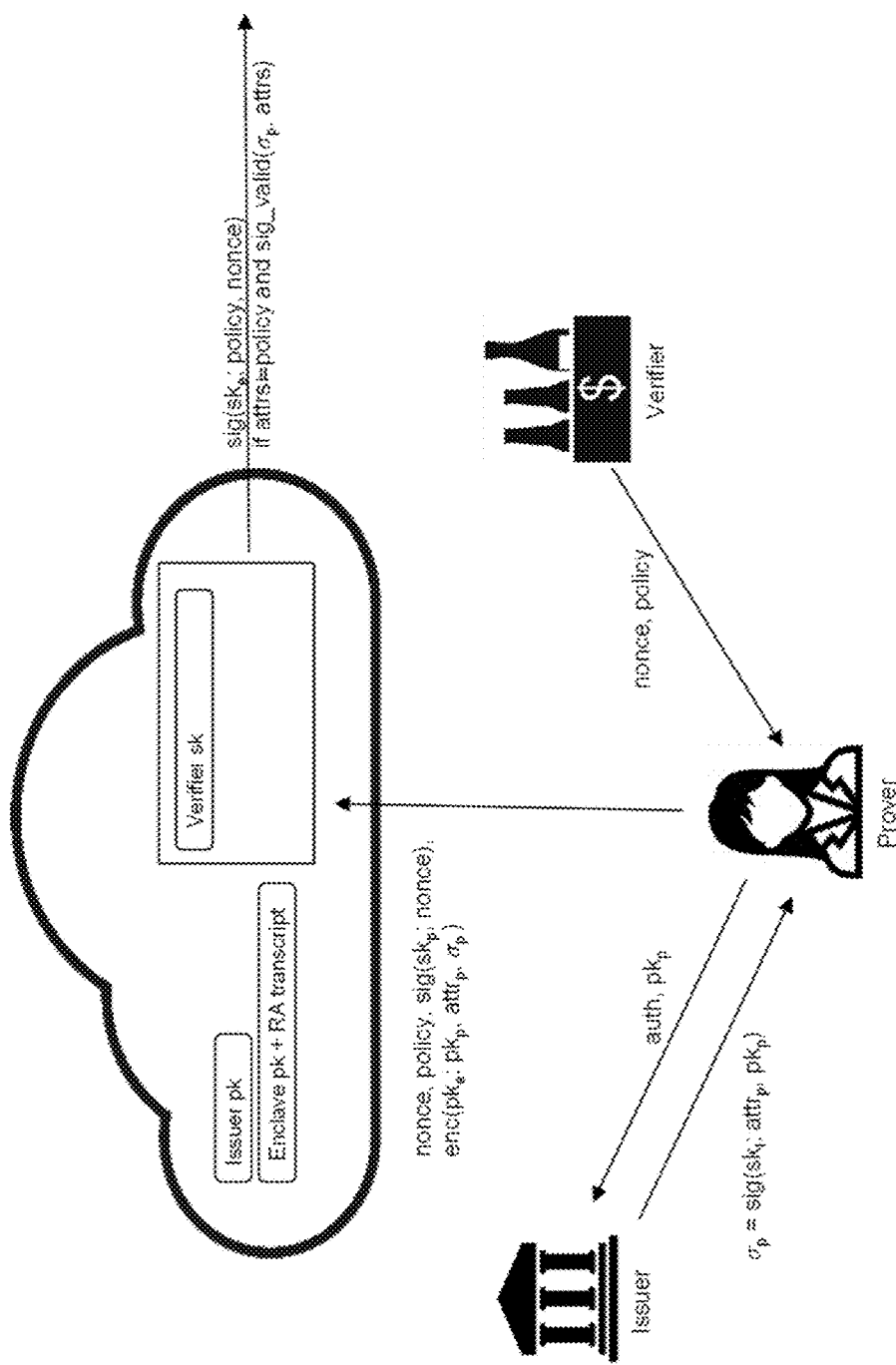
FIG. 11 is a system diagram providing an example verification system having a third party hosted enclave including a transcript, according to some embodiments.

FIG. 11 is a system diagram providing an example verification system having a third party hosted enclave, according to some embodiments.

FIG. 12 is an example C-based proof request description language, according to some embodiments. An example proof request is shown in FIG. 12, and other policies are possible. In some embodiments, the policies can be compiled from a simple C-like language only capable of writing straight-line non-branching programs.

Anonymous Credentials

In some circumstances, it is desirable to be able to provide credentials in an anonymous manner. For example, one may wish to be able to prove that they reside in a particular area without disclosing their address (e.g., that they reside within a radius of a particular place or location). For example, a local coffee shop may wish to provide loyalty pricing to local customers. Another example is only allowing people to vote on a local issue if they reside in a particular neighborhood. I.e., only provide access to a service or benefit to people that reside in a particular area without those residents having to disclose their address.

In some embodiments, the location may be determined within a radius from a location. In other embodiments, other shapes, such as triangles or rectangles may be used.

In some embodiments, polar coordinates (longitude and latitude) are used as a point for a particular location or a user's address. The polar coordinates of the user's address may be certified by an authority (e.g., department of motor vehicles) and inputted into a user-centric protocol (e.g., U-Prove) to determine a Commitment to the polar coordinate. The Commitment may then be inputted into a system to anonymously confirm that the Commitment is within a distance from a particular location (another e.g., polar coordinate). In some embodiments, the address coordinates and/or Commitments may be presented in the form of a token.

In some embodiments, a business may present a QR code to a customer to provide an extra service or benefit (e.g., cost reduction) based on the address of the customer. The customer's device that scanned the QR code could use a U-Prove presentation protocol to provide a commitment to their address provided by an authority. A verifier would then prove that the customer is within the geographic area for the business by confirming that the commitment is within a distance from the business.

Figure 13:
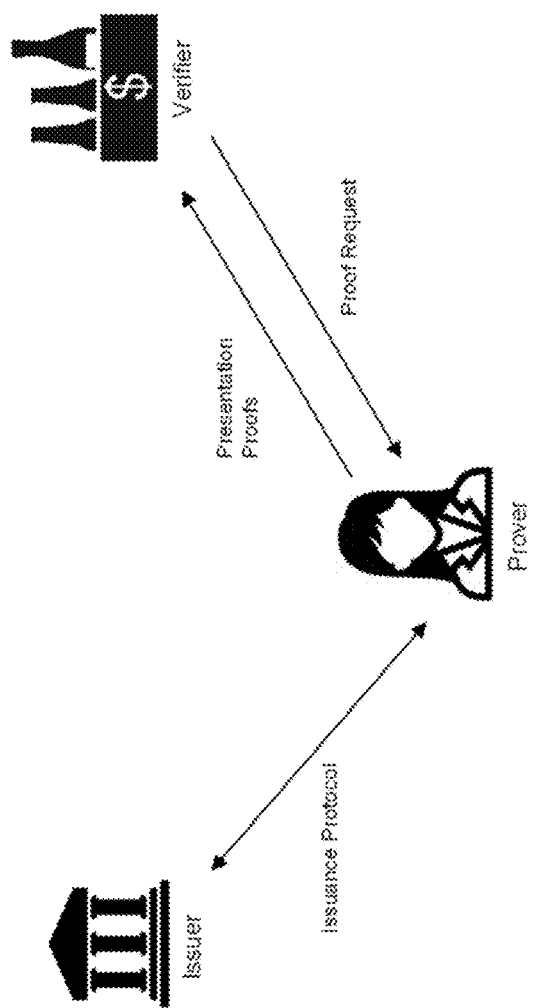
FIG. 13 is an example method diagram for an anonymous credentials approach, according to some embodiments.

FIG. 13 is an example method diagram for an anonymous credentials approach, according to some embodiments. The approach utilizes advanced cryptography for issuance and presentation protocols, and has relatively fewer infrastructure requirements and is unlinkable and flexible. Anonymous Credentials is aimed at solving the problem of identity brokerage through designs depending on cryptographic hardness assumptions.

In such an approach, a custom-built signature mechanism is used for the issuance protocol that is amenable with the type of zero-knowledge proofs of knowledge approaches used in the proof protocol. Notable examples are U-Prove (relying on Diffie-Hellman type hardness assumptions), Idemix (relying on RSA-type hardness assumptions) and later approaches based on bilinear maps.

Figure 14:
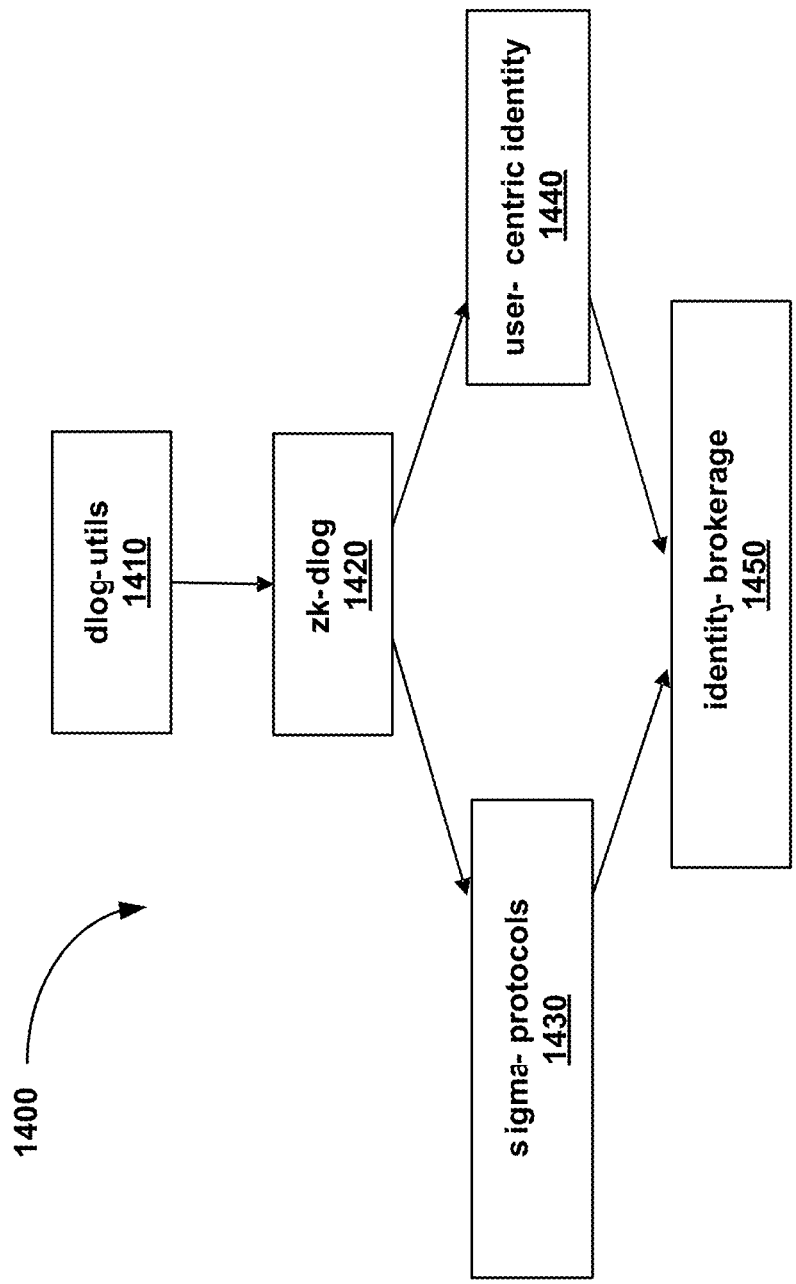
FIG. 14 illustrates, in a component diagram, an example of a module breakdown of an identity brokerage, in accordance with some embodiments.

FIG. 14 illustrates, in a component diagram, an example of a module breakdown of an identity brokerage 1400, in accordance with some embodiments. The identity brokerage 1400 comprises a d log-utils unit 1410, a zk-d log unit 1420, a sigma-protocols unit 1430, a user-centric identity unit 1440 (e.g., uprove) and an identity-brokerage unit 1450. The d log-utils unit 1410 may comprise prime-order groups, their associated $Z_p$ fields, standard generators, hash functions, etc. In some embodiments, the d log-utils unit 1410 may include the following classes: Group, Group Element, Field, Field Element, Vectors, Hash Functions, Randomizers and Test Utilities. The zk-d log unit 1420 may comprise basic data structures used in zero-knowledge protocols using discrete log (e.g., Pedersen Commitments), etc. In some embodiments, the zk-d log unit 1420 may include the Pedersen Commitment class. The sigma-protocols unit 1430 may include the following classes: Provers, Verifiers, Problems and Proofs. The sigma-protocols unit 1430 will be described in further detail below. An example of a user-centric identity module 1440 may comprise a bare bone implementation of the U-Prove Issuance and Presentation protocols. The identity-brokerage unit 1450 may put all the units together, hiding the cryptography from the user.

In some embodiments, a token is a list of integers with structure. Table 1 illustrates an example of a token:

TABLE 1

| Example 1 of a Token | | | | | | | |
|---|---|---|---|---|---|---|---|
| Name #1 | Value #1 | Name #2 | Value #2 | Name #3 | Value #3 | Name #4 | Value #4 |
| First Name | Frederick | Last Name | Krueger | Occupation | Nightmare Monster | Work Address | 1428 Elm Street |

Table 2 illustrates another example of a token where the first attribute is dedicated to describing the token's structure:

TABLE 2

| Example 2 of a Token | | | | |
|---|---|---|---|---|
| Token Structure | Value #1 | Value #2 | Value #3 | Value #4 |
| ["First Name", "Last Name", "Occupation", "Work Address"] | Frederick | Krueger | Nightmare Monster | 1428 Elm Street |

With respect to security, the first example of Table 1 only reveals the number of attributes in a token, while the second example of Table 2 also reveals the entire structure of the token.

With respect to performance, the first example of Table 1 requires double the number of actual attributes, while the second example of Table 2 only demands one extra attribute.

Σ-Protocols

The sigma-protocol unit 1430 will now be described in more detail.

A sigma-protocol (Σ-protocol) is a schema for proving knowledge of a witness w to an NP-Statement x∈L. It comprises the following three moves:

1. Commitment: The prover sends commitments to random values (referred to as "masks" herein) to the verifier.
2. The verifier sends a random challenge back to the prover.
3. The prover provides a response incorporating the mask values, the witness and the challenge.

The verifier accepts if and only if the components of their view satisfy a certain polynomially-verifiable relation. The view includes are the problem statement P(x) and the three messages exchanged.

A Σ-protocol should also satisfy the following properties:
1. Special Soundness: An extractor can extract a witness from two accepting transcripts of the protocol with equal commitments and different challenges.
2. Special Honest Verifier Zero Knowledge: An honest verifier can generate transcripts identically distributed as an actual execution of the protocol, given a challenge.

It should be noted that the concept of a Σ-protocol is much broader than the algebraic cases used in this solution. Namely there is very little limitation on the mathematical nature of the NP-Statement to be proven, its witness, and the commitment scheme in use.

It should also be noted that it is not sufficient for the challenge to be unique. It should be unpredictable. From the Special Zero Knowledge property it follows that a malicious prover can fool a verifier if able to guess the challenge prior to commitment generation.

It should also be noted that even though a proof of knowledge, a Σ-protocol is not necessarily zero-knowledge, nor composable in parallel.

Composing Σ-Protocols
Disjunction

In some embodiments, in order to prove that at least one of the two statements A and B is true, the prover proves one (one that is actually true) and simulates the other (which the zero knowledge property guarantees to be possible, regardless of its truth). In order to allow the prover to simulate one and only one of the two, for each verifier challenge c an efficient and efficiently invertible bijective function $f_c$: C→C, where C is the set of possible challenges is devised. The prover may use arbitrary challenges $c_1$ and $c_2$ for its subproofs, as long as $c_2 = f_c(c_1)$. Intuitively, the prover can fix one of the challenges and generate bogus commitments. After receiving the uniformly random verifier challenge, the prover will be bound to a uniformly distributed challenge for the other statement, which forces it to try and prove it honestly.

Special Soundness:

Imagine two accepting executions of the proof with the same mask commitments and different verifier challenges. Represent the two transcripts as $((R_1, c_1, z_1), (R_2, c_2, z_2))$ and $((R'_1, c'_1, z'_1), (R'_2, c'_2, z'_2))$. We have the following:

$$R_1 = R'_1$$

$$R_2 = R'_2$$

$$c_1 + c_2 \neq c'_1 + c'_2 \Rightarrow c_1 \neq c'_1 \text{ or } c_2 \neq c'_2.$$

Without loss of generality, let us assume that $c_1 \neq c'_1$. Because $(R_1, c_1, z_1)$ and $(R_1, c'_1, z'_1)$ are both accepting transcripts, a witness $w_1$ can be extracted for the first statement, demonstrating that the prover knew it was true, as well as a witness to its truth.

Special Zero-Knowledge:

The simulator can sample c and $c_1$ in advance and derive $c_2$ from the two. Because the protocols for the sub-statements are zero-knowledge, the simulator can output $(R_1, c_1, z_1)$ and $(R_2, c_2, z_2)$ that are indistinguishable from honest transcripts, given the challenges. But $c_1$ and $c_2$ are uniformly distributed, therefore the simulated transcripts are indistinguishable from honest transcripts.

Cost:

The computational overhead is negligible compared to that of providing the honest and simulated proofs, both in providing honest or simulated proofs and verifying them.

Communication has an overhead of the prover sending one of the sub-challenges to the verifier.

It should be noted that the necessity of actually implementing proof simulators to build disjunction provers makes their efficiency relevant. Therefore, most complexity analyses in this document will include an estimation of the work required to simulate a proof.

It should also be noted that such differences do not enable timing attacks when disjunctions of two statements of the same form are proven. However, whenever $P_1 \lor P_2$ is to be proven, care should be taken to ensure that the timing difference between honest $P_1$ and simulated $P_1$ is the same as the timing difference between honest $P_2$ and simulated $P_2$. In other words, in order to maintain zero knowledge one needs to guarantee that $$t_{P_1} + t_{P_2}^{sim} = t_{P_1}^{sim} + t_{P_2} \Leftrightarrow t_{P_1}^{sim} - t_{P_1} = t_{P_2}^{sim} - t_{P_2}.$$

Conjunction

One may need to prove knowledge of all statements $P_1, \ldots, P_N$, each with their own Σ-protocol. That is simply achieved through synchronizing the execution of their proof protocols. Meaning that all commitments $R_1, \ldots, R_N$ are sent first and the same challenge c is used to provide all responses $z_1, \ldots, z_N$.

Special Soundness:

Take two accepting transcripts $(R_1, \ldots, R_N, c, z_1, \ldots, z_N)$ and $(R_1, \ldots, R_N, c', z'_1, \ldots z'_N)$. From the soundness of each sub-protocol we deduce that all $w_n$'s can be extracted.

Special Zero-Knowledge:

Given the challenge c beforehand, the sub-simulators can each create honest-looking transcripts $(R_n, c, z_n)$. Clearly a sequence of such transcripts will also be honest-looking.

From Σ to ZKPoK

A Σ-protocol is not guaranteed to be Zero Knowledge. However, under certain black-box transformations, a Σ-protocol can be converted into a Zero Knowledge Proof of Knowledge (ZKPoK).

One such transformation uses the Fiat-Shamir heuristic. Prior to the execution of the Σ-protocol, the verifier hands the prover a challenge string, later used in generating the Σ-protocol challenge. The main body of the protocol is made non-interactive, as the prover self-generates the challenge by hashing together the verifier-provided challenge string and its own commitments.

Roughly speaking, by having both parties contribute freshness to the hash input, the challenge is guaranteed to be unpredictable, in the sense that neither can guarantee any meaningful relation between the prover commitments and the challenge with non-negligible probability, essentially incapacitating them both from cooking up any mischief. With both parties limited to honest behavior, the special soundness and special zero knowledge properties suffice to guarantee the zero knowledge and proof of knowledge conditions.

It should be noted that the challenge string provided by the verifier need not be random; uniqueness suffices.

Zero-Knowledge:

The transcript of an honest prover's interaction with any verifier is identically distributed as with an honest verifier. Since good randomness from the prover alone suffices to guarantee randomness of the challenge, regardless of what the verifier contributes into the hash input, the challenge will be honestly produced.

An honest prover's view under the Σ-protocol is identically distributed as that under the transformed protocol.

Proof of Knowledge:

In a Random Oracle model, we can rewind the challenge creation step and have two distinct challenges that the prover can successfully respond to.

By making the protocol non-interactive, the transformation also addresses the issue of composability. Reducing the number of messages from 3 to 2 somewhat trivially guarantees parallel composability. Moreover, all zero-knowledge protocols are sequentially composeable.

This makes Σ-protocols very valuable tools, mainly because proving Special Soundness and Special Honest Verifier Zero Knowledge is much easier than proving Arbitrary-Verifier Zero Knowledge and Proof of Knowledge.

Algebraic Implementations

Operations are carried out in a prime order group G and the field $\mathbb{Z}_{|G|}$ of integers modulo its size. This group has at least two publicly known elements g and h, along with a hash function H. The security of our constructions depends on the following properties.

Security Assumptions

In some embodiments, the following assumption are made:
1. Generator Independence: No efficient algorithm can output nonzero vector $[w_1\ w_2]$ such that $g^{w_1}h^{w_2}=e$.
2. Discrete Log Hardness: No efficient algorithm can output r given $h^r$ for exponentially many uniformly sampled $r \in \mathbb{Z}_{|G|}$.
3. There is a publicly known hash function H: (Verifier-Challenge, $G^*$)$\to \mathbb{Z}_{|G|}$, that can be used to transform a $\Sigma$-protocol on G into a ZKPoK under the Fiat-Shamir heuristic. A $\Sigma$-protocol operates on G iff $R \in G, \{c,z\} \subset \mathbb{Z}_{|G|}$ for all its executions.

Schnorr Signature

This protocol allows an entity to prove knowledge of the discrete log x (private key) of a group element $X=g^x$ (public key) by providing a valid response (signature) to a challenge (message). The non-interactive version of this protocol can serve as a signature scheme with the verifier challenge serving as the message to be signed.

As a $\Sigma$-protocol, the following steps are to be taken:
1. Prover randomizes mask r and provides $R=g^r$.
2. Prover receives challenge $c \in F_{|G|}$.
3. Prover sends $z=cx+r$.
4. Verifier accepts iff $g^z=RX^c$.

Completeness is evident. The following proves security:

Special Soundness:

Imagine two distinct transcripts with identical commitment and different challenges.

$$X^{-c1}g^{z1}=X^{-c2}g^{z2}=R \Leftrightarrow X^{c1-c2}=g^{z1-z2} \Leftrightarrow X=g^{(z1-z2)(c1-c2)^{-1}}.$$

Thus, a witness can be extracted.

Special Zero-Knowledge:

To counterfeit an accepting transcript, the simulator can first randomize the challenge and the response c, $z \in F_{|G|}$. It then generates fake mask commitment:

$$R=g^z X^{-c}.$$

It should be noted that, in some cases the simulator may be given the challenge c. Therefore, it's best to prove the slightly stronger result that a simulator can generate transcripts that are indistinguishable from honest ones given the challenge.

The following proves that real and fake transcripts are identically distributed:

Random variables are represented with boldface capital letters. C, Z and R represent the challenge, response and the mask respectively.

In both cases, the challenge is uniformly distributed. In other words, $C \sim U(\mathbb{Z}_{|G|})$.

In the counterfeit case, the response is generated independently of the challenge, therefore $Z|C \sim U(\mathbb{Z}_{|G|})$.

In the honest case, the response is obtained by adding a uniformly randomized r to a fixed multiple of c. Therefore, in that case also we have $Z|C \sim U(\mathbb{Z}_{|G|})$.

In both cases, R is uniquely determined from c, z and X. Therefore, the random variable (Z, C, R) is identically distributed across the two cases.

Thus the protocol is Honest-Verifier Zero Knowledge in the strongest sense, namely, information theoretically.

Computational Complexity:

TABLE 3

|  | Group exponentiation | Group composition | Field Multiplication | Field randomization |
|---|---|---|---|---|
| Prover | 1 | 0 | 1 | 1 |
| Simulator | 2 | 1 | 0 | 1 |
| Verifier | 2 | 1 | 0 | 0 |

Note on Complexity

All complexity estimates ignore the process of creating and communicating the challenge, because it can be amortized. Moreover, sometimes it is handed down from another protocol.

Note on Computational Complexity

Every group exponentiation involves $\theta(\log|G|)$ group doublings and compositions. This number is considerable, at least about 256.

Every group doubling or composition in turn, involves a constant number of Field multiplications and inversions.

And finally, every field multiplication involves $\theta(\log|G|)$ field additions, which is again at least about 256. This means that compared to a group exponentiation, a field addition, subtraction or negation takes a negligible $2^{-16}=0.000015$ time and effort. Therefore, to save ourselves and the readers a fair bit of misery, we shall hereon dismiss basic field operations as inexpensive, reasonably certain that our analysis will not suffer much.

Communication Complexity 1 field and 1 group element.

Note on Communication Complexity

In many contexts, we may assume that transmitting a group element requires more or less the same number of bits as a field element does. Even so, more work may be required on the receiver's side to reconstruct a representation amenable to manipulation.

Generalized Schnorr's

Schnorr's signature can be naturally extended to efficiently prove knowledge of a group element X's discrete logarithm based multi-generator set $\{g_n\}$. In addition, the prover may want to prove that some of these exponents are equal.

Prover knows $X=\prod_{n=1}^{N} g_n^{x_{i(n)}}$, where i(n): $\mathbb{N}_N \to \mathbb{N}_l$ surjectively maps an exponent's index to that of its equality class. That is to say, there are $l \leq N$ equality classes, indexed from 1 to l.

The prover does the following:
1. For each equality class i sample $$r_i \xleftarrow{U} \mathbb{Z}_{|G|}$$

2. Send the commitment $R=\prod_{n=1}^{N} g_n^{r_{i(n)}}$
3. Receive challenge $c \in \mathbb{Z}_{|G|}$.
4. For each equality class i send the response $z_i=cx_i+r_i$ The verifier accepts if and only if $RX^c=\prod_{n=1}^{N} g_n^{z_{i(n)}}$.

Special Soundness:

Consider two transcripts $(R,c,z_1,\ldots z_l),(R,c',z'_1,\ldots z'_l)$. We have:

$$R = X^{-c} \prod_{n=1}^{N} g^{z_{i(n)}} =$$

-continued $$X^{-c'} \prod_{n=1}^{N} g^{z'_{i(n)}} \Rightarrow X^{c-c'} = \prod_{n=1}^{N} g^{z_{i(n)}-z'_{i(n)}} \Rightarrow X = \prod_{n=1}^{N} g^{(z_{i(n)}-z'_{i(n)})(c-c')^{-1}}$$

This gives us witnesses $x_n = (z_{i(n)} - z'_{i(n)})(c-c')^{-1}$, such that for every n, n' with $i(n)=i(n')$ we have $x_n = x'_n$.

Notice the one-sidedness of the above implication. It is not at all asserted that variables belonging to distinct equality classes hold distinct values.

Special Zero-Knowledge:

For a given challenge $c \in \mathbb{Z}_{|G|}$, the simulator uniformly samples $z_1, \ldots z_I$ and computes $R = X^{-c} \prod_{n=1}^{N} g^{z_{i(n)}}$.

This is identically distributed as an honest transcript. Given a challenge c, the $z_i$s are completely masked by the $r_i$s and therefore uniformly distributed. Finally, as in the simulated case, the commitment R is uniquely determined by the challenge and the responses.

Computational Complexity:

TABLE 4

| | Group exponentiation | Group composition | Field Multiplication | Field randomization |
|---|---|---|---|---|
| Prover | N | N − 1 | I | I |
| Simulator | N + 1 | N | 0 | I |
| Verifier | N + 1 | N | 0 | 0 |

Communication Complexity:

I field and 1 group elements.

Proving Knowledge of a Pedersen Commitment

Proving, verifying and simulating knowledge of commitment $X = g^x h^r$ is reduced to Generalized Schnorr's with the following parameters:

TABLE 5

| Parameter | N | I | $g_1$ | $g_2$ | $x_1$ | $x_2$ |
|---|---|---|---|---|---|---|
| Value | 2 | 2 | g | h | x | r |

Computational Complexity:

TABLE 6

| | Group exponentiation | Group composition | Field Multiplication | Field randomization |
|---|---|---|---|---|
| Prover | 2 | 1 | 2 | 2 |
| Simulator | 3 | 2 | 0 | 2 |
| Verifier | 3 | 2 | 0 | 0 |

Communication Complexity:

2 field and 1 group elements.

Soundness of the Pedersen Commitment Scheme:

If a prover can open a commitment in two ways $g^x h^r = C = g^{x'} h^{r'}$, we have $g^{x-x'} = h^{r'-r}$. From the assumption that the prover does not know the relative discrete log of g and h, we infer that $x - x' = r' - r = 0$.

Very Generalized Schnorr's

This is called an "Equality Map" in the Microsoft Specifications. The problem is to prove knowledge of the discrete logarithm of a set of group elements $\{X_m\}$ as $$X_m = \prod_{n=1}^{N} g_n^{x_{mn}}$$

Moreover, there is an "equality map" as common input, taking the index of an exponent to that of a witness:

$$I: \mathbb{N}_M \times \mathbb{N}_N \to \mathbb{N}_I \cup \{0\}$$

$$x_{mn} = w_{I(m,n)}$$

$$w_0 = 0$$

The symbol I stands for the equality map as well as the number of non-trivial witnesses. It should be clear from context which is meant.

The prover performs the following:

1. For $i \in \mathbb{N}_I$, sample $$r_i \xleftarrow{U} \mathbb{Z}_{|G|}.$$

$r_0 = 0$ by convention.

2. For $m \in \mathbb{N}_M$, send $R_m = \prod_{n=1}^{N} g_n^{r_{I(m,n)}}$.

3. Receive challenge $c \in \mathbb{Z}_{|G|}$.

4. For $i \in \mathbb{N}_I$, send back $z_i = cw_i + r_i$. $z_0 = 0$ by convention. The verifier accepts if and only if $X_m^c R_m = \prod_{n=1}^{N} g_n^{z_{I(m,n)}}$ for all $m \in \mathbb{N}_M$.

Special Soundness:

This follows naturally from the special soundness of Generalized Schnorr's. Intuitively, the relevant witnesses for each discrete log relation can be extracted independently of the others. Consistency is still guaranteed.

Special Zero-Knowledge:

Given group elements $\{X_m\}$, challenge c and equality map I, the simulator samples $$z_i \xleftarrow{U} \mathbb{Z}_{|G|},$$

sets $z_0 = 0$ and for $m \in \mathbb{N}_M$ computes $R_m = X_m^{-c} \prod_{n=1}^{N} g_n^{z_{I(m,n)}}$.

Similarly to previous arguments, in both simulated and genuine cases, the set $\{z_i\}$ is uniform and independent of the challenge c, and the set $\{R_m\}$ is uniquely determined given the two. Therefore, those cases are identically distributed.

Computational Complexity:

Consider the set $E = \{(i, n) | \exists m: I(m,n) = i\}$. One may say $|E| \leq MN$.

Here we make an additional assumption that was not essential to the security analysis but makes complexity analysis easier.

$$\forall m \in \mathbb{N}_M : \exists n: I(m,n) \neq 0$$

That is, none of the discrete log witness vectors are trivially zero.

TABLE 7

|  | Group exponentiation | Group composition | Field Multiplication | Field randomization |
|---|---|---|---|---|
| Prover | $|E|$ | $|E| - M$ | I | I |
| Simulator | $|E| + M$ | $|E|$ | 0 | I |
| Verifier | $|E| + M$ | $|E|$ | 0 | 0 |

Communication Complexity:

I field and M group elements.

Commitment Equality Proof

In order to prove equality of two commitments $X_1 = g^{x_1} h^{r_1}$ and $X_2 = g^{x_2} h^{r_2}$, it is more efficient to devise a specially tailored proof scheme rather than using the generic equality map.

Both parties simply compute $X_\Delta = X_1 X_2^{-1} = g^{x_1 - x_2} h^{r_1 - r_2} = g^{x_\delta} h^{r_\delta}$. The prover proves knowledge of $\log_h X_\Delta$.

Special Soundness:

From the special soundness of Schnorr's it follows that the extractor can compute $r_\delta$ such that $X_\Delta = h^{r'_\delta}$. Assuming that the prover has knowledge of $X_1$ and $X_2$ as valid commitments, it should be able to compute $g^{x_\delta} h^{r_\delta} = h^{r'_\delta} \Leftrightarrow g^{x_\delta} h^{r_\delta - r'_\delta} = 1$. Because the prover doesn't know $\log_g h$, it must be that $x_1 - x_2 = x_\delta = 0$.

Note that this soundness guarantee is only valid if it is already ascertained that the input commitments are valid, which is not the case with the generic equality map.

Special Zero-Knowledge:

This follows directly from the zero-knowledge property of Schnorr's.

Complexity:

The simulator computes $X_\Delta = X_1 X_2^{-1}$ and simulates a Schnorr's. This results in 2 randomizations, 2 exponentiations and one extra composition. Therefore we have an extra exponentiation.

TABLE 8

|  | Group exponentiation | Group composition | Field Multiplication | Field randomization |
|---|---|---|---|---|
| Prover | 1 | 1 | 1 | 1 |
| Simulator | 2 | 2 | 0 | 1 |
| Verifier | 2 | 2 | 0 | 0 |

Commitment Non-Zeroness Proof

In order to prove for a commitment $X = g^x h^r$ that $x \neq 0$, we only need to prove the existence of a multiplicative inverse for x, namely $g = X^{x^{-1}} h^{-rx^{-1}}$. In other words, it suffices to prove the discrete log of g base X and h.

Special Soundness:

$$g = X^a h^b = (g^x h^r)^a h^b = g^{xa} h^{ra+b} \Leftrightarrow g^{xa-1} = h^{-ra-b}$$

Since the prover doesn't know a nontrivial discrete log relation between the generators, this guarantees that $xa - 1 = 0$. Therefore, a is the multiplicative inverse of x, guaranteeing that x is nonzero.

Special Zero Knowledge:

This follows directly from the zero knowledge property of the knowledge of commitment protocol.

Complexity:

To set up the discrete log proof, the prover needs to compute $x^{-1}$ and $-rx^{-1}$, requiring one field inversion and one multiplication only. The verifier and simulator need no additional setup.

TABLE 9

|  | Group exponentiation | Group composition | Field Inversion | Field Multiplication | Field randomization |
|---|---|---|---|---|---|
| Prover | 2 | 1 | 1 | 3 | 2 |
| Simulator | 3 | 2 | 0 | 0 | 2 |
| Verifier | 3 | 2 | 0 | 0 | 0 |

Inequality Proof—Known Value

Given $X = g^x h^r$ and $Y = g^y$, with y common to both parties and x and r private to the prover, one can prove $x \neq y$ by carrying out a non-zeroness proof on $XY^{-1} = g^{x-y} h^r$.

As a side effect, this also proves knowledge of x and r.

Special Soundness:

An extractor can obtain $x - y$ and r, with the guarantee that $x - y \neq 0$. From that x can also be determined.

Special Zero-Knowledge:

$XY^{-1}$ is uniquely determined from common inputs X and $Y^{-1}$ and the subprotocol it is handed to is special zero-knowledge; thus so is this protocol.

Complexity:

TABLE 10

|  | Group exponentiation | Group composition | Field Inversion | Field Multiplication | Field randomization |
|---|---|---|---|---|---|
| Prover | 2(3) | 2 | 1 | 3 | 2 |
| Simulator | 3(4) | 3 | 0 | 0 | 2 |
| Verifier | 3(4) | 3 | 0 | 0 | 0 |

There may be an additional exponentiation required if a party doesn't have $Y = g^y$ cached.

Inequality Proof Unknown Values

This works very similarly as with known values. Group elements $X_1$ and $X_2$ are common input, and private to the prover are $\mathbb{Z}_{|G|}$ elements $x_1, x_2, r_1, r_2$ such that $X_1 = g^{x_1} h^{r_1}$ and $X_2 = g^{x_2} h^{r_2}$.

To prove that $x_1 \neq x_2$, the parties both compute $X_\Delta = X_1 X_2^{-1}$. The prover also computes $x_\Delta = x_1 - x_2$ and $r_\Delta = r_1 - r_2$ and proves that $x_\Delta$ is not zero using the commitment non-zeroness proof.

Note that this protocol doesn't prove knowledge of the witnesses $x_1, x_2, r_1$ and $r_2$.

Complexity:

TABLE 11

|  | Group exponentiation | Group composition | Field Inversion | Field Multiplication | Field randomization |
|---|---|---|---|---|---|
| Prover | 2 | 2 | 1 | 3 | 2 |
| Simulator | 3 | 3 | 0 | 0 | 2 |
| Verifier | 3 | 3 | 0 | 0 | 0 |

Bit Commitment Proof

Pedersen commitments to bits will play a role in future sections, when comparison of two numbers is of concern.

The commitment is of the form $C=g^b h^r$, where $b \in \{0, 1\}$ and $r \in \mathbb{Z}_{|G|}$. In order to prove that such a commitment is well-formed (that b is indeed a bit) we may have the following:

$$b \in \{0, 1\} \Leftrightarrow \begin{cases} b = 0 \text{ or} \\ b = 1 \end{cases} \Leftrightarrow \begin{cases} C = h^r \text{ or} \\ C = gh^r \end{cases} \Leftrightarrow \begin{cases} C = h^r \text{ or} \\ Cg^{-1} = h^r \end{cases}$$

Therefore a disjunction of knowing the discrete log of either C or $C_g^{-1}$ base h does the trick.

Complexity:

The prover and the verifier both do the additional work of computing $C_g^{-1}$; namely, an additional group composition.

This results in 3 field randomizations, 3 group exponentiations and 1 composition for the prover, as well as 4 group exponentiations and 3 compositions for the verifier.

There is no additional communication cost.

TABLE 12

|  | Group exponentiation | Group composition | Field Multiplication | Field randomization |
| --- | --- | --- | --- | --- |
| Prover | 3 | 2 | 1 | 3 |
| Simulator | 4 | 3 | 0 | 3 |
| Verifier | 4 | 3 | 0 | 0 |

It should be noted that the computational burden on the verifier is less important, because it is less likely to be implemented on a mobile device.

Bit Decomposition Proof

Certain properties of committed attributes cannot be naturally expressed using algebraic techniques so far covered in this document. Comparing two numbers is one such example as $\mathbb{Z}_p$ doesn't come with a notion of order. It can be done however by a circuit operating on individual bits making up the operands. This means that we need to produce commitments to bits and to simulate binary circuits. However, both of these can be done algebraically. This section describes a method to do the former.

The common input is a commitment $C=g^x h^r$, with the prover having x and r as private input.

To decompose x into an N-bit number, the prover generates the following:

$(b_{N-1}, \ldots, b_0)_2 = x$ $r_1, \ldots, r_{N-1} \xleftarrow{U} \mathbb{Z}_{|G|}$ $r_0 = r - \sum_{n=1}^{N-1} 2^n r_n$ $C_n = g^{b_n} h^{r_n}$ This yields:

$$\sum_{n=0}^{N-1} 2^n C_n = C$$

The prover sends $C_1, \ldots, C_{N-1}$ to the verifier. Apart from that, the prover will need to provide proofs of commitment for $C_0, \ldots, C_{N-1}$.

Special Soundness:

Take two accepting transcripts $(C_1, \ldots, C_{N-1}, R_0, \ldots, R_{N-1}, c, z_0, \ldots, z_{N-1})$ and $(C_1, \ldots, C_{N-1}, R_0, \ldots, R_{N-1}, c', z'_0, \ldots, z'_{N-1})$. From the soundness of the conjunction proof we deduce all witnesses $w_n$, can be extracted. It should be noted that the fact that the C_0's are created by the prover does not affect the subprotocols' soundness.

Special Zero-Knowledge:

A simulator can randomize group elements $(C_1, \ldots, C_{N-1})$ and have sub-simulators generate honest-looking sub-proofs for their validity as bit commitments.

Complexity:

The prover randomizes N−1 masks and infers $r_0$ from them. The computation is as follows:

$$r_0 = r - \sum_{n=1}^{N-1} 2^n r_n = r - 2(r_1 + 2(r_2 + \cdots)).$$

This takes N−1 field additions and N−1 field doublings. In other words, it takes 2N−2 field additions, about as expensive as a couple of multiplications, at most. In most cases though, $2^N$ is much smaller than the group size and therefore the cost of these additions can be disregarded.

Similarly, computing $C_1$ to $C_{N-1}$ takes N−1 group exponentiations and N−1 group compositions.

In the same way as computing $r_0$, computing $C_0$ takes N−1 group doublings and N−1 group compositions. Alternatively, using the availability of $r_0$, $C_0$ can be computed directly as $C_0 = g^{b_0} h^{r_0}$. This takes one group composition and one exponentiation. An exponentiation to the power of a large number takes at least about $\log|G|-1$ exponentiations and $\log|G|-1$ doublings alone. Therefore direct computation of $C_0$ would always be less efficient.

Followed by that is N independent bit commitment proofs.

The verifier, takes $C_1$ to $C_{N-1}$ and computes $C_0$, knowing C. That takes N−1 group doublings and N−1 group compositions. The rest of its work is to verify individual bit commitment proofs.

TABLE 13

|  | Group exponentiation | Group composition | Field Multiplication | Field randomization |
| --- | --- | --- | --- | --- |
| Prover | 4N − 1 | 5N − 3 | N | 4N − 1 |
| Simulator | 5N − 1 | 5N − 2 | 0 | 4N − 1 |
| Verifier | 4N | 5N − 2 | 0 | 0 |

Bit Comparison Proof

Imagine an N-bit comparator design cascaded starting from the most significant bit.

The output of any 1-bit comparator unit comparing the $n^{th}$ digits is a commitment of form:

$$C_{n-1} = g^{c_{n-1}} h^{r_{n-1}}, \text{ where } c_n = \begin{cases} 1 \text{ if } (a_{N-1} \ldots a_n)_2 > (b_{N-1} \ldots b_n)_2 \\ 0 \text{ if } (a_{N-1} \ldots a_n)_2 = (b_{N-1} \ldots b_n)_2 \\ -1 \text{ if } (a_{N-1} \ldots a_n)_2 < (b_{N-1} \ldots b_n)_2 \end{cases}$$

The carry in $c_N$ is considered 0 and the carry out $c_0$ is the result.

$C_{N-1}$ can be simply computed as $A_{N-1} B_{N-1}^{-1} = g^{a_{N-1} - b_{N-1}} h^{r_{N-1} - r'_{N-1}}$.

All other values are computed as $$c_n = \begin{cases} a_n - b_n & \text{if } c_{n+1} = 0 \\ c_{n+1} & \text{if } c_{n+1} \neq 0 \end{cases}.$$

This is equivalent to saying $(c_{n+1} \neq 0 \wedge c_n = c_{n+1}) \vee (c_{n+1} = 0 \wedge c_n = a_n - b_a)$.

Proving and Simulating $c_{n+1} \neq 0 \wedge c_n = c_{n+1}$:

An honest proof would involve a proof of non-zeroness on $C_{n+1}$ and a Schnorr's as $C_{n+1} C_n^{-1} = h^r$.

A simulation would involve a simulation of both subcomponents. Each contributes an extra exponentiation.

TABLE 14

| | Group exponentiation | Group composition | Field Inversion | Field Multiplication | Field randomization |
|---|---|---|---|---|---|
| Prover | 3 | 2 | 1 | 4 | 3 |
| Simulator | 5 | 4 | 0 | 0 | 3 |
| Verifier | 5 | 4 | 0 | 0 | 0 |

Proving and Simulating $c_{n+1} = 0 \wedge c_n = a_n - b_n$:

An honest proof involves a proof of zeroness on $C_{n+1}$ and a proof of equality between $A_n B_n^{-1}$ and $C_n$.

A simulation likewise involves simulating the two.

TABLE 15

| | Group exponentiation | Group composition | Field Multiplication | Field randomization |
|---|---|---|---|---|
| Prover | 2 | 2 | 2 | 2 |
| Simulator | 4 | 4 | 0 | 2 |
| Verifier | 4 | 4 | 0 | 0 |

The most significant work difference between the $c_{n+1} \neq 0$ and $c_{n+1} = 0$ cases is an extra field inversion and two field multiplications when $c_{n+1} \neq 0$. A number of dummy operations may be necessary to close in the timing gap.

Overall Complexity:

When performing an honest proof, one of the predicates is proven and the other is simulated. When doing a simulation, they both are simulated. Disjunction provers and simulators both sample an additional challenge from the field.

TABLE 16

| | Group exponentiation | Group composition | Field Multiplication | Field randomization |
|---|---|---|---|---|
| Prover | 7 | 6 | 4 | 6 |
| Simulator | 9 | 8 | 0 | 6 |
| Verifier | 9 | 8 | 0 | 0 |

Whole Number Comparison—Using Comparator Circuits

Assuming decompositions are already available to both parties, the prover generates the bit comparison commitments $C_{N-1}, \ldots, C_0$ and prove their correctness. This takes N field randomizations, N exponentiations and N group compositions.

What follows is N-1 comparators with carry ins and a single group composition (providing $C_{N-1}$).

TABLE 17

| | Group exponentiation | Group composition | Field Multiplication | Field randomization |
|---|---|---|---|---|
| Prover | 8N − 7 | 7N − 6 | 4(N − 1) | 7N − 6 |
| Simulator | 10N − 9 | 9N − 8 | 0 | 7N − 6 |
| Verifier | 9(N − 1) | 8(N − 1) | 0 | 0 |

Whole Number Comparison—Using Signed Arithmetic (p's Complement)

Imagine a number $$q \leq \frac{p}{2}.$$

For any two whole numbers $0 \leq a, b < q$, we have the following:

$$b \leq a \Leftrightarrow 0 \leq a - b \leq a < q$$

$$b > a \Leftrightarrow -q < a - b < 0 \Leftrightarrow (a-b) \bmod p > p - q \geq q.$$

q can be as small as the prover feels comfortable, as it puts an upper limit on the values a and b.

This construction essentially reduces comparison between two arbitrary numbers to a comparison between an arbitrary one and one the prover gets to choose. Powers of 2 are very easy to compare against, when equipped with decomposition proofs, which essentially enable us to make statements such as "a is at most N bits long."

Complexity:

Assuming decompositions of both operands as common input, in order to imply they are at most N bits long, the prover only needs to decompose $C = AB^{-1}$, again to prove it is at most N bits long. Thus, all that is needed is a group composition and a bit decomposition.

TABLE 18

| | Group exponentiation | Group composition | Field Multiplication | Field randomization |
|---|---|---|---|---|
| Prover | 4N − 1 | 5N − 2 | N | 4N − 1 |
| Simulator | 5N − 1 | 5N − 1 | 0 | 4N − 1 |
| Verifier | 4N | 5N − 1 | 0 | 0 |

As compared with the circuit based method, this is considerably more efficient, as it requires about half as many exponentiations. However, it is more limited in that it cannot provide a commitment to the comparison result. It only proves the result directly.

Application to Identity Brokerage

Most of these problems start with Pedersen Commitments to finitely many attributes, in the form $A_i = g^{a_i} h^{r_i}$. These may be provided by U-Prove or another Anonymous Credentials protocol. The prover and the verifier have $\{A_i\}$ as common input, and the prover additionally has $\{a_i, r_i\}$ as private input.

Figure 15A:
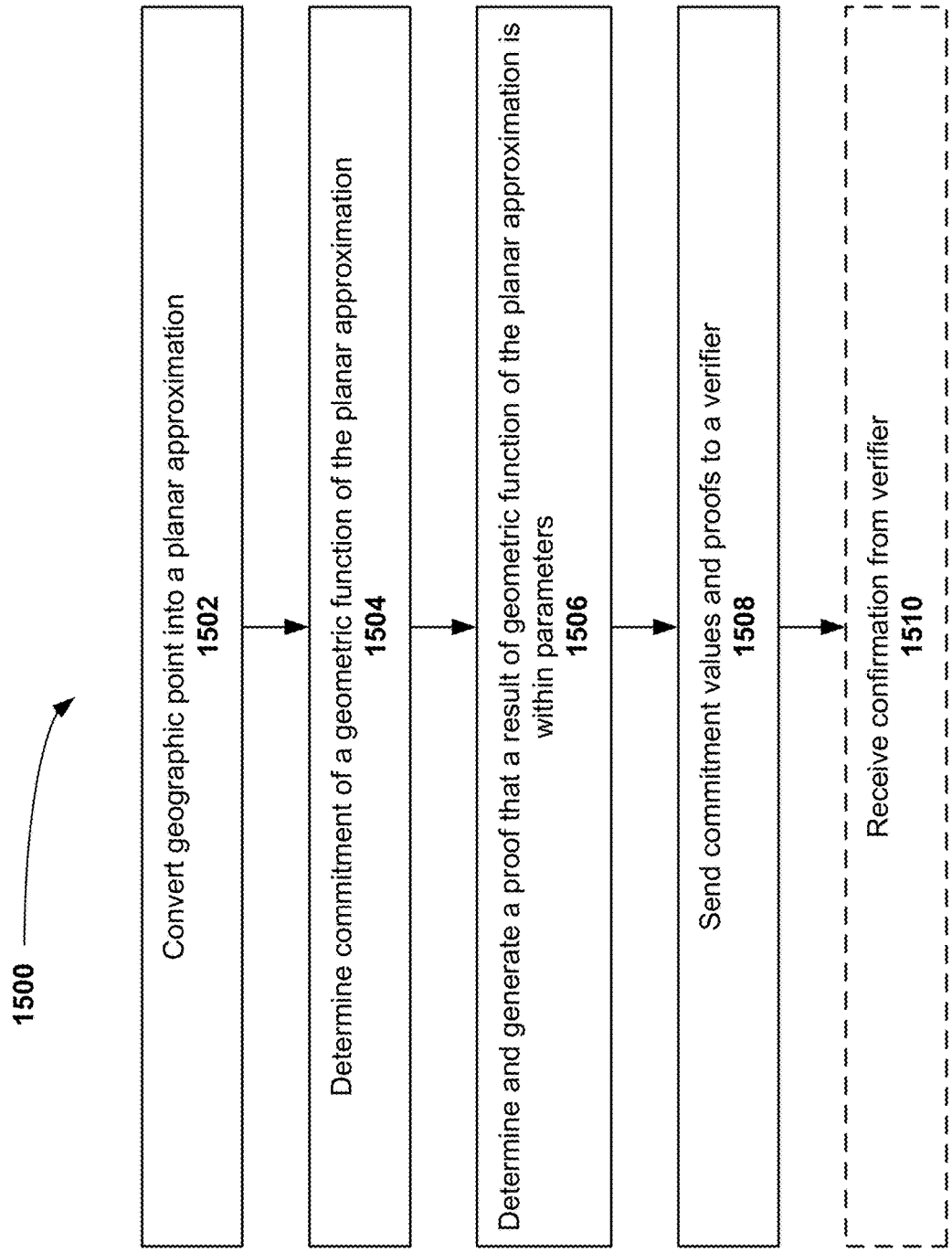
FIG. 15A illustrates, in a flowchart, an example of a method of determining that a geographic point is within a geographic area, in accordance with some embodiments.

FIG. 15A illustrates, in a flowchart, an example of a method of determining that a geographic point is within a geographic area 1500, in accordance with some embodiments. The method 1500 comprises converting 1502 the geographic into a planar coordinate (dx, dy), determining 1504 a commitment of a geometric function of the planar approximation, determining and generating 1506 a proof that a result of the geometric function of the planar approximation is within parameters, sending 1508 commitment values and proofs to a verifier, and optionally receiving 1510 a confirmation that the result of the formula is correct. The geographic point may comprise a latitudinal coordinate x, and a longitudinal coordinate y ($x_{lat}$, $y_{long}$). In some embodiments, after the geographic points are converted 1502 into respective planar approximations, a proof portion is generated to prove that that $dx = r \cos \varphi_0 d\theta$ and $dy = rd\varphi$. The geometric function may comprise determining that the geographic point is within at least one of: a radius of another geographic point, a polygonal shape, a union of convex polygonal shapes, a union of shapes (including a combination of circles and polygons). The commitment values may comprise encrypted points and auxiliary values (e.g., areas, radii squared, and other information used by sigma protocols). The commitment values allow the verifier to confirm that the geometric function was applied honestly to the planar coordinate (as further described below). In some embodiments, the proofs may include a proof of well-formedness of a commitment, and a proof of a condition on the result of the geometric function (e.g., distance squared less that radius squared, signed area a positive value, etc.). The result of the geometric function may be compared with desired parameters or conditions such as, a point is within a radius of an origin. Other desired parameters and/or conditions may be used. Other steps may be added to the method 1500.

Figure 15B:
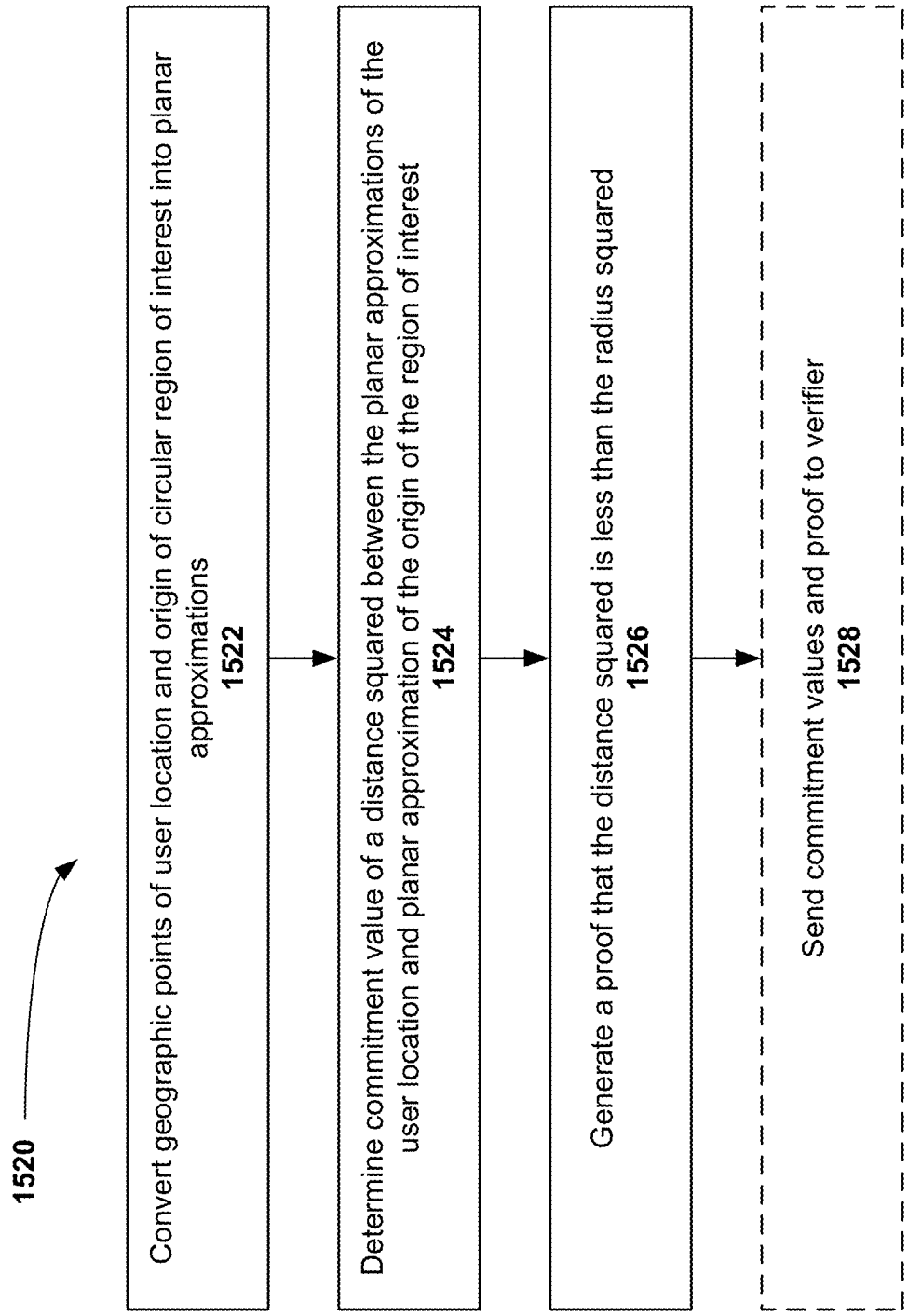
FIG. 15B illustrates, in a flowchart, an example of a method of proving that a first geographic point is within a radius of another geographic point, in accordance with some embodiments.

FIG. 15B illustrates, in a flowchart, an example of a method of proving that a first geographic point is within a radius of another geographic point 1520, in accordance with some embodiments. In some embodiments, the first geographic point may be associated with a credential location of a user device, and the other geometric point may be associated with the origin of an area of interest defined by the origin and the radius. The method 1520 comprises converting 1522 the geographic points into respective planar approximations (dx, dy), determining 1524 a commitment value of a distance squared between the planar approximation of the first geometric location and the planar approximation of the other geometric location (e.g., origin point of region of interest), and generating 1526 a proof that the distance squared between the two points is less than the radius squared (i.e., the distance squared between the planar approximations of the two points is less than the radius squared). In some embodiments, after the geographic points are converted 1522 into respective planar approximations, a proof portion is generated to prove that $dx = r \cos \varphi_0 d\theta$ and $dy = rd\varphi$. Determining a commitment value of a squared value (e.g., squaring a commitment) is described further below. Other steps may be added to the method 1520, including sending 1528 the commitment values and proof to a verifier.

Short Approximate Distance from a Known Point

Let the known point $P_0$ to be $\varphi_0$ radians North and $\theta_0$ radians East. For a close-by point $P(\varphi, \theta) = P_0 + (d\varphi, d\theta)$, we may use the following planar approximation:

$$dy = rd\varphi$$

$$dx = r \cos \varphi_0 d\theta$$

The earth is not a perfect sphere, so the distance from the center at $P_0$ should be looked up from a database trusted by the verifier and agreed upon by both parties. With r and $\varphi_0$ known, computing a commitment to $(dx)^2 + (dy)^2$ can be carried out as follows:

Notation: For entity a, $C_a$ denotes a commitment to it. $C_\varphi = g^\varphi h^{r_\varphi}, C_\theta = g^\theta h^{r_\theta}$ is our starting point.

We can compute $C_{d\varphi} = C_\varphi g^{-\varphi_0} = g^{d\varphi} h^{r_\varphi}$ and $C_{d\theta} = C_\theta g^{-\theta_0} = g^{d\theta} h^{r_\theta}$.

Then we compute $C_{\cos \varphi_0 d\theta} = (C_{d\theta})^{\cos \varphi_0} h^r$ for an arbitrary r. For non-integral values, as the cosine is expected to be, this operation is non-trivial and will be covered later in this report.

Then we compute the commitments $$C_{\left(\frac{dx}{r}\right)^2} \text{ and } C_{\left(\frac{dy}{r}\right)^2}.$$

A commitment to the distance would be computed as $$\left(C_{\left(\frac{dx}{r}\right)^2} + C_{\left(\frac{dy}{r}\right)^2}\right)^r.$$

This can be done easily since r is expected to be an integer.

Representing Fractions

A natural idea for representing the fraction m/n in the field of exponents would be to simply use $mn^{-1}$ in the field. Unfortunately this enables provers to pull off all manners of cheating, as for every m, n and m', there is an n' such that m/n=m'/n' in the field. m/n and m'/n' need not be equal or even close in Q.

As an example of how dramatically this can go wrong, consider the integer 1000. It can be represented as $1000_F$ in the field. On the other hand, consider the field inverse of 1000, $(1000_F)^{-1} = n_F$. $1000_F$ would also be a representation of 1/n, even though 1000 and 1/n are orders of magnitude away.

Another natural idea is to choose a fixed point representation. Commitments can be added as long as their point position matches (even if it does not, one may be extended or truncated to match the other).

Any fixed point can be multiplied by a commitment to another. The result will have its point at the sum of the others'. When this happens we may need to truncate the result to normalize it.

Normalizing a Fixed-Point Number

Let x be an N-digit number with its point at position n, and that we want to normalize it into x' with an n'<n bit fractional part. x can be decomposed into N bit-commitments, and the rightmost n-n' of them discarded. x' can be built back up from the remaining bit commitments.

Squaring a Commitment

In order to prove the validity of a commitment to $x^2$ while having agreed upon a commitment to x $C_x = g^x h^m$, we first rewrite $C_x^2 = g^{x^2} h^{m''} = C^{x^2} h^{m'}$ knowing m''=m'+xm and then run the following Σ-protocol:

1. Randomize field elements $r_1$, $r_2$ and $r_3$ and ship commitments $R_1 = g^{r_1} h^{r_2}$ and $R_2 = C_x^{r_1} h^{r_3}$.
2. Receive challenge c.
3. Send $z_1 = cx + r_1$, $z_2 = cm + r_2$, $z_3 = cm' + r_3$.
4. Verifier checks that $g^{z_1} h^{z_2} = C_x^c R_1$, $C_x^{z_1} h^{z_3} = C_x^{x^2 c} R_2$.

Multiplying Commitments

The case of proving the validity of a commitment to xy from those to x and y is only slightly more complex.

$$C_x = g^x h^{m_x}, C_y = g^y h^{m_y}, C_{xy} = g^{xy} h^{m'_{xy}}$$

The goal here is to prove $C_{xy} = C_x^y h^{m_{xy}}$ for $m_{xy} = m'_{xy} - ym_y$.

1. Randomize field elements $r_1$, $r_2$ and $r_3$. Ship commitments $R_y = g^{r_1} h^{r_3}$ and $R_{xy} = C_x^{r_1} h^{r_2}$.
2. Receive challenge c. In some embodiments, the challenge c can be received from the verifier or determined via a hash computed by the prover using the randomized field element values and randomized input from the verifier.

3. Send $z_1=cy+r_1$, $z_2=cm_{xy}+r_2$ and $z_3=cm_y+r_3$.
4. Verifier checks that $g^{z_1}h^{z_3}=C_y{}^cC_y$, $C_y{}^{z_1}h^{z_2}=C_{xy}{}^cR_{xy}$.

The proofs of security are trivial and are therefore omitted.

Back to Coordinates

From Requirements to Parameters

Relations will now be derived for estimating the number of binary points required to represent each quantity. To this end, one must derive the maximum amount that is to be represented as well as the largest admissible rounding error.

We assume the maximum earth radius to be given. In fact, it's less than 6400 km. We denote it as $r_{max}$. Representation rounding error will be denoted as $\varepsilon_r$.

The maximum distance in the application and its acceptable estimation error are $dl_{max}$ and $\varepsilon_l$, respectively.

For convenience, we mandate $\varepsilon_x=\varepsilon_y$ and $dx_{max}=dy_{max}$.

$dl^2=dx^2+dy^2$. Thus dl is increasing with respect to both dx and dy. Therefore, to obtain boundaries that guarantee dl is within bound, we must plug in $dx_{max}$ and $dy_{max}$. From that we clearly obtain $$dx_{max} = dy_{max} = \frac{dl_{max}}{\sqrt{2}}.$$

On the other hand, approximating the errors as first order differentials we have: $2dld^2l=2dxd^2x+2dyd^2y \Leftrightarrow d^2l=d^2x\cos\alpha+d^2y\sin\alpha$ for some $\alpha$. By the same argument as above, with $d^2l$ being increasing with respect to $d^2x$ and $d^2y$, we can plug in all the maximum values in the equation.

$$\varepsilon_l = \max\{\varepsilon_x \cos \alpha + \varepsilon_y \sin \alpha\} = \varepsilon_x\sqrt{2} \Rightarrow \varepsilon_x = \varepsilon_y = \frac{1}{\sqrt{2}}\varepsilon_l$$

We also get $$d\phi_{max} = \frac{dy_{max}}{r_{max}} \text{ and } \theta_{max} = \frac{dx_{max}}{r_{max}}.$$

$$d^2y = drd\phi + rd^2\phi \Rightarrow \varepsilon_y = \varepsilon_r d\phi_{max} + r_{max}\varepsilon_\phi \Rightarrow \varepsilon_\phi = \frac{\varepsilon_y - \varepsilon_r d\phi_{max}}{r_{max}}$$

$$d^2x = dr \cos \phi_0\, d\theta + rd \cos \phi_0\, d\theta + r \cos \phi_0\, d^2\theta \Rightarrow \varepsilon_x =$$

$$\varepsilon_r d\theta_{max} + r_{max}\,\varepsilon_{\cos\phi_0}\, d\theta_{max} + r_{max}\varepsilon_\theta \Rightarrow \varepsilon_{\cos\phi_0} =$$

$$\frac{\varepsilon_x - \varepsilon_r d\theta_{max} - r_{max}\varepsilon_\theta}{r_{max}\, d\theta_{max}} \text{ and } \varepsilon_\theta = \frac{\varepsilon_x - \varepsilon_r d\theta_{max} - r_{max}\,\varepsilon_{\cos\phi_0}\, d\theta_{max}}{r_{max}}$$

Having been given either $\varepsilon_{\cos\phi_0}$ or $\varepsilon_\theta$ we can compute the other.

An Instantiation

Plugging $r_{max}=6400$ km, $\varepsilon_r=1$ km, $dl_{max}=32$ km, $\varepsilon_l=125$ m and $\varepsilon_{\cos\phi_0}=2^{-10}$ into the formulas above yields the following:

TABLE 19

|  | Maximum | Point position | Bit size |
| --- | --- | --- | --- |
| dx | 22.63 km | 4 | 9 |
| dφ | 0.00353554 rad | 17 | 8 |

TABLE 19-continued

|  | Maximum | Point position | Bit size |
| --- | --- | --- | --- |
| dθ | 0.00353554 rad | 17 | 8 |
| $\cos\phi_0$ | 1 | 10 | 11 |

The system described above may be used to enable a prover to convince a verifier that it has a commitment to a point inside a verifier-determined convex polygon. Its applications include proofs of location in cities and gerrymandered areas. In the proof of location applications one may approximate many shapes, even concave ones, as a union of a number of convex shapes.

A point P is inside or on a convex shape $A_0 \ldots A_{n-1}$, ordered counter-clockwise if and only if all the angles $A_i P A_{i+1 \bmod n}$ are also counter-clockwise. This is evidenced by that the areas of triangles made by these line-sections always add up to the original shape's area. However, the absolute value of these areas would add up to more than the shape's area if P is outside it. In that case therefore, some of the areas must have conflicting signs.

The signed area of the triangle $A_i P A_{i+1}$ is the following:

$$S(A_i P A_{i+1})=\tfrac{1}{2}(x_i y_{i+1}-x_{i+1}y_i+x_p(y_i-y_{i+1})+y_p(x_{i+1}-x_i))$$

The prover only needs to demonstrate that all such areas are positive.

FIG. 15C illustrates, in a flowchart, an example of a method of proving that a first geographic point is within a polygon shape having vertices defining an area 1530, in accordance with some embodiments. In some embodiments, the first geographic point may be associated with a credential location of a user device, and the other geometric point may be associated with the origin of an area of interest defined by the origin and the radius. The method 1530 comprises converting 1532 the first geographic point and geographic points associated with each endpoint of each vertex of the polygon into respective planar approximations, determining 1534 a commitment value of a signed area of each triangle defined by $A_i P A_{i+1}$ (where $A_i$ and $A_{i+1}$ are the planar approximations of endpoints of a vertex of the polygon shape, P is the planar approximation of the particular geographic location associated with the portable client device, and i is an index value representing a vertex of the polygon), and generating 1536 a proof that the signed area of each triangle defined by $A_i P A_{i+1}$ is a positive value. In some embodiments, after the geographic points are converted 1532 into respective planar approximations, a proof portion is generated to prove that $dx=r \cos \phi_0\, d\theta$ and $dy=rd\phi$. Other steps may be added to the method 1530, including sending 1538 the commitment values and proof to a verifier. The commitment values and proof allow the verifier to verify that all areas were constructed correctly and proofs determined correctly.

Using Cryptographic Commitments

Before the protocol is executed, the prover and the verifier have agreed on a clockwise ordering of the polygon vertices. The point P, to be proven to be inside the polygon, is given by commitments to its coordinates $C_{P_x}=g^{P_x}h^{m_{P_x}}$ and $C_{P_y}=g^{P_y}h^{m_{P_y}}$. Because there are no products of two unknown entities, given $C_{P_x}$ and $C_{P_y}$ the verifier can compute commitments to all $2^{f+1}S(A_i P A_{i+1})$ where f is the size of the fractional component used, with no input from the prover.

The prover then can show that $S(A_i P A_{i+1})$ can be expressed using $f+1+n_s$ bits, where $n_s$ is the number of bits used to express the area of the entire shape. The size of the group is to be no less than f+3+$n_s$. It should be understood that any other way of proving positivity may be used.

Precision and Parameter Tuning

Error can be defined as the error in estimating the area of a triangle when it is close to zero. This definition is justified by the fact that the only predicate of interest on an area is whether it's positive. This translates to both a completeness and soundness error.

In some embodiments, the error of representing each known coordinate may be denoted as $\varepsilon_A$, and that of each of P's coordinates denoted as $\varepsilon_p$. The maximum absolute value of any of A's coordinates may be called $|x|_{max}$ and $|y|_{max}$. The prover initially shows that $|x_p| \leq |x|_{max}$ and $|y_p| \leq |y|_{max}$, since there is no guarantee that the following bounds will continue to hold as P's coordinates grow.

Without loss of generality, it may be assumed that $|x|_{max} \geq |y|_{max}$. Applying these into the triangle area equation provides $$2\varepsilon_A + \varepsilon_P = \frac{\varepsilon_S}{2|x|_{max}}.$$

This is a nice result because it shows that more is to be gained from making the shape coordinates more precise than there is from the unknown point. Relaxing precision requirements on the unknown points will provide efficiency gains.

Figure 15D:
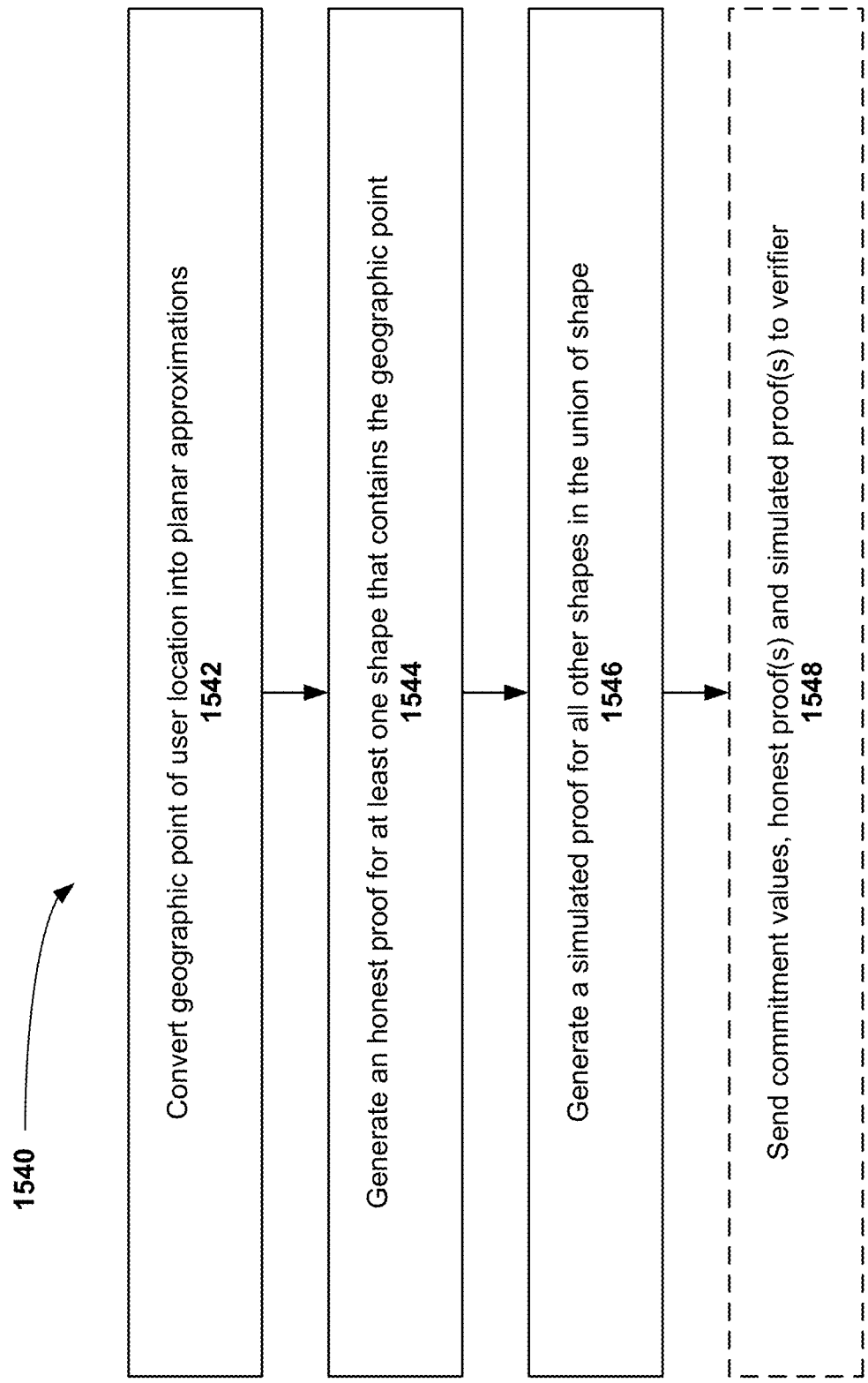
FIG. 15D illustrates, in a flowchart, an example of a method of determining that a location point is within a union of convex polygon shapes defining an area, in accordance with some embodiments.

FIG. 15D illustrates, in a flowchart, an example of a method of proving that a first geographic point is within a union of shapes defining an area 1540, in accordance with some embodiments. In some embodiments, the first geographic point may be associated with a credential location of a user device. Each shape comprising a circle having a radius, or a polygon having vertices, defining an area. The method 1540 comprises converting 1542 the first geographic point into planar approximations, generating 1544 an honest proof for at least one shape that contains the geographic point, and generating 1546 a simulated proof for all other shapes in the union of shapes. Other steps may be added to the method 1540, including sending 1548 the commitment values, honest proof(s) and simulated proof(s) to a verifier. The commitment values and proofs allow the verifier to verify that all areas were constructed correctly and proofs determined correctly.

Choosing the Origin

Unknown Point P

An advantage of this choice is that the terms $x_p(y_i - y_{i+1})$ and $y_p(x_{i+1} - x_i)$ are always zero and do not need to be computed. However, $x_i y_{i+1}$ and $x_{i+1} y_i$ are to be computed as products of two unknown values. This is computationally intensive and is therefore not recommended.

Known Point on or Inside the Shape

Possible choices include one of the vertices, min and max averages of the coordinates and the mean of the vertices. In one embodiment the min and max averages are selected, since in that case, the term $|x|_{max}$ would be minimized, allowing for larger errors $\varepsilon_A$ and $\varepsilon_p$.

It is understood that the above concepts of proving that a commitment is within a distance from a point (i.e., within a circle), or within a union of convex polygons (i.e., within a gerrymandered shape) may be applied to other shapes, including a union of one or more circles and one or more polygons.

Simulation of Location-Based Zero-Knowledge Proofs

A simulation of a cryptographic protocol is the process of generating a transcript that is indistinguishable from an honestly generated one, but is generated by the same party. Theoretically, the concept is useful in proofs of security. In practice, it is used to prove disjunctions of statements by allowing the prover to "cheat" on all statements but one of their choosing.

All steps of a simulated statement are simulated with the same challenge. Location-related protocols described herein comprise the following steps which would be simulated as follows:

Multiplication by a Known Factor

To simulate a "multiplication by a known" proof, recall that an honest proof of b=ca involves proving that $C_b = g^b h^{r_b}$ encodes the same entity as Ca. Then the proof that establishes that equality must be simulated. Simulating equality proofs is described infra.

Squaring a Commitment

The following simulator can make it look like $a^2 = 0$ regardless of a's value.

Given the challenge c, and a commitment $C_a = g^a h^m$, the simulator generates a commitment to $a^2$ for an arbitrary value for $a^2$ by performing the following:

1. Randomize $z_1$, $z_2$, $z_3$, m'
2. Compute the commitment $C_{a^2} = g^{a^2} h^{m'}$
3. Compute $R_1 = g^{z_1} h^{z_2} C_x^{-c}$ and $R_2 = C_x^{z_1} C_{a^2}^{-c} h^{z_3}$.
4. Ship $z_1$, $z_2$, $z_3$, $C_{a^2}$, $R_1$, $R_2$ to the verifier.

Step 3 can be optimized by taking $a^2 = 0$ so that $R_2 = C_x^{z_1} h^{-cm' + z_3}$.

Decomposing a Commitment

The following simulation process can generate false bit decompositions:

When decomposing $C_a = g^a h^m$ into n digits, all the commitments for $C_i = g^{a_i} h^{m_i}$ for $i \neq 0$ are to the value a; and the least significant bit commitment is $C_0 = g^{a_0} h^{m_0}$ where $m_0 = m - \Sigma_{i=1} m_i^{(2^i)}$, $a_0 = a - \Sigma_{i=1} a_i^{(2^i)}$, $a_i$ are arbitrary for $i \neq 0$ and $m_i$ random for $i \neq 0$. The proof of well-formedness for all bits are simulated. Recall that a proof of well-formedness for a bit commitment $C_i = g^{a_i} h^{m_i}$ was a disjunction of the statements $a_i = 0$ and $a_i = 1$. In this case, given the challenge c, the simulator randomizes the challenge c' and feeds the sub-simulators the sub-challenges c' and c–c'.

The process can be optimized by taking $a_i = 0$ for $i \neq 0$ and $a_i = a$.

Application to Location-Based Proofs

In order to simulate position in a circle of radius r, the simulator can

1. Generate commitments to dx, dy and simulate proofs that $dx = r \cos \varphi_0 d\theta$ and $dy = r d\varphi$.
2. Generate commitments to $dx^2$, $dy^2$ and simulate proofs that they were correctly computed.
3. Generate commitment to $\delta = r^2 - dx^2 - dy^2$ (simply through group arithmetic)
4. Simulate decomposition of $\delta$ to show it's a positive signed number.

Figure 15E:
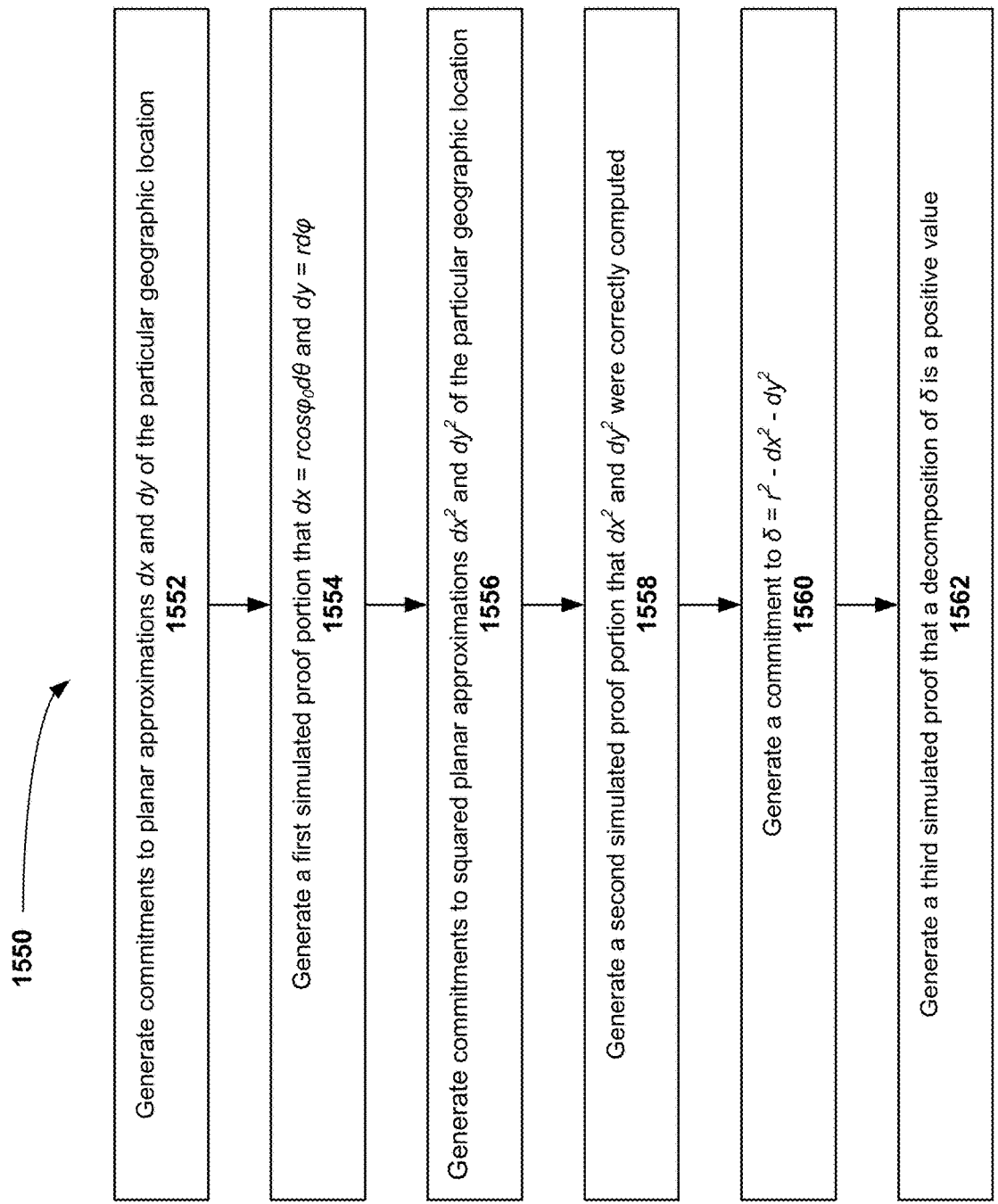
FIG. 15E illustrates, in a flowchart, a method of simulating a proof that a particular geographic location is within an area defined by an origin and a radius, in accordance with some embodiments.

FIG. 15E illustrates, in a flowchart, a method of simulating a proof that a particular geographic location is within an area defined by an origin and a radius 1550, in accordance with some embodiments. The method 1550 comprises generating 1552 commitments to planar approximations dx and dy of the particular geographic location, generating 1554 a first simulated proof portion that $dx = r \cos \varphi_0 d\theta$ and $dy = r d\varphi$, generating 1556 commitments to squared planar approximations $dx^2$ and $dy^2$ of the particular geographic location, generating 1558 a second simulated proof portion that $dx^2$ and $dy^2$ were correctly computed, and generating 1660 a commitment to $\delta = r^2 dx^2 - dy^2$; and generate 1662 a third simulated proof that a decomposition of $\delta$ is a positive value. Other steps may be added to the method 1550.

The following can simulate a proof of being contained in a polygon:

1. Generate commitments to dx,dy and simulate proofs that $dx = r \cos \varphi_0 d\theta$ and $dy = rd\varphi$.
2. Generate commitments to values $S(A_iPA_{i+1})$ through multiplication proof simulations and group arithmetic and simulate proofs that they were formed correctly.
3. Generate simulated proofs that all the $S(A_iPA_{i+1})$ are positive.

Figure 15F:
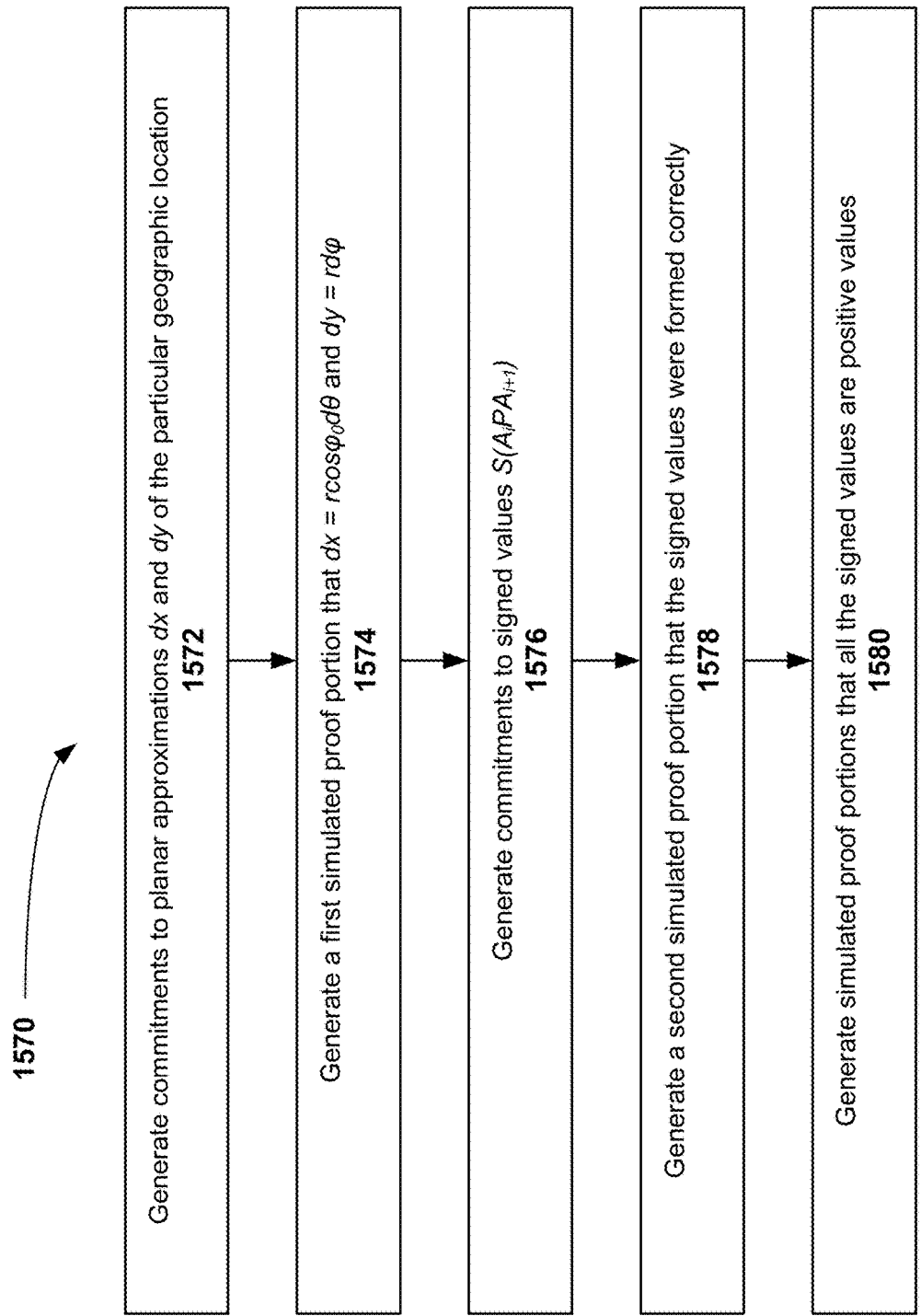
FIG. 15F illustrates, in a flowchart, a method of simulating a proof that a particular geographic location is within an area defined by a polygon shape having vertices, in accordance with some embodiments.

FIG. 15F illustrates, in a flowchart, a method of simulating a proof that a particular geographic location is within an area defined by a polygon shape having vertices 1570, in accordance with some embodiments. The method 1570 comprises generating 1572 commitments to planar approximations dx and dy of the particular geographic location, generating 1574 a first simulated proof portion that $dx = r \cos \varphi_0 d\theta$ and $dy = rd\varphi$, generating 1576 commitments to signed values $S(A_iPA_{i+1})$, generating 1578 a second simulated proof portion that the signed values were formed correctly, and generating 1580 simulated proof portions that all the signed values $S(A_iPA_{i+1})$ are positive values. Other steps may be added to the method 1570.

Sharing of Values

In some embodiments, where the shapes in question are geographically close, the same planar approximation may be valid for all shapes defining areas that are geographically close. In this case, step 1 can be performed once for all of the shapes with an honest proof and the same committed values for dx and dy can be used for each shape.

SafeShare Application

FIGS. 16-21 are screenshots of an example web application illustrating a sample prover computing device user experience, according to some embodiments. In this example, a token is a signed token from a semi-honest issuer attesting to its carrier's having a certain attribute, and an attribute is any logically simple claim one can make about oneself.

Figure 16:
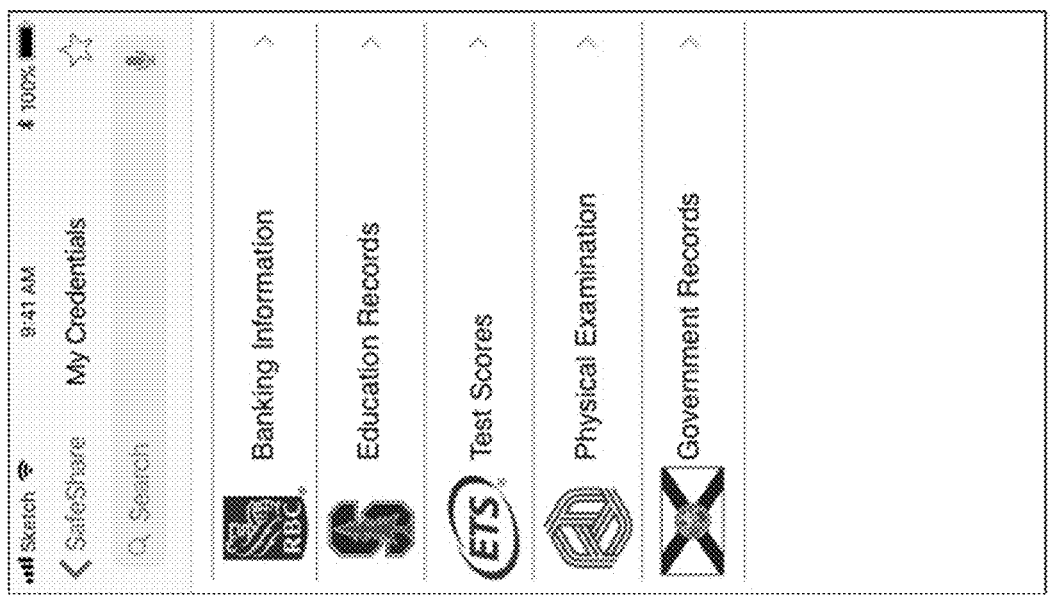
FIG. 16 is a screenshot of an example credential manager, according to some embodiments. Depending on the computational power of the mobile device, an application residing on a mobile device, such as the credential manager, is configured to perform one or more actions directed to the prover role in the above embodiments.
Figure 17:
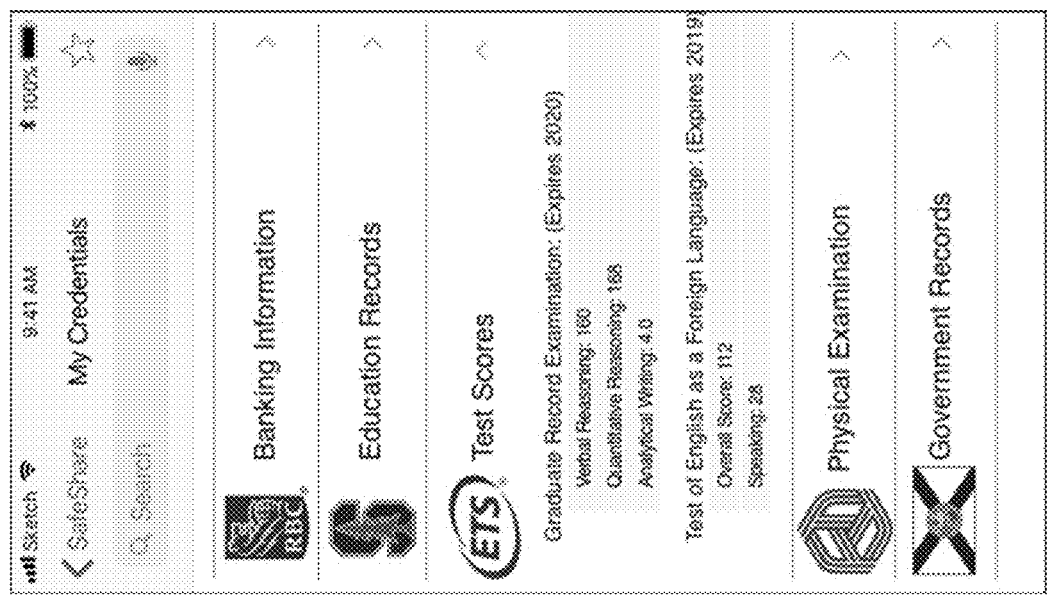
FIG. 17 is a screenshot of an example credential manager having an expanded portion to view additional details of the credential, according to some embodiments.

FIG. 16 is a screenshot of an example credential manager, according to some embodiments. FIG. 17 is a screenshot of an example credential manager having an expanded portion to view additional details of the credential, according to some embodiments.

Figure 18:
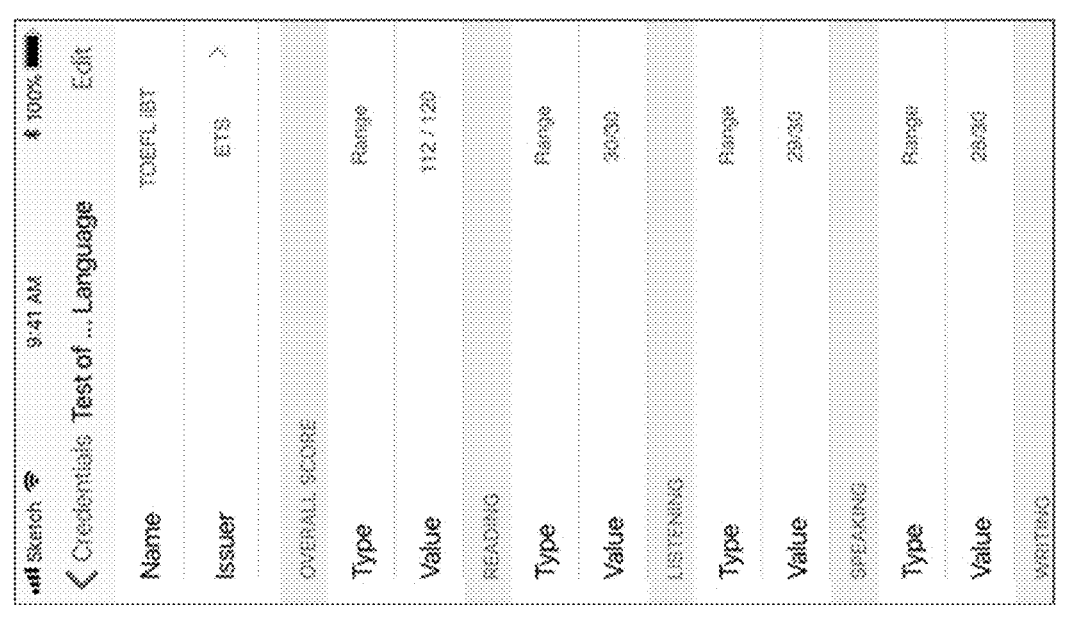

FIG. 18 is a screenshot of an example credential manager showing an expanded credential view of a single credential, according to some embodiments.

Figure 19:
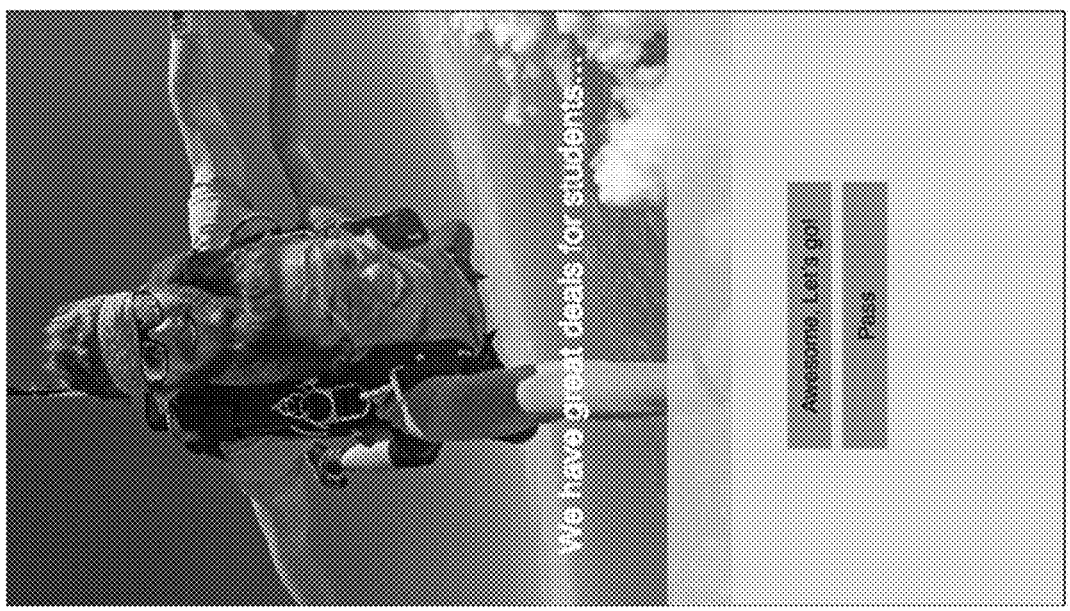
FIG. 19 is a screenshot of an example page requiring verification, according to some embodiments.

FIG. 19 is a screenshot of an example page requiring verification, according to some embodiments.

In this example, the prover has navigated to a page for a skydiving program whereby the user must prove that they are at least 18 years of age, and that they have been recently declared healthy. There is also a student deal, where if the prover wishes to access the student deal, they must also prove that they are currently enrolled at a university. It is understood that other criteria may be included, such as location or residency within a certain geographic area.

Figure 20:
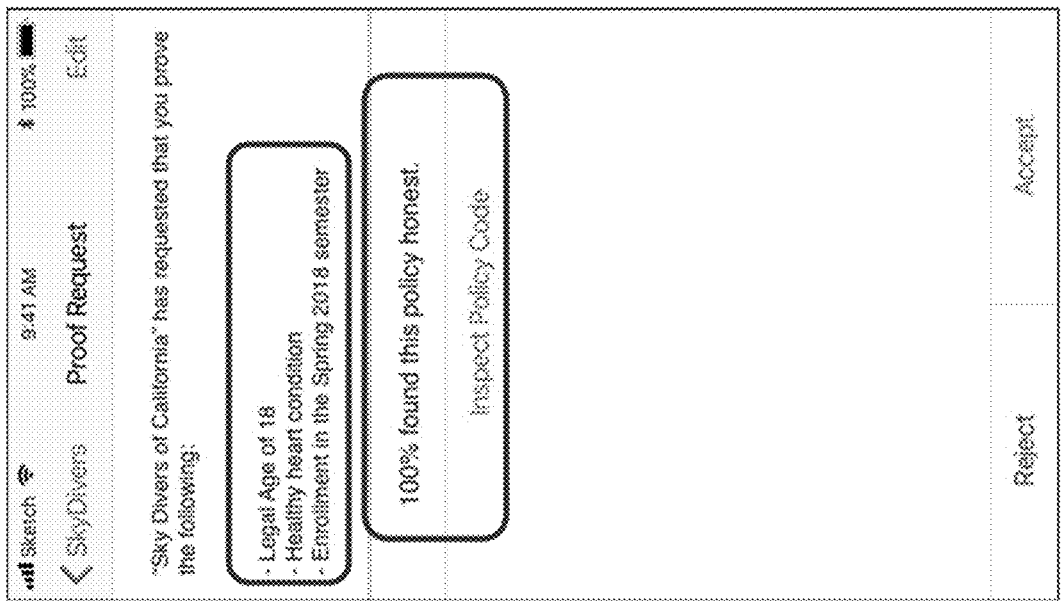
FIG. 20 is a screenshot of an example proof request interface page, according to some embodiments.

FIG. 20 is a screenshot of an example proof request interface page, according to some embodiments. The verifier (e.g., a vendor) sends a proof request, and the user is redirected to the user interface. The proof request is written in a formal language; therefore, the natural language description also comes from the vendor. The user has the option to view the proof request code and vote on whether it matched the natural language description. It is understood that other criteria may be included, such as location or residency within a certain geographic area.

Figure 21:
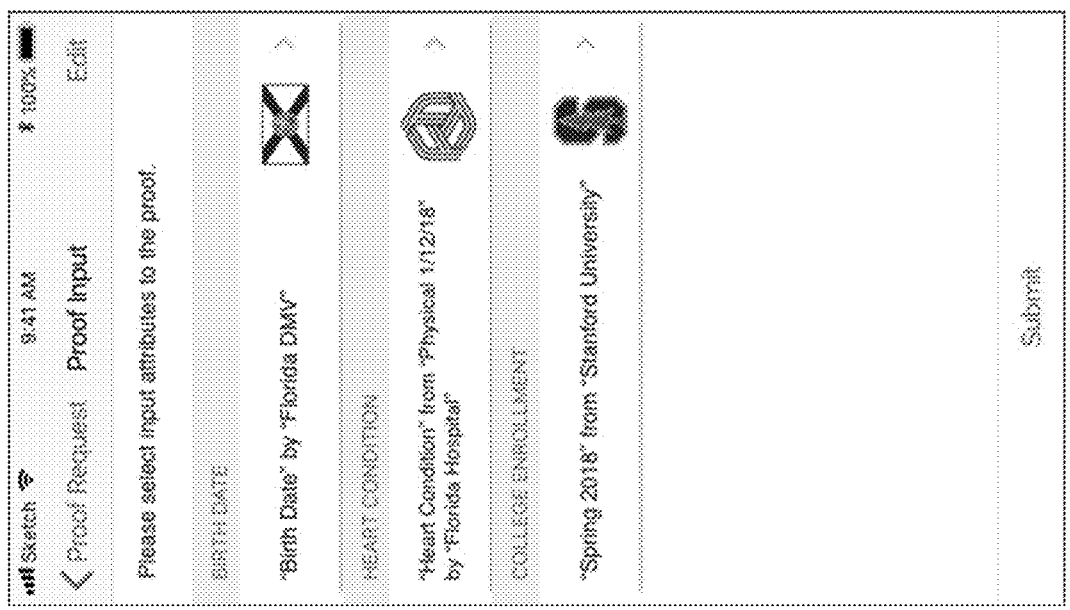
FIG. 21 is a screenshot of an example proof input interface page, according to some embodiments.

FIG. 21 is a screenshot of an example proof input interface page, according to some embodiments. After agreeing to the policy, the interface includes visual elements that the prover may select to choose which of their credentials to use as input to the proof generation algorithm. These credentials will not be shared with the verifier, but it will be proven in zero knowledge that they satisfy the policy.

Glossary

Issuer/Identity Provider is a party trusted by the prover and the verifier, that attests to the prover's attributes.

Prover/Client the party in contact with the issuer as well as the verifier, attempting to prove properties in zero knowledge.

Verifier the party demanding knowledge of certain properties about the prover.

Attribute a proposition about the prover to which the issuer attests.

Property a proposition about the prover whose truth the verifier wants to ascertain. It may be identical to one of the prover's attributes or logically implied by one or many of them.

Proof Request a formalized message from the verifier specifying the property of which it demands knowledge, containing additional information about the protocols supported, etc.

Proof a message from the client to the verifier, providing cryptographic assurance as to the issuer's attestation to the client's satisfaction of the property specified in the proof request.

Templates for Messages

The protocols message can be communicated as JSON-encoded.

Proof Request

What follows is a sample proof request.

```
{
    "proof_request":{
        "lang":"straight-talk-1.0",
        "url":"https://bank.com/straight-talk/sample-scripts/alcohol-consumption.stk",
        "verifier_args":{
            "expiration_threshold":{
                "genesis":"01/01/2018",
                "apocalypse":"01/01/2100",
                "granularity":"day",
                "since_genesis":1000,
            },
            "birth_threshold":{
                "genesis":"01/1900",
                "apocalypse":"01/1998",
```

```
            "granularity":"day",
            "till_apocalypse":195
        }
    },
    "permitted_issuers":["Bank","Florida DMV"],
    "supported_schemes":[
            {"scheme":"u-prove","dlog_params":{"group":"prime256v1","generators":"base64 hash of generators, or list of generators"}},
            {
                "scheme":"delegated-verification",
                "remote_attestation":{"offline_accepted":true, "later_than":"01/01/2017"}
            }
    ],
    "ca_certs":[{"name":"bank-identity-brokerage-ca","digest":"base64 sha2"}],
    "challenge_string":"base64 byte string"
    }
}
```

The script "alcohol-consumption.stk" can contain the following:

```
verifier params
{
    date_t expiration_threshold;
    date_t birth_threshold;
};
credential{
    date_t expiration_date;
```

```
    date_t birth_date;
};

return   expiration_date>expiration_threshold  &&
birth_date<birth_threshold;
```

Instead of providing a URL, the verifier can provide the source code or bytecode to a straight talk script.

A standard bytecode language for straight talk shall also be provided.

Proof

The following can be a response to the request above:

```
{
    "proof":{
        "scheme":"u-prove-1.0",
        "dlog_params":{"group":"prime256v1","generators":"base64 hash"},
        "credential_metadata":{
            "issuer":{"name":"BANK","cert":"bash64 cert"},
            "attribute_indexes":{
                "expiration_date":0,
                "birth_date":1
            },
            "attribute_count":5
        },
        "presentation_proof":{
            "configuration":"cchhh",
            "uprove stuff":"things"
        },
        "standalone_comparison_proof":{
            "lhs":"expiration_date",
            "relation":"greater",
            "rhs":"06/20/1997",
            "relation_commitment_mask":"base64 bignum",
            "decomposition":
            {
                "commitment_in":"lhs",
                "bits_little_endian":[
                    {"commitment":"base64 group element", "well-formedness":"...."},
                    {"commitment":"base64 group element", "well-formedness":"..."}
                ]
            },
            "comparison":
            {
                "in":"lhs",
                "bit_comparisons":[
                    { }
                ]
            }
```

```
        },
        "request_digest":"base64 hash"
    }
}
```

Another example proof, based on secure enclaves, is provided below:

```
{
    "proof":{
        "scheme":"delegated-verification",
        "remote_attestation_transcript":{
            "base_randomness":"base64 byte array",
            "msg1":{ },
            "msg2":{ },
            "msg3":"",
            "ias_signature":""
        },
        "request_digest":"base64 hash",
        "verifier_public_key":"pem encoding",
        "validation_signature":"base64 signature"
    }
}
```

Figure 22:
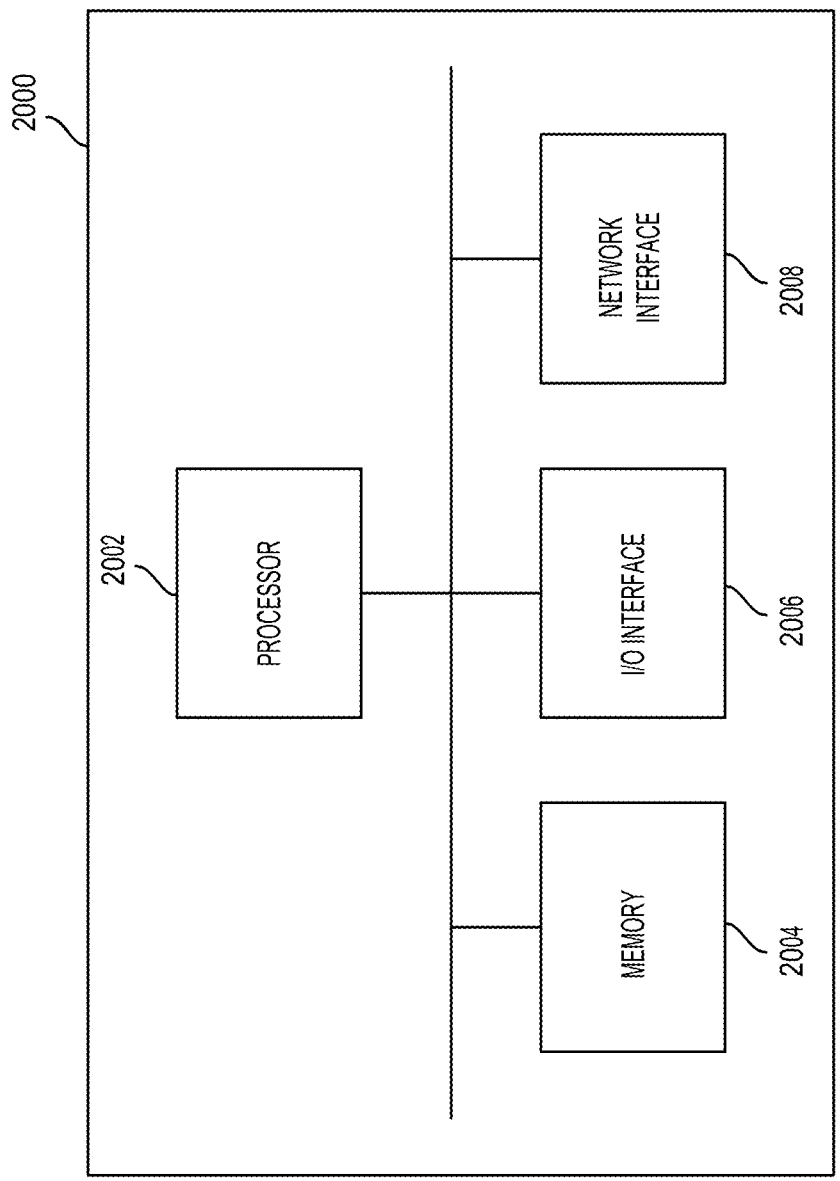
FIG. 22 is a topology of an example computing device, according to some embodiments.

FIG. 22 is a schematic diagram of a computing device 2000 such as a server. As depicted, the computing device includes at least one processor 2002, memory 20020, at least one I/O interface 2006, and at least one network interface 2008.

Processor 2002 may be an Intel or AMD x86 or x64, PowerPC, ARM processor, or the like. Memory 2004 may include a combination of computer memory that is located either internally or externally such as, for example, random-access memory (RAM), read-only memory (ROM), compact disc read-only memory (CDROM).

Each I/O interface 2006 enables computing device 2000 to interconnect with one or more input devices, such as a keyboard, mouse, camera, touch screen and a microphone, or with one or more output devices such as a display screen and a speaker.

Each network interface 2008 enables computing device 2000 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others.

Computing device 2000 is operable to register and authenticate users (using a login, unique identifier, and password for example) prior to providing access to applications, a local network, network resources, other networks and network security devices. Computing devices 2000 may serve one user or multiple users.

Figure 23:
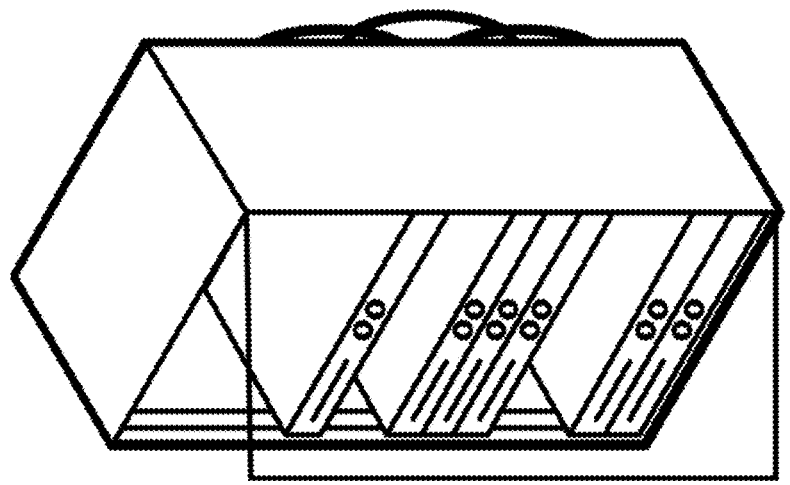
FIG. 23 is a server for inclusion in a data center, according to some embodiments.

FIG. 23 is a server for inclusion in a data center, according to some embodiments. The server is an illustration of a special purpose machine 2102, according to some embodiments that may reside at data center. The special purpose machine 2102, for example, incorporates the features of the verification system and is provided in a portable computing mechanism that, for example, may be placed into a data center as a rack server or rack server component that interoperates and interconnects with other devices, for example, across a network or a message bus. For example, the server may be configured to provide one or more secure data storage spaces, or may include one or more secure enclave processors, among others.

Figure 24:
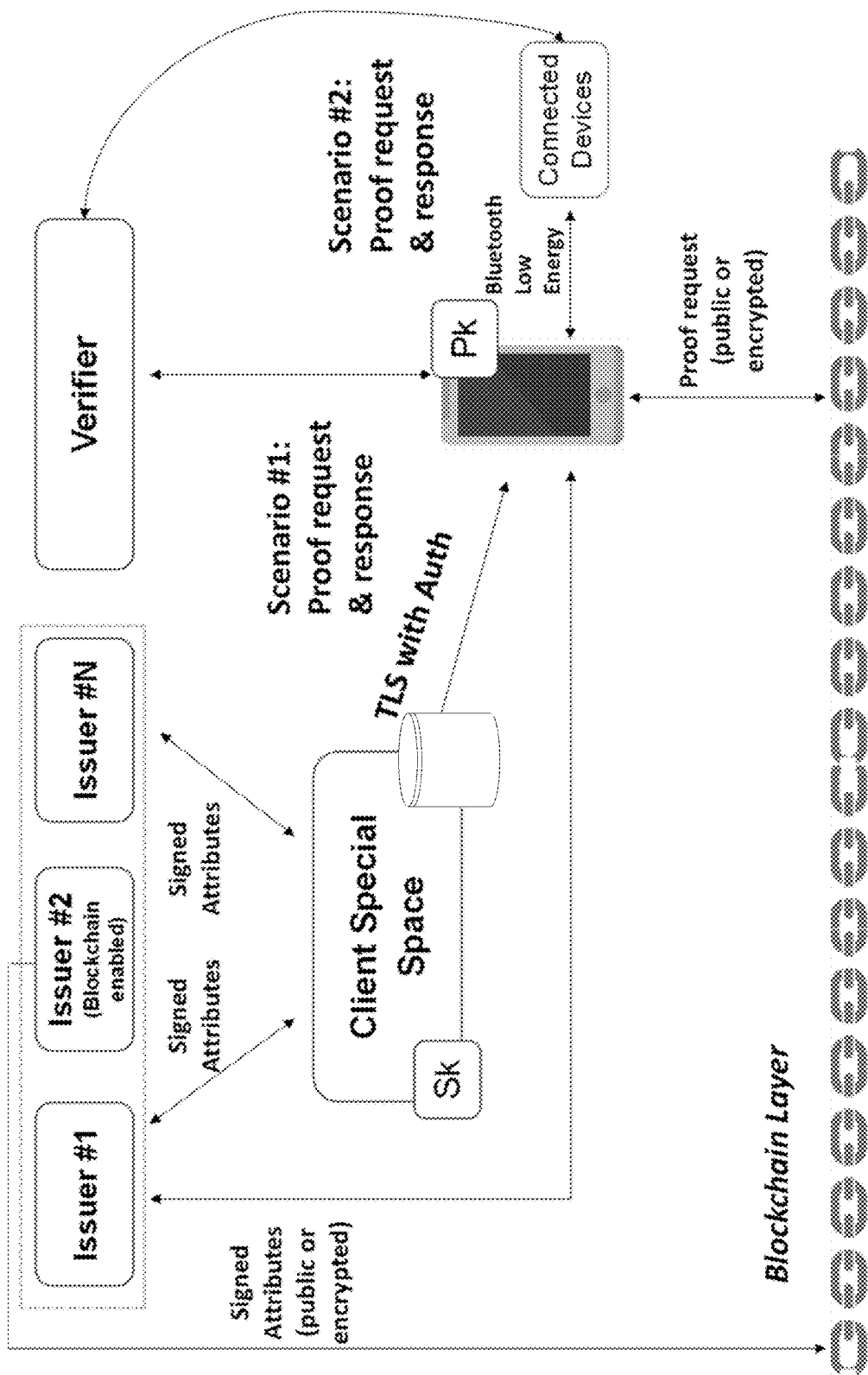
FIG. 24 is a system diagram for an example verification system, according to some embodiments.

FIG. 24 is a system diagram for an example verification system, according to some embodiments.

There may be multiple issuer entities, each having their own set of associated computing devices (e.g., computers in data centers). The issuer entities and their computing devices may have heterogeneous data storage mechanisms, which can include local storage and/or specially allocated memory storages, including secured enclave memory and/or processors.

As illustrated in the example of FIG. 24, issuer devices 2202 are coupled to a client secured data storage. The issuer device 2204 may be coupled to a blockchain data structure backend or a distributed ledger mechanism that can be accessed and/or otherwise interacted with (e.g., pushing new information to be stored on the blockchain, querying the blockchain using a blockchain explorer), among others.

The blockchain data structure, in some embodiments, is a public blockchain (e.g., publicly accessible, such as an Ethereum blockchain), or a private, permissioned blockchain that operates through a propagated distributed ledger shared across a set of trusted nodes. The blockchain data structure may store immutable attributes (and/or encrypted or signed versions of the attributes).

Multiple authoritative issuer devices 2202, 2204 are configured to provide signed attributes which may either be delivered to the client special space 2206 (e.g., a secured enclave having secured memory and/or secured processors) or onto the blockchain data structure 2208. These attributes represent aspects of client personal information. The client special space 2206 can store some signed attributes and the proof response logic, and can be stored in a data storage remote from the on-board memory of devices associated with the client. A benefit of having a client special space 2206 is that, for example, multiple client devices 2210 are able to connect to the client special space 2206 (e.g., a tablet, a mobile device, a desktop computer), and if a client loses a device, the signed attributes remain accessible.

The blockchain data structure 2208 is adapted to store on one or more distributed ledgers, data blocks representing signed attributes and the proof response logic, according to some embodiments. Similarly, multiple client devices 2210 are able to connect to the blockchain data structure 2208 (e.g., a tablet, a mobile device, a desktop computer), and if a client loses a device 2210, the signed attributes remain accessible.

Proof requests and responses can be conducted using, for example, connected electronic client devices 2210 (e.g., a mobile device, such as a smartphone or a tablet) or other devices that are connected to the mobile device using Bluetooth low energy (e.g., a wearable device). The client devices 2210 may store locally a public key which can be utilized to encrypt data messages for decryption using the corresponding secret key or validate signed attributes that are signed based on the corresponding secret key.

Figure 25:
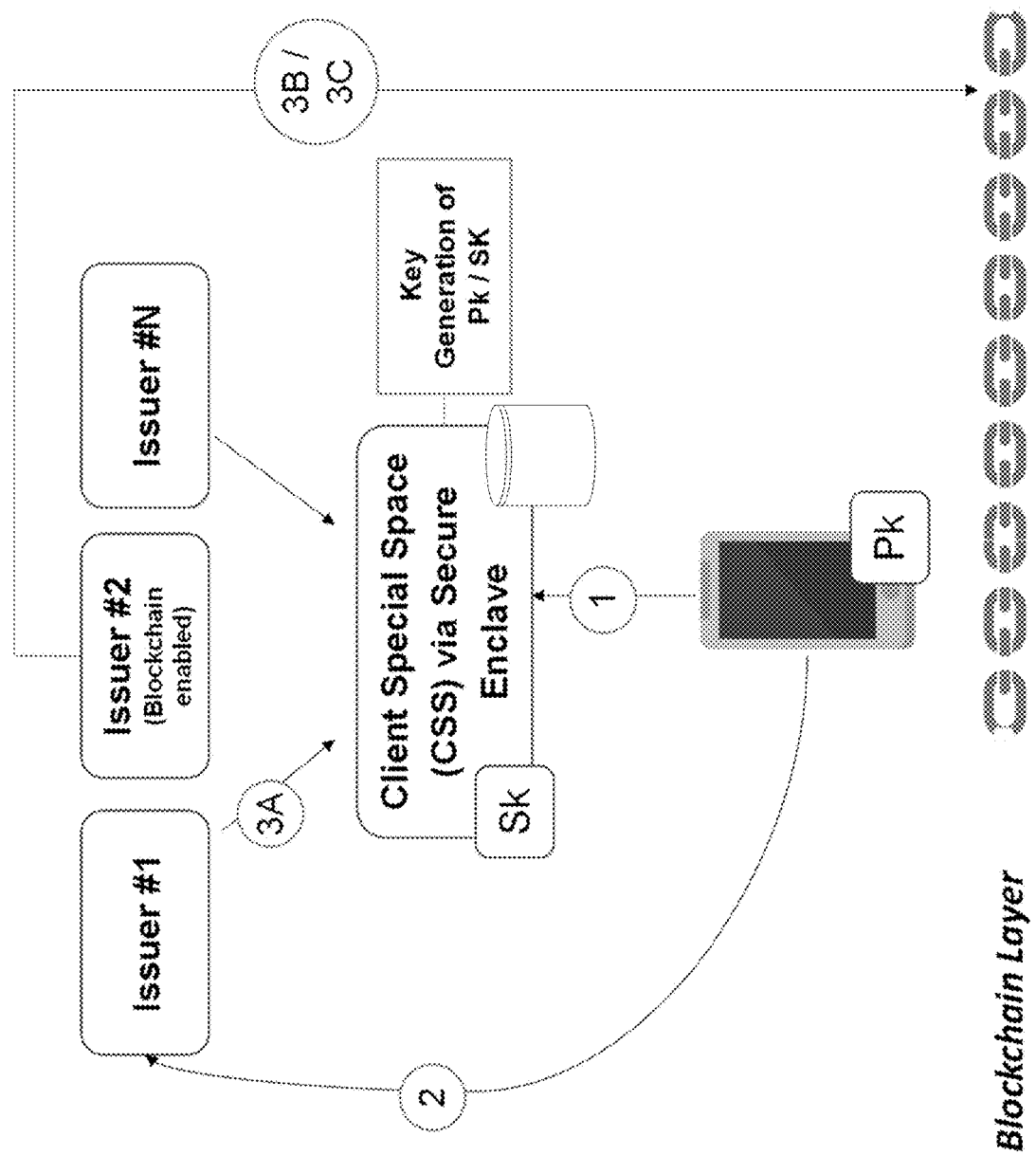
FIG. 25 is a system diagram depicting a method for registration, according to some embodiments.

FIG. 25 is a system diagram depicting a method for registration, according to some embodiments.

At step 1 (shown by the encircled numbers in FIG. 25), a data communication occurs between the client device to the client special space data storage, whereby the client device generates control messages that authenticates and establishes the special space data storage, which, in an example, is a SGX Secure Enclave or other hardware protected space.

A public/private key pair is generated, and the client device retains the public key (Pk) in data storage, while the private/secret key (Sk) is stored on the client special space data storage.

At step 2, a data communication occurs between the client device to the issuer device. The client authenticates (e.g., 2 way authentication) in relation to the issuer device, selecting which attributes he/she wants to provide (e.g., Age, zip, over 21, etc.) from a set of offered selections. In some embodiments, the issuer device may provide one or more interface options indicative of potential token destinations (e.g., storage destinations), including the client special space data storage or a blockchain-based data storage, such as a permissioned blockchain or a public blockchain.

The issuer is configured to then deliver attributes, for example, in a client secret space data structure, the client's device can provide a pointer (e.g., a uniform resource locator address (URL)) to a special space data structure, and can transmit the public key (Pk) to the issuer device. Attributes are then created by the issuer device using a combination of the client's public key and the issuer's secret key (Sk), which can be delivered for storage on the client secret space data structure (3A) or on a data block of a blockchain. Where the attribute is stored on the blockchain, the attribute may be made public (if the issuer is blockchain enabled), and thus publicly viewable. The public blockchain may be configured to store a pre-defined set of attribute types that are thus publically viewable (e.g., using a blockchain explorer).

In another embodiment, where the issuer device is capable of interacting with the blockchain and the attribute can be made public (e.g., over 21), the issuer device delivers attributes signed by the issuer using the client's public key (Pk) to the blockchain (3B).

In another embodiment, where the issuer device is capable of interacting with the blockchain and the attribute requires the client's permission (e.g., date of birth), the issuer can store on the blockchain signed attributes that are encrypted with the client's public key (3C).

In an alternate embodiment, a sidechain is utilized to keep attestation private between the involved parties.

Figure 26:
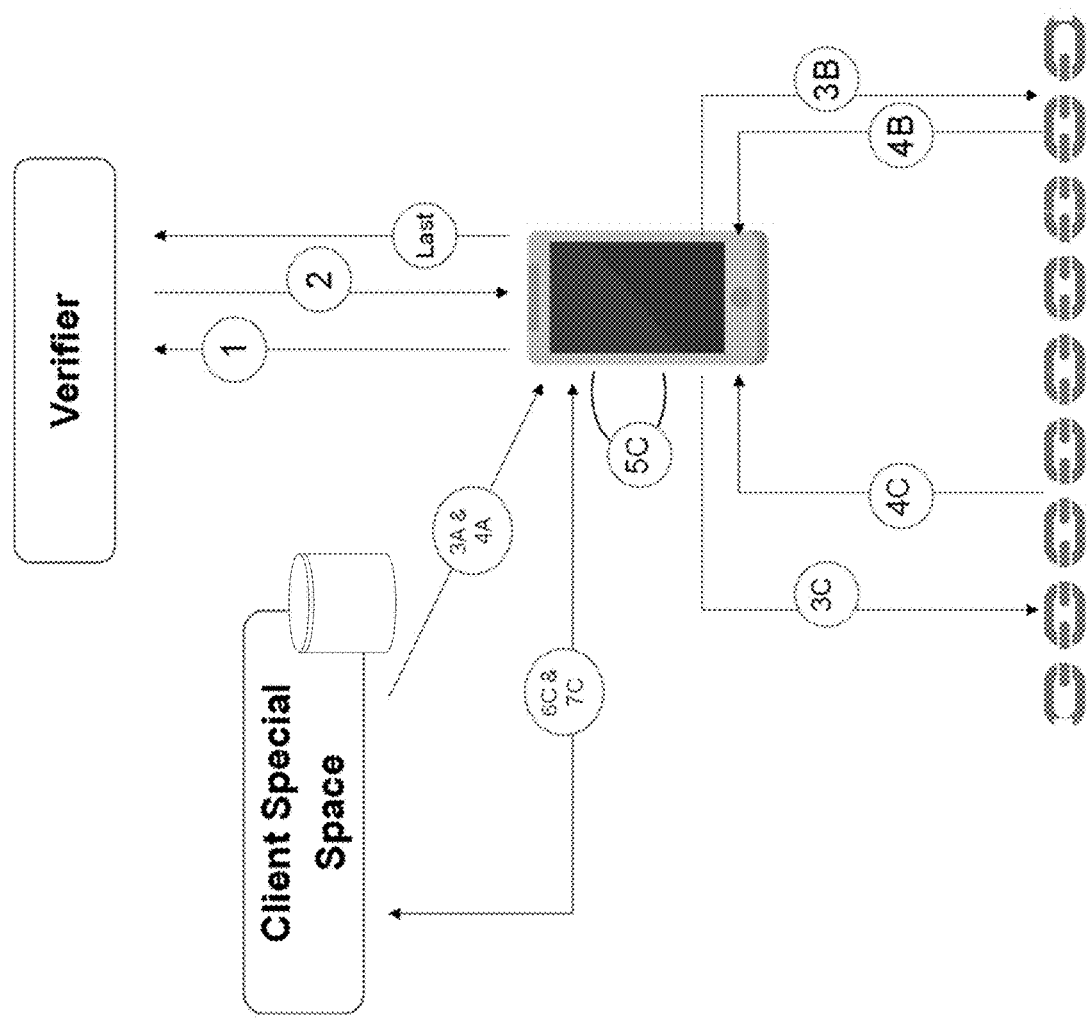
FIG. 26 is a system diagram depicting a method for verification, according to some embodiments.

FIG. 26 is a system diagram depicting a method for verification, according to some embodiments.

Sample steps for verification are described herein, whereby the client device forms a communication channel with the authenticated verifier, and the verifier makes a "Proof Request".

The proof request can be provided, for example, to the client secret space data storage. At step 3A, a "Proof Request" is sent to the Client's special space data storage, where a bounded device has both the URL and public key to access the special space. At step 4A, a "Proof Response" is sent back to the client device.

In an alternate embodiment where the issuer device is blockchain-enabled and the attribute can be made public (e.g., that the user is over 21), at step 3B, data messages representing the "Proof Request" are transmitted to the blockchain (or a blockchain explorer tool configured to interact with the blockchain), and at step 4B, a data message representing the "Proof Response" is sent back to the device as the attribute is public. In an alternate embodiment, the client device can direct the verifier to the blockchain, for example by providing a link or a block number indicative of where the attribute is stored.

In another embodiment, the issuer is blockchain-enabled and but the attribute needs client's permission (e.g., date of birth, address). In this example, at step 3C, a "Proof Request" is sent to the blockchain (e.g., or to a blockchain explorer tool configured to interact with the blockchain), and at step 4C, an "Encrypted Proof Response" is sent back to the device.

The client device may then be required to grant permission to share the attribute at step 5C, and responsive to permission being granted, at step 6C, the "Encrypted Proof Request" is then transmitted to the client special space data storage for decryption. At step 7C, a Decrypted Proof Response is sent back to the client device that could then be provided to the verifier device.

Figure 27:
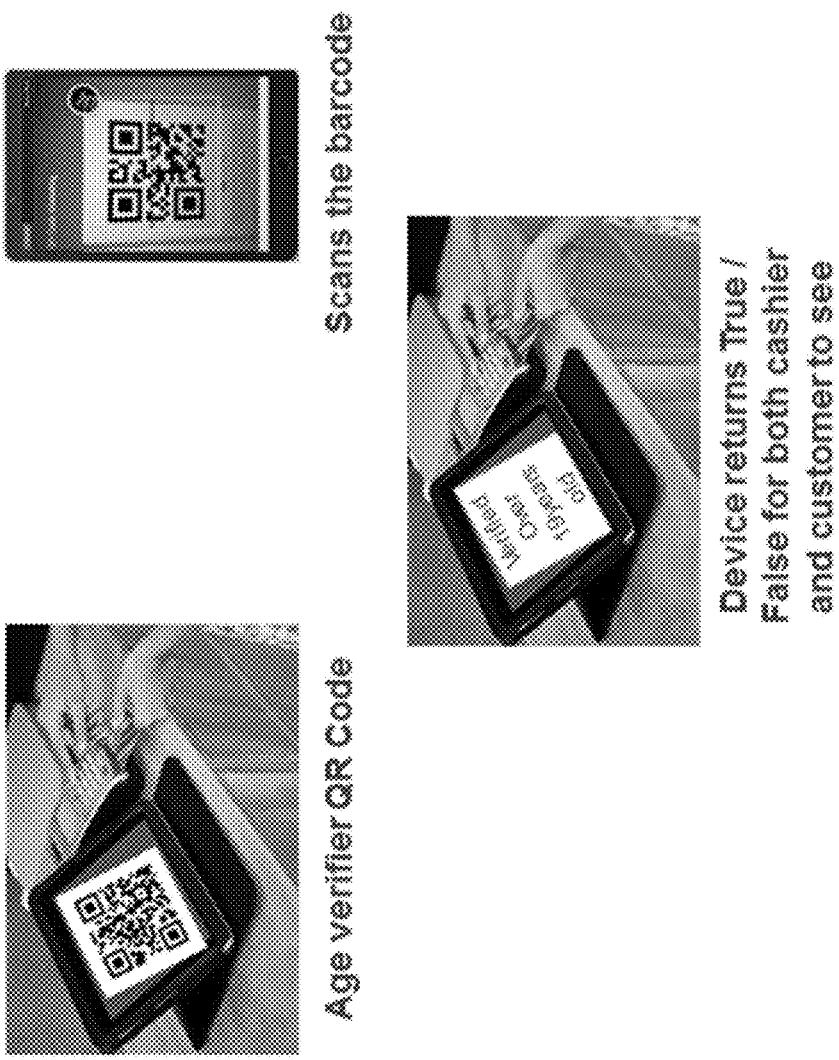
FIG. 27 is a system diagram depicting an example age verifier device, according to some embodiments.

FIG. 27 is a system diagram depicting an example age verifier device 2502, according to some embodiments.

A device is positioned at a point of sale or other location where verification is required, such as in front of a bar serving alcohol. The verification can be used as a gatekeeper mechanism in some cases, or in other cases, as a tool to determine whether a particular individual is entitled to various statuses or discounts (e.g., student discount, or located within a geographic location, etc.). The device 2502 is adapted, in a specific, illustrative example, in relation to a requirement to check the age of all customers.

Without such a system, a cashier would have to request an identification card (which could be falsified), and perform mental math to determine if the individual is over 19 years old. This is time consuming; and requires mental work effort. Furthermore, the customer may find the check to be invasive, as the relationship between cashier and customer is unknown.

The device 2502 can be a terminal set up at the point of sale, for example, which could be designated a verifier computing device. The device 2502, in an example embodiment, may be configured to render a visual representation 2504 of a resource locator, such as a quick response code. The quick response code can be related to an underlying data element, such as a URL, which the client device can interact with, for example, by scanning the code to access the URL. On the backend, verification processes as described in various embodiments herein are utilized to transmit or otherwise make available signed attribute information of the client device, which are then provided to the verification device 2502 such that verification device 2502 is able to verify specific attributes of the client (e.g., age>25, or address is within a geographic location, etc.). The verification device 2502 can be configured to modify a rendering 2506 to visually or audibly indicate that the client has successfully passed or failed the attribute test.

In some embodiments, one or more aspects of the blockchain, tokenization and/or verification/validation/proof processes described herein can involve one or more secure execution environments and/or secure storage elements. For example, in some embodiments, the storage of private keys and tokens, in addition to computations required for issuance and proofs, could be performed on Trusted Execution Environments, Smart Cards, Secure Elements or Trusted Platform Modules on devices such as mobile and personal computers using corresponding APIs.

In some embodiments, a computing system includes or is configured to provide a plurality of distinct execution environments. The isolation of these environments can be enforced using software or hardware. In some embodiments, a distinct execution environment can include one or more secure storage elements (for example, a Secure Element or one or more aspects of a Smart Card).

The distinct execution environments are, in some embodiments, configured to provide access to different storage and processing resources.

In some embodiments, one of the environments may be referred to as a trusted execution environment (TEE) and may have access to isolated and secure storage and processing resources.

In some embodiments, a secure environment may support a distinct operating system, or it may be a set of secure resources accessible to applications that are assigned to use it by the underlying operating system of the overall system. In some embodiments, a computing system includes a dedicated secure storage resource, such as a separate secure storage or a secure storage area within a general storage resource. In some embodiments, the computing system includes a dedicated secure memory device such as a separate secure memory, or a secure area within a general memory resource (e.g., secure memory may be accessible in a different address space or in a different address range).

These resources may be physically and/or logically distinct from the general resources of the same type. In a computing system that includes or is configured to provide two distinct execution environments, the first execution environment is a secure execution environment and the second execution environment is a potentially unsecure environment.

The secure execution environment is sometimes referred to as a trusted execution environment (TEE) and the potentially unsecure environment is sometimes referred to as a rich execution environment (REE).

The second execution environment (e.g., the potentially unsecure execution environment) is configured to communicate with the secure execution environment (e.g., the first execution environment) to request one or more aspects of the tokenization and/or verification/validation process to be performed.

The second execution environment includes an unsecure portion of a processor, memory, and storage. Software code of the second execution environment can include an unsecure OS which is stored in storage, loaded into memory at run time, and executed by processor to perform OS operations. In some embodiments, software executable by the second execution environment can include one or more APIs or other software components for providing function calls or otherwise interfacing with one or more components of the first execution environment.

For example, in some embodiments, the first (e.g., secure) execution environment can include (e.g., store) one or more keys such as root keys, private keys, and the like for generating signs tokens, validating one or more signed data elements, and/or the like. Some environment, first execution environment can include (e.g., store) one or more tokens against which one or more credentials or other data elements can be validated.

In some embodiments, first execution environment can include one or more software components including computer executable code for generating/issuing and/or validating one or more tokens, credentials and/or other data elements.

For example, in one example embodiment, a digitally signed token representing a verified identity or account can be stored in a secure storage element in a secure execution environment. A secure execution environment can include computer executable instructions which receive from an unsecure execution environment one or more data sets representing one or more biometric verification credentials.

The computer executable instructions and the secure execution environment can be configured to perform one or more calculations or data transformations to validate that the data sets representing the biometric verification credentials match or otherwise correspond to the digitally signed token as described herein or otherwise. In some embodiments, the data sets representing the one or more biometric verification credentials can be received at the device on which the secure execution environment resides and/or an external device in communication with the device in which the secure execution environment resides.

In some embodiments, secure execution environment can return one or more signals indicating whether the biometric verification credentials are valid or otherwise match the digitally signed token. Some environments, the signals can include one or more signed data elements to confirm the veracity of the signals.

In some embodiments, the secure execution environment can be configured to respond to proof requests from unsecure execution environment(s).

In some embodiments, a secure execution environment can be used to generate a signed token. In some embodiments, a secure execution environment can receive from an unsecure execution environment one or more tokens and/or credentials. One or more software elements within the secure execution environment can generate a signed token and/or credential using one or more private keys stored within the secure execution environment. The signed token and/or credential can then be returned to the unsecure execution environment.

In some embodiments, one or more aspects of the blockchain verification, transaction and/or other modification processes can be performed within a secure execution environment to ensure that private keys, addresses, credentials and/or the like are only accessible by authorized users and/or processes within the secured environment.

Any other aspect of the tokenization and/or her validation process can be similarly applied to using these secure an unsecure execution environment to ensure that sensitive information such as keys, credentials, tokens, tokenization algorithms, biometric data, biometric processing algorithms, blockchain transactions/activities, neural networks, and/or the like are only accessible by authorized users and/or processes.

In some embodiments, sensitive operations using a private key may be performed only in a secure area. In some embodiments, all or additional operations may be performed in a java card space of a smart card.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Example Commitment Non-zeroness protocol

Consider a dummy example where the group is of order 23. The prover has a commitment $C_x = g^{13} h^{12}$ (x=13, y=12) and wants to prove that it is nonzero.

The prover first privately computes $t_1 = x^{-1} \equiv 16$ and $t_2 = -yx^{-1} \equiv 15$. Note that $g = C_x^{t_1} h^{t_2}$.

The prover first samples two random numbers, say $r_1 = 6$ and $r_2 = 21$. It computes $R = C_x^6 h^{21} = g^9 h$ and hashes $C_x$ and R together to obtain c, say its value is c=7. The prover computes $z_1=ct_1+r_1=3$ and $z_2=ct_2+r_2=11$ and sends over $C_x$, R, $z_1$ and $z_2$.

The verifier independently computes c and checks that $g^c R = C_x^{z_1} h^{z_2} =_g^{16} h$ which is indeed true.

It can be seen that the prover was required to perform one modular inverse, two randomizations, two group exponentiations and one group multiplication. The method of Belenkiy requires 4 randomizations, 3 group multiplications and 7 group exponentiations.

Data Example, Real World Setting:

Here is an example run of the protocol in a real-world setting. The NIST-recommended SECP256r1 curve has been used as the discrete log group with g being the default generator.

Integers:

x=9892867038935251039652315169735590435479200495797377441259563330327374324977743 y=95008053600361093431923046575424751433609377135357996941110581993938165236367

$x^{-1}$=46269840326567351854099451051133827535525340183367300921621852037000846966515

$-yx^{-1}$=8118836176174455952026757876607568991506901761079418302569681690872777324170

$r_1$=64174188764800913824267254049454250383880323837574216579480449677278287845053

$r_2$=78072047693972697562257276623750159877182993380025344884890619716596569262161 c=9622499010981012121056562044098423336748606820016916640259219129151163180105

$z_1$=77558756204012200080475684884310387291370943910107311585466358661683 524082068

$z_2$=10967924588729828517744024474218426311078559706343058313692421336800 4095632307

Note: The specific value of c depends on how hashing is carried out. Many possible ways of doing so can be valid. The process involves deterministically serializing the objects to be hashed (however seen fit) and pass the resulting byte array through a secure hash (in this example, SHA256).

Note: These integers are displayed in base 10.

Group Elements:

$C_x$=
(e6ab3db4c6691dda4a8b05d79a15559c18181cda6c6dfc7fc77f41dff392e41,f0d8a7a
52e882ff9da9f64cf082db98bbe1db6fa6f965dc96a4150b95270e073,1da350a2e431d51de9217a
218313fb2cc39f8f1dda48ea33ad7b1e561ef00e89)

h=(e6ab3db4c6691dda4a8b05d79a15559c18181cda6c6dfc7fc77f41dff392e41,f0d8a7a5
2e882ff9da9f64cf082db98bbe1db6fa6f965dc96a4150b95270e073,1da350a2e431d51de9217a2
18313fb2cc39f8f1dda48ea33ad7b1e561ef00e89)

R=(b5e8e60e25842deb89cdb80047e49681b566b8bcf6b6fd6298fdc7dab5857300,54cac
d179ab2e3fbc892b1001c47408dc1d8559c8a2dce519094ab874b640e87,11b5ec881901a0901d
73d0892402c3f70d96f6d23ca851cd7fe9402f886f6bb4)

Note: These group elements are displayed in projective coordinates base 16.

Example Comparison Protocol

Consider G to be a discrete log group of prime order p and g and h be generators with unknown discrete logs. (Setting identical to that of all the rest of the protocols).

Let numbers q and 1 be such that $$q - 1 = 2^N \leq \frac{p}{2}$$

and two whole numbers a and b such that $1 \leq a \leq b < q$.

Consider commitments $A = g^a h^{m_a}$ and $B = g^b h^{m_b}$ to a and b, respectively.

To prove that a b, the following steps can be taken:
1. Prover computes $C = BA^{-1} = g^{b-a} h^{m_b - m_a} = g^c h^{m_c}$.
2. Prover produces bit commitments $A_i = g^{a_i} h^{m_{ai}}$, $B_i = g^{b_i} h^{m_{bi}}$, $C_i = g^{c_i} h^{m_{ci}}$ for $i \in \{1, \ldots, N-1\}$ where $a_i$, $b_i$ and $c_i$ are the i'th bits of a-1, b-1 and c, respectively. $M_{ai}$, $M_{bi}$ and $m_{ci}$ are sampled randomly.
3. Prover computes $A_0 = g^{a_0} h^{m_{a0}} = A \Pi_{i=1}^{N-1} A_i^{-2^i}$ and likewise $B_0 = g^{b_0} h^{m_{b0}} = B \Pi_{i=1}^{N-1} B_i^{-2^i}$ and $C_0 = g^{c_0} h^{m_{c0}} = C \Pi_{i=1}^{N-1} C_i^{-2^i}$.
4. For each $i \in \{0, 1, \ldots, N-1\}$, the prover does the following:
   a. Randomly sample $r_{ai}$, $d'_{ai}$ and $z'_{ai}$.
   b. Compute $R_{ai, a_i} = h^{r_{ai}}$ and $R_{ai, (1-a_i)} = h^{z'_{ai}} (A_i g^{-a_i})^{-d'_{ai}}$.
   c. Compute $d_{ai} = H(A_i, R_{ai,0}, R_{ai,1})$
   d. Compute $z_{ai} = (d_{ai} - d'_{ai}) m_{ai} + r_{ai}$
   e. Assign $z_{ai, a_i} = z_{ai}$, $z_{ai, (1-a_i)} = z'_{ai}$, $d''_{ai, a_i} = d_{ai} - d'_{ai}$ and $d''_{ai, (1-a_i)} = d'_{ai}$
   f. Repeat steps a through e for B and C
5. Prover sends all $A_i$, $R_{ai,0}$, $R_{ai,1}$, $d'_{ai,0}$, $z_{ai,0}$, $z_{ai,1}$, $B_i$, $R_{bi,0}$, $R_{bi,1}$, $d'_{bi,0}$, $z_{bi,0}$, $z_{bi,1}$, $C_i$, $R_{ci,0}$, $R_{ci,1}$, $d''_{ci,0}$, $z_{ci,0}$, $z_{ci,1}$.
6. Verifier checks that $A = \Pi_{i=0}^{N-1} A_i^{2^i}$, $B = \Pi_{i=0}^{N-1} B_i^{2^i}$, $BA^{-1} = \Pi_{i=0}^{N-1} C_i^{2^i}$.
7. For each $i \in \{0, 1, \ldots, N-1\}$ the verifier checks that:
   a. $A^{d''_{ai,0}} R_{ai,0} = h^{z_{ai,0}}$
   b. $(Ag^{-1})^{H(A_i, R_{ai,0}, R_{ai,1}) - d''_{ai,0}} R_{ai,1} = h^{z_{ai,1}}$
   c. Check the same conditions for B and C Note: It may be that either a or b are known to the verifier. In such a case there is no need to decompose the known number and commitment C will have the same mask exponent as that of the unknown parameter.

Note: In an embodiment, the prover avoids sending $A_0$, $B_0$ and $C_0$ to reduce the size of its messages. In that case, in step 6, instead of verifying a relation between the bit commitments the verifier derives $A_0$, $B_0$ and $C_0$ independently.

Dummy Example

Let p=23, l=0, q=8, a=3, b=5, $A=g^3 h^6$, $B=g^5 h^1$.
1. Prover computes $C = g^2 h^{18}$
2. Prover generates commitments $A_1 = gh^{17}$, $A_2 = h^{22}$, $B_1 = h^3$, $B_2 = gh^4$, $C_1 = gh^2$ and $C_2 = h^{17}$.
3. Prover computes commitments $A_0 = gh^{22}$, $B_0 = gh^2$ and $C_0 = h^{15}$.
4. Prover does the following:
   a. Randomly sample $r_{a0}=15$, $d'_{a0}=10$, $z'_{a0}=18$, $r_{a1}=3$, $d'_{a1}=5$, $z'_{a1}=7$, $r_{a2}=3$, $d'_{a2}=18$, $z'_{a2}=4$, $r_{b0}=17$, $d'_{b0}=19$, $z'_{b0}=7$, $r_{b1}=8$, $d'_{b1}=12$, $z'_{b1}=6$, $r_{b2}=7$, $d'_{b2}=5$, $z'_{b2}=3$, $r_{c0}=11$, $d'_{c0}=21$, $z'_{c0}=19$, $r_{c1}=5$, $d'_{c1}=16$, $z'_{c1}=12$, $r_{c2}=9$, $d'_{c2}=5$, $z'_{c2}=10$.
   b. Compute $R_{a0,0} = h^{18} A_0^{-10} = g^{13} h^5$, $R_{a0,1} = h^{15}$, $R_{a1,0} = h^7 A_1^{-5} = g^{18} h^{14}$, $R_{a1,1} = h^3$, $R_{a2,0} = h^3$, $R_{a2,1} = h^4 (A_2 g^{-1})^{-18} = g^{18} h^{22}$, $R_{b0,0} = h^7 B_0^{-19} = g^4 h^{15}$, $R_{b0,1} = h^{17}$, $R_{b1,0} = h^8$, $R_{b1,1} = h^6 (B_1 g^{-1})^{-12} = g^{12} h^{16}$, $R_{b2,0} = h^3$, $R_{b2,1} = h^5 (B_2 g^{-1})^{-5} = g^5 h^6$, $R_{c0,0} = h^{11}$, $R_{c0,1} = h^{19} (C_0 g^{-1})^{-21} = g^{21} h^3$, $R_{c1,0} = h^{12} C_1^{-16} = g^7 h^3$, $R_{c1,1} = h^5$, $R_{c2,0} = h^9$, $R_{c2,1} = h^{10} (C_2 g^{-1})^{-5} = g^5 h^{17}$.

c. Compute hashes, say $d_{a0}=17$, $d_{a1}=4$, $d_{a2}=17$, $d_{b0}=12$, $d_{b1}=20$, $d_{b2}=3$, $d_{c0}=7$, $d_{c1}=1$, $d_{c2}=0$.

d. Compute responses $z_{a0}=(17-10)22+15=8$, $z_{a1}=(4-5)17+3=9$, $z_{a2}=(17-18)22+3=4$, $z_{b0}=(12-19)2+17=3$, $z_{b1}=(20-12)3+8=1$, $z_{b2}=(3-5)4+7=22$, $z_{c0}=(7-21)15+11=8$, $z_{c1}=(1-16)2+5=21$, $z_{c2}=-5\times17+9=16$.

e. Assign values $z_{a0,0}=18$, $z_{a0,1}=8$, $z_{a1,0}=7$, $z_{a1,1}=9$, $z_{a2,0}=4$, $z_{a2,1}=4$, $z_{b0,0}=7$, $z_{b0,1}=3$, $z_{b1,0}=1$, $z_{b1,1}=6$, $z_{b2,0}=3$, $z_{b2,1}=22$, $z_{c0,0}=8$, $z_{c0,1}=19$, $z_{c1,0}=12$, $z_{c1,1}=21$, $z_{c2,0}=16$, $z_{c2,1}=10$.

5. Prover sends $A_0=gh^{22}$, $R_{a0,0}=g^{13}h^5$, $R_{a0,1}=h^{15}$, $d'_{a0,0}=10$, $z_{a0,0}=18$, $z_{a0,1}=8$, $A_1=gh^{17}$, $R_{a1,0}=g^{18}h^{14}$, $R_{a1,1}=h^3$, $d''_{a1,0}=5$, $z_{a1,0}=7$, $z_{a1,1}=9$, $A_2=h^{22}$, $R_{a2,0}=h^3$, $R_{a2,1}=g^{18}h^{22}$, $d'_{s2,0}=22$, $z_{a2,0}=4$, $z_{a2,1}=4$, $B_0=gh^2$, $R_{b0,0}=g^4h^{15}$, $R_{b0,1}=h^{17}$, $d'_{b0,0}=19$, $z_{b0,0}=7$, $z_{b0,1}=3$, $B_1=h^3$, $B_{b1,0}=h^8$, $R_{b1,1}=g^{12}h^{16}$, $d''_{b1,0}=8$, $z_{b1,0}=1$, $z_{b1,1}=6$, $B_2=gh^4$, $B_{b2,0}=g^5h^6$, $R_{b2,1}=h^7$, $d'_{b2,0}=5$, $z_{b2,0}=3$, $z_{b2,1}=22$, $C_0=h^{15}$, $R_{c0,0}=h^{11}$, $R_{c0,1}=g^{21}h^3$, $d''_{c0,0}=9$, $z_{c0,0}=8$, $z_{c0,1}=19$, $C_1=gh^2$, $R_{c1,0}=g^7h^3$, $R_{c1,1}=h^5$, $d''_{c1,0}=16$, $z_{c1,0}=12$, $z_{c1,1}=21$, $C_2=h^{17}$, $R_{c2,0}=h^9$, $R_{c2,1}=g^5h^{17}$, $d''_{c2,0}=18$, $z_{c2,0}=16$, $z_{c2,1}=10$ to the verifier.

6. The verification steps are omitted in this description of this example.

The discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Throughout the foregoing discussion, references were made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The terms "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein may be implemented by physical computer hardware, including computing devices, servers, receivers, transmitters, processors, memory, displays, and networks. Such embodiments provide useful physical machines and particularly configured computer hardware arrangements.

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer implemented system for communicating data messages between a verifier computing device and a portable client computing device, the data messages establishing authentication of at least one client location characteristic of the portable client computing device, the system comprising:

the portable client computing device including at least a client computing device processor and data storage, the data storage storing one or more token data objects received from or computed jointly in a multiparty protocol with an issuer computing device, the one or more token data objects generated using at least an issuer computing device private issuance key, the one or more token data objects each including one or more signed data elements representing at least one of the at least one client location characteristic of the portable client computing device; and the client computing device processor configured to:

receive a verification request data message from the verifier computing device, the verification request data message comprising a request for confirmation that the portable client device is associated with a particular geographic location; and using a combination of the one or more token data objects and the verification request data message, generate one or more proof data messages without sending any data messages or requests to the issuer computing device by conducting a modular inverse based at least on a location attribute value from the one or more token data objects, generating a first random number and a second random number, computing a first group exponentiation and a second group exponentiation based on the first random number and the second random number, and a group multiplication including at least the first group exponentiation and the second group exponentiation, the group multiplication utilized to establish proof responses in a sigma protocol that are encapsulated into a proof data message of the one or more proof data messages.

2. The computer implemented system as claimed in claim 1, wherein to determine if the portable client device is associated with the particular geographic location, the client computer device processor is configured to:
  determine if at least one client location characteristic represents a geographic location that is within at least one of:
    a radius of the particular geographic location;
    a polygon shape defining an area representing the particular geographic location; or
    a union of convex polygon shapes defining an area representing the particular geographic location.

3. The computer implemented system as claimed in claim 1, wherein to determine if the portable client device is associated with the particular geographic location, the client computer device processor is configured to:
  convert a geographic point associated with the portable client device into a planar approximation;
  determine a commitment value of a geometric function of the planar approximation; and
  determine and generate a proof that a result of the geometric function applied to the planar approximation is within a parameter.

4. The computer implemented system as claimed in claim 3, wherein the client computer processor is further configured to:
  generate a proof that a commitment is well-formed;
  send the commitment values and proofs to a verifier device for verification of the location; and
  receive confirmation from the verification device that the location has been verified.

5. The computer implemented system as claimed in claim 1, wherein the particular geographic location is a circle having an origin point with a radius defining an area, and wherein to determine if the portable client device is associated with the particular geographic location, the client computer device processor is configured to:
  convert a geographic point associated with the origin into a planar approximation;
  determine a commitment value of a distance squared between the planar approximation of the geometric location of portable client device and the planar approximation of the origin; and
  generating a proof that the distance squared is less than the radius squared.

6. The computer implemented system as claimed in claim 1, wherein the particular geographic location is a polygon shape having vertices defining an area, and wherein to determine if the portable client device is associated with the particular geographic location, the client computer device processor is configured to:
  for each endpoint of a vertex of the polygon, convert a geographic point associated with that endpoint into a planar approximation;
  for each triangle defined by $A_i P A_{i+1}$, determine a commitment value of a signed area of that triangle, where $A_i$ and $A_{i+1}$ are the planar approximations of endpoints of a vertex of the polygon shape, P is the planar approximation of the particular geographic location associated with the portable client device, and i is an index value representing a vertex of the polygon; and
  generate a proof that the signed area of each triangle defined by $A_i P A_{i+1}$ is a positive value.

7. The computer implemented system as claimed in claim 1, wherein the particular geographic location is a union of shapes defining an area, and wherein to determine if the portable client device is associated with the particular geographic location, the client computer device processor is configured to:
  convert the particular geographic location into planar approximations;
  generate an honest proof for at least one shape that contains the particular geographic location; and
  generate a simulated proof for all other shapes in the union of shapes.

8. The computer implemented system of claim 7, wherein to generate a simulated proof of a shape comprising an origin point and a radius defining an area, the client computer device processor is configured to:
  generate commitments to planar approximations dx and dy of the particular geographic location;
  generate a first simulated proof portion that $dx = r \cos \varphi_0 d\theta$ and $dy = rd\varphi$;
  generate commitments to squared planar approximations $dx^2$ and $dy^2$ of the particular geographic location;
  generate a second simulated proof portion that $dx^2$ and $dy^2$ were correctly computed;
  generate a commitment to $\delta = r^2 - dx^2 - dy^2$; and
  generate a third simulated proof that a decomposition of $\delta$ is a positive value.

9. The computer implemented system of claim 7, wherein to generate a simulated proof of a polygon shape having vertices defining an area, the client computer device processor is configured to:
  generate commitments to planar approximations dx and dy of the particular geographic location;
  generate a first simulated proof portion that $dx = r \cos \varphi_0 d\theta$ and $dy = rd\varphi$;
  generate commitments to signed values $S(A_i PA_{i+1})$;
  generate a second simulated proof portion that the signed values were formed correctly; and
  generate simulated proof portions that all the signed values $S(A_i PA_{i+1})$ are positive values.

10. The computer implemented system of claim 1, wherein the one or more token data objects are pre-loaded into the data storage such that the generation of the proof can be conducted at a time temporally separated from when the one or more token data objects were generated or preloaded.

11. The computer implemented system of claim 1, wherein the one or more proof data messages are generated such that the one or more proof data messages can be validated using an issuer computing device public issuance key corresponding to the issuer computing device private issuance key.

12. A computer implemented method for communicating data messages between a verifier computing device and a portable client computing device, the data messages establishing authentication of at least one client location characteristic of the portable client computing device, the method comprising:
  storing one or more token data objects received from an issuer computing device, the one or more token data objects generated using at least an issuer computing device private issuance key, the one or more token data objects each including one or more signed data elements representing at least one of the at least one client location characteristic of the portable client computing device;
  receiving a verification request data message from the verifier computing device, the verification request data message comprising a request for confirmation that the portable client device is associated with a particular geographic location; and using a combination of the one or more token data objects and the verification request data message, generating one or more proof data messages without sending any data messages or requests to the issuer computing device by conducting a modular inverse based at least on a location attribute value from the one or more token data objects, generating a first random number and a second random number, computing a first group exponentiation and a second group exponentiation based on the first random number and the second random number, and a group multiplication including at least the first group exponentiation and the second group exponentiation, the group multiplication utilized to establish proof responses in a sigma protocol that are encapsulated into a proof data message of the one or more proof data messages.

13. The computer implemented method as claimed in claim 12, wherein determining if the portable client device is associated with the particular geographic location comprises:
  determining if at least one client location characteristic represents a geographic location that is within at least one of:
    a radius of the particular geographic location;
    a polygon shape defining an area representing the particular geographic location; or
    a union of convex polygon shapes defining an area representing the particular geographic location.

14. The computer implemented method as claimed in claim 12, wherein determining if the portable client device is associated with the particular geographic location comprises:
  converting a geographic point associated with the portable client device into a planar approximation;
  determining a commitment value of a geometric function of the planar approximation; and
  determining a result of the geometric function applied to the planar approximation is within a parameter.

15. The computer implemented method as claimed in claim 12, wherein the particular geographic location is a circle having an origin point with a radius defining an area, and wherein to determine if the portable client device is associated with the particular geographic location comprises:
  converting a geographic point associated with the origin into a planar approximation;
  determining a commitment value of a distance between squares of the planar approximation of the geometric location of portable client device and the planar approximation of the origin; and
  confirming that the distance is less than the radius.

16. The computer implemented method as claimed in claim 12, wherein the particular geographic location is a polygon shape having vertices defining an area, and wherein determining if the portable client device is associated with the particular geographic location comprises:
  for each endpoint of a vertex of the polygon, converting a geographic point associated with that endpoint into a planar approximation;
  for each triangle defined by $A_i P A_{i+1}$, determining a commitment value of a signed area of that triangle, where $A_i$ and $A_{i+1}$ are the planar approximations of endpoints of a vertex of the polygon shape, P is the planar approximation of the particular geographic location associated with the portable client device, and i is an index value representing a vertex of the polygon; and
  confirming that the signed area of each triangle defined by $A_i P A_{i+1}$ is a positive value.

17. The computer implemented method as claimed in claim 12, wherein the particular geographic location is a union of convex polygon shapes defining an area, and wherein determining if the portable client device is associated with the particular geographic location comprises:
  converting the particular geographic location into planar approximations;
  generating an honest proof for at least one shape that contains the particular geographic location; and
  generating a simulated proof for all other shapes in the union of shapes.

18. The computer implemented method of claim 17, wherein generating a simulated proof of a shape comprising an origin point and a radius defining an area comprises:
  generating commitments to planar approximations dx and dy of the particular geographic location;
  generating a first simulated proof portion that $dx = r \cos \varphi_0 d\theta$ and $dy = r d\varphi$;
  generating commitments to squared planar approximations $dx^2$ and $dy^2$ of the particular geographic location;
  generating a second simulated proof portion that $dx^2$ and $dy^2$ were correctly computed;
  generating a commitment to $\delta = r^2 - dx^2 - dy^2$; and
  generating a third simulated proof that a decomposition of $\delta$ is a positive value.

19. The computer implemented system method of claim 17, wherein generating a simulated proof of a polygon shape having verticies defining an area comprises:
  generating commitments to planar approximations dx and dy of the particular geographic location;
  generating a first simulated proof portion that $dx = r \cos \varphi_0 d\theta$ and $dy = r d\varphi$;
  generating commitments to signed values $S(A_i P A_{i+1})$;
  generating a second simulated proof portion that the signed values were formed correctly; and
  generating simulated proof portions that all the signed values $S(A_i P A_{i+1})$ are positive values.

20. The computer implemented method of claim 12, wherein the one or more token data objects are pre-loaded into the data storage such that the generation of the proof can be conducted at a time temporally separated from when the one or more token data objects were generated or preloaded.

21. The computer implemented method of claim 12, wherein the one or more proof data messages are generated such that the one or more proof data messages can be validated using an issuer computing device public issuance key corresponding to the issuer computing device private issuance key.

* * * * *